US012531024B2

(12) United States Patent
Song et al.

(10) Patent No.: US 12,531,024 B2
(45) Date of Patent: Jan. 20, 2026

(54) DISPLAY DEVICE AND ELECTRONIC DEVICE INCLUDING THE SAME

(71) Applicant: SAMSUNG DISPLAY CO., LTD., Yongin-si (KR)

(72) Inventors: Hee Rim Song, Yongin-si (KR); So Il Yoon, Yongin-si (KR); Cheol Gon Lee, Yongin-si (KR); Mu Kyung Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/905,339

(22) Filed: Oct. 3, 2024

(65) Prior Publication Data

US 2025/0118259 A1 Apr. 10, 2025

(30) Foreign Application Priority Data

Oct. 6, 2023 (KR) ........................ 10-2023-0133742

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0426* (2013.01); *G09G 2354/00* (2013.01); *G09G 2360/148* (2013.01)

(58) Field of Classification Search
CPC ................... G09G 3/3233; G09G 3/32; G09G 2300/0426; G09G 2354/00; G09G 2360/148; G06F 3/0412
USPC ........................................................... 345/76
See application file for complete search history.

(56) References Cited

U.S. PATENT DOCUMENTS

| | | | | |
|---|---|---|---|---|
| 11,594,582 | B2 | 2/2023 | Han et al. | |
| 2023/0116805 | A1 | 4/2023 | Kim et al. | |
| 2023/0317007 | A1 * | 10/2023 | Kim | G06F 3/0412 345/76 |
| 2023/0320111 | A1 | 10/2023 | Lee et al. | |

FOREIGN PATENT DOCUMENTS

| | | | |
|---|---|---|---|
| KR | 10-1958517 | B1 | 3/2019 |
| KR | 10-2021-0158592 | A | 12/2021 |
| KR | 10-2023-0143237 | A | 10/2023 |
| WO | WO2014105276 | A1 | 7/2014 |

* cited by examiner

*Primary Examiner* — Abdul-Samad A Adediran
(74) *Attorney, Agent, or Firm* — F. CHAU & ASSOCIATES, LLC

(57) ABSTRACT

A display device includes first, second, and third sub-pixels arranged in a first direction and including a pixel circuit. A photo-sensing pixel includes a sensor circuit. A first data line connected to the first sub-pixel extends in a second direction. A second data line connects to the second sub-pixel and extends in the second direction. A third data line connects to the third sub-pixel and extends in the second direction. A readout line connected to the photo-sensing pixel extends in the second direction. A first additional line connects to the photo-sensing pixel and extends in the second direction and receives a reset voltage. The first additional line is disposed in the same layer as the first, second, and third data lines. The readout line is disposed on a different layer from the first, second, and third data lines, and the first additional line.

20 Claims, 36 Drawing Sheets

FL(CL1): BML
SL(SCL1): SCP1
TL(CL2): LE, GE1
FOL(CL3): UE
FIL(SCL2): SCP4
SIL(CL4): GE2
SEL(CL5): TE1, TE2, TE3, TE4
EIL(CL6): CNL1, CNL2
NIL(CL7): BRP1, BRP2

SL(SCL1): SCP1, SCP2
FOL(CL3): WL4
SIL(CL4): WL7
SEL(CL5): WL10
EIL(CL6): D2, D3, CNP2, WL12
NIL(CL7): BRP, WL13

SL(SCL1): SCP1, SCP2
FOL(CL3): WL4
SIL(CL4): WL7
SEL(CL5): WL10
EIL(CL6): D2, D3, CNP2, WL12
NIL(CL7): BRP, WL13

SL(SCL1): SCP1
FOL(CL3): WL4
SIL(CL4): WL7
EIL(CL6): PL1, D1, D2, D3
NIL(CL7): WL12b

SL(SCL1): SCP1
FOL(CL3): WL4
SIL(CL4): WL7
EIL(CL6): PL1, D1, D2, D3

DISPLAY DEVICE AND ELECTRONIC DEVICE INCLUDING THE SAME

CROSS-REFERENCE TO RELATED APPLICATION

The present application claims priority to Korean patent application number 10-2023-0133742, filed on Oct. 6, 2023, the entire disclosure of which is hereby incorporated by reference in its entirety.

TECHNICAL FIELD

The present disclosure relates to a display device and, more specifically, to a display device and an electronic device including the display device.

DISCUSSION OF THE RELATED ART

Recently, as interest in information display increases, research and development on display devices have been continuously conducted. One advancement in the field of display devices is to provide a display panel that is capable of displaying an image and, at the same time, recognizing an input by a touch event such as a touch of a person or that of an electronic stylus pen. Such devices may be known as touch-screen display devices.

Touch-screen display devices may make use of data lines, for implementing an image on the display device, and readout lines for collecting touch information. However, as touch-screen display devices are made of higher resolutions and smaller sizes, these lines may interfere with one another by a phenomenon called parasitic capacitance.

SUMMARY

A display device includes a first sub-pixel, a second sub-pixel, and a third sub-pixel, each arranged in a first direction, and each including a pixel circuit. A photo-sensing pixel includes a sensor circuit. A first data line extends in a second direction crossing the first direction, and is electrically connected to the first sub-pixel. A second data line extends in the second direction and electrically connects to the second sub-pixel. A third data line extends in the second direction and electrically connects to the third sub-pixel. A readout line extends in the second direction and electrically connects to the photo-sensing pixel. A first additional line extends in the second direction and electrically connects to the photo-sensing pixel and is configured to receive a reset voltage. The first additional line is disposed in a same layer as each of the first, the second, and the third data lines. The readout line is disposed on a layer that is different from that of the first, the second, and the third data lines, and the first additional line.

The readout line may be disposed on the first data line, the second data line, the third data line, and the first additional line.

The readout line may overlap the first additional line, and may be disposed on the first additional line.

The first additional line may be disposed between the second data line and the third data line.

The photo-sensing pixel may be disposed between the second sub-pixel and the third sub-pixel.

Each of the first sub-pixel, the second sub-pixel, and the third sub-pixel may include a light emitting element configured to emit light. The photo-sensing pixel may include a light receiving element configured to output a sensing signal corresponding to the light emitted from the light emitting element.

The photo-sensing pixel may further include a bridge pattern electrically connected to the light receiving element. The bridge pattern and the readout line may be disposed in a same layer and spaced apart from each other.

The first additional line may have a width that is greater than a width of the readout line.

The display device may further include a second additional line extending in the first direction, and electrically connected to the first additional line and configured to receive a reset voltage. The first additional line may be disposed on the second additional line with an insulating layer interposed therebetween.

The display device may further include a third additional line electrically connected to each of the first sub-pixel, the second sub-pixel, and the third sub-pixel, and configured to receive a first driving voltage. The third additional line may be disposed in a same layer as each of the first data line, the second data line, the third data line, and the first additional line.

The readout line might not overlap the third additional line.

The sensor circuit may include a light receiving element, a first sensor transistor configured to control current flowing to the readout line in response to a voltage of one electrode of the light receiving element, a second sensor transistor electrically connected between the first sensor transistor and the readout line, and a third sensor transistor electrically connected between the first additional line and the one electrode of the light receiving element, and including a gate electrode connected to a reset control line. Each of the first sensor transistor and the second sensor transistor may include a first type semiconductor. The third sensor transistor may include a second type semiconductor that is different from the first type semiconductor.

Each of the first sensor transistor and the second sensor transistor may include a silicon semiconductor. The third sensor transistor may include an oxide semiconductor.

The display device may include a substrate, a first insulating layer, a second insulating layer, a third insulating layer, a fourth insulating layer, a fifth insulating layer, a sixth insulating layer, a seventh insulating layer, an eighth insulating layer, and a ninth insulating layer disposed sequentially on the substrate. A first additional layer may be disposed between the substrate and the first insulating layer. A second additional layer may be disposed between the first insulating layer and the second insulating layer. A third additional layer may be disposed between the second insulating layer and the third insulating layer. A fourth additional layer may be disposed between the third insulating layer and the fourth insulating layer. A fifth additional layer may be disposed between the fourth insulating layer and the fifth insulating layer. A sixth additional layer may be disposed between the fifth insulating layer and the sixth insulating layer. A seventh additional layer may be disposed between the sixth insulating layer and the seventh insulating layer. An eighth additional layer may be disposed between the seventh insulating layer and the eighth insulating layer. A ninth additional layer may be disposed between the eighth insulating layer and the ninth insulating layer. The eighth additional layer may include the first additional line, the first data line, the second data line, and the third data line. The ninth additional layer may include the readout line.

A display device includes a first sub-pixel, a second sub-pixel, and a third sub-pixel, each arranged in a first direction, and each including a pixel circuit. A photo-sensing pixel includes a sensor circuit. A first data line extends in a second direction crossing the first direction, and electrically connects to the first sub-pixel. A second data line extends in the second direction, and electrically connects to the second sub-pixel. A third data line extends in the second direction, and electrically connects to the third sub-pixel. A readout line extends in the second direction, and electrically connects to the photo-sensing pixel. A first additional line extends in the second direction, and electrically connects to the photo-sensing pixel and is configured to receive a reset voltage. A second additional line electrically connects to each of the first sub-pixel, the second sub-pixel, and the third sub-pixel and is configured to receive a first driving voltage. The second additional line is disposed in a same layer as each of the first data line, the second data line, and the third data line. The readout line and the first additional line are disposed in a common layer. The readout line and the first additional line are disposed in a layer that is different from that of the first data line, the second data line, the third data line, and the second additional line.

The readout line may overlap the second additional line. The first additional line may be disposed between the second data line and the third data line and may be disposed on the second data line and the third data line.

The first additional line may include a horizontal line extending in the first direction, and a vertical line extending in the second direction. The horizontal line and the vertical line may form a mesh structure.

The readout line may be spaced apart from the horizontal line and the vertical line.

The photo-sensing pixel may be disposed between the first sub-pixel and the second sub-pixel.

An electronic device includes a processor configured to provide input image data to a display device and the display device configured to display an image based on the input image data. The display device includes a first sub-pixel, a second sub-pixel, and a third sub-pixel, each arranged in a first direction, and each including a pixel circuit. A photo-sensing pixel includes a sensor circuit. A first data line extends in a second direction crossing the first direction and is electrically connected to the first sub-pixel. A second data line extends in the second direction and is electrically connected to the second sub-pixel. A third data line extends in the second direction and is electrically connected to the third sub-pixel. A readout line extends in the second direction and is electrically connected to the photo-sensing pixel. A first additional line extends in the second direction and is electrically connected to the photo-sensing pixel and is configured to receive a reset voltage. The first additional line is disposed in a same layer as each of the first data line, the second data line, and the third data line. The readout line is disposed on a layer that is different from that of the first data line, the second data line, the third data line, and the first additional line.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
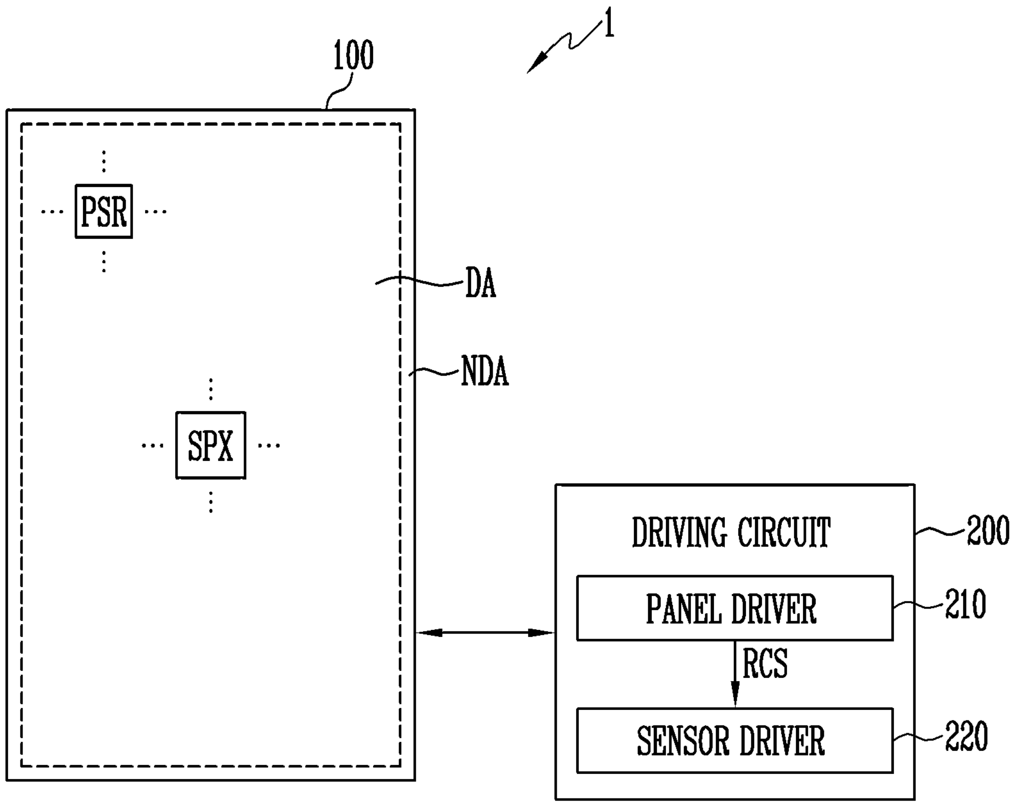
FIG. 1 is a schematic block diagram illustrating a display device in accordance with embodiments of the present disclosure.

As the present disclosure allows for various changes and numerous embodiments, particular embodiments will be illustrated in the drawings and described in detail in the written description. However, this is not necessarily intended to limit the present disclosure to particular modes of practice, and it is to be appreciated that all changes, equivalents, and substitutes that do not depart from the technical scope of the present disclosure are encompassed in the present disclosure.

Throughout the disclosure, like reference numerals may refer to like parts throughout the various figures and embodiments of the present disclosure. While each drawing may represent one or more particular embodiments of the present disclosure, drawn to scale, such that the relative lengths, thicknesses, and angles can be inferred therefrom, it is to be understood that the present invention is not necessarily limited to the relative lengths, thicknesses, and angles shown. Changes to these values may be made within the spirit and scope of the present disclosure, for example, to allow for manufacturing limitations and the like. It will be understood that, although the terms "first", "second", etc. may be used herein to describe various elements, these elements should not necessarily be limited by these terms. These terms are used to distinguish one element from another element. For instance, a first element discussed below could be termed a second element without departing from the teachings of the present disclosure. Similarly, the second element could also be termed the first element.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. Furthermore, in case that a first part such as a layer, a film, a region, or a plate is disposed on a second part, the first part may be not only directly on the second part but a third part may intervene between them. In addition, in case that it is expressed that a first part such as a layer, a film, a region, or a plate is formed on a second part, the surface of the second part on which the first part is formed is not necessarily limited to an upper surface of the second part but may include other surfaces such as a side surface or a lower surface of the second part. To the contrary, in case that a first part such as a layer, a film, a region, or a plate is under a second part, the first part may be not only directly under the second part but a third part may intervene between them.

Embodiments and required details of the present disclosure are described with reference to the accompanying drawings in order to describe the present disclosure in detail so that those having ordinary knowledge in the technical field to which the present disclosure pertains can easily practice the present disclosure. Furthermore, a singular form may include a plural form unless otherwise expressly provided.

FIG. 1 is a schematic block diagram illustrating a display device 1 in accordance with embodiments of the present disclosure.

Referring to FIG. 1, the display device 1 may include a display panel 100 and a driving circuit 200. In an embodiment, the driving circuit 200 may include a panel driver 210 and a sensor driver 220.

The display device 1 may be implemented as a self-emissive display device including a plurality of self-emissive elements. For example, the display device 1 may be an organic light emitting diode (OLED) display device including an organic light emitting element. However, the present disclosure is not necessarily limited to the aforementioned example, and the display device 1 may be implemented as a display device including an inorganic light emitting element, a display device including light emitting elements formed of a combination of inorganic material and organic material, a display device which uses quantum dots to display an image, or the like.

The display device 1 may be a flat display device, a flexible display device, a curved display device, a foldable display device, a bendable display device, or a rollable display device. Furthermore, the display device 1 may be applied to a transparent display device, a head-mounted display device, a wearable display device, or the like.

The display panel 100 may include a display area DA and a non-display area NDA. The display area DA may be an area in which a sub-pixel SPX (or a pixel) is provided. The sub-pixel SPX may include at least one light emitting element. For example, the light emitting element may include a light emitting layer (e.g., an organic light emitting layer). A portion which may be emitted by the light emitting element may be defined as an emission area. The display device 1 may drive the sub-pixel SPX in response to image data, thus displaying an image in the display area DA.

The non-display area NDA may be an area provided around the display area DA. For example, the non-display area NDA may at least partially surround the display area DA. In an embodiment, the non-display area NDA may comprehensively refer to a remaining area on the display panel 100 other than the display area DA. For example, the non-display area NDA may include a line area, a pad area, and various dummy areas.

A photo-sensing pixel PSR may be included in the display area DA. The photo-sensing pixel PSR may be referred to as a photo sensor. The photo-sensing pixel PSR may include a light receiving element including a light receiving layer. In the display area DA, the light receiving layer of the light receiving element may be spaced apart from the light emitting layer of the light emitting element.

A plurality of photo-sensing pixels PSR may be distributed to be spaced apart from each other in the overall area of the display area DA. However, the present disclosure is not necessarily limited to the aforementioned example, and only one area of the display area DA may be set to a sensing area, and the photo-sensing pixels PSR may be provided in the corresponding sensing area. Furthermore, the photo-sensing pixels PSR may also be provided in at least a portion of the non-display area NDA.

The photo-sensing pixel PSR may sense light emitted from a light source (e.g., the light emitting element of the sub-pixel SPX) and reflected by an external object (e.g., the finger of a user). For example, the fingerprint of the user may be sensed by the photo-sensing pixel PSR. Although, in the following, the photo-sensing pixel PSR will be described as being used for fingerprint sensing by way of example, in various embodiments, the photo-sensing pixel PSR is capable of sensing various types of biometric information such as iris information or vein information.

The driving circuit 200 may include a panel driver 210 and a sensor driver 220. The panel driver 210 and the sensor driver 220 may be implemented as integrated circuits independent from each other. In an embodiment, the driving circuit 200 may be implemented as a single integrated circuit. In this case, at least a portion of the senor driver 220 may be included in the panel driver 210 or be interlocked with the panel driver 210.

The panel driver 210 may scan the sub-pixel SPX in the display area DA, and supply a data signal corresponding to image data (or an image) to the sub-pixel SPX. The display panel 100 may display an image corresponding to the data signal.

The panel driver 210 may supply a driving signal for light sensing (e.g., fingerprint sensing) to the sub-pixel SPX. The driving signal may be provided to cause the sub-pixel SPX to emit light and operate as a light source for the photo-sensing pixel PSR. The panel driver 210 may also supply the driving signal and/or driving signals for light sensing to the photo-sensing pixel PSR. However, the present disclosure is not necessarily limited to the aforementioned example. Driving signals for light sensing may be supplied to the photo-sensing pixel PSR by the sensor driver 220.

The sensor driver 220 may detect biometric information related to the fingerprint of the user or the like, based on a sensing signal received from the photo-sensing pixel PSR. In an embodiment, the sensor driver 220 may supply the driving signals to the photo-sensing pixel PSR and/or the sub-pixel SPX.

The panel driver 210 may provide a readout control signal RCS to the sensor driver 220. Interlocking with the panel driver 210, the sensor driver 220 may read out (or sample) a sensing signal, based on the readout control signal RCS. For example, the sensor driver 220 may read out or sample the sensing signal in the unit of at least one pixel row (or a horizontal line) in response to the readout control signal RCS.

Figure 2:
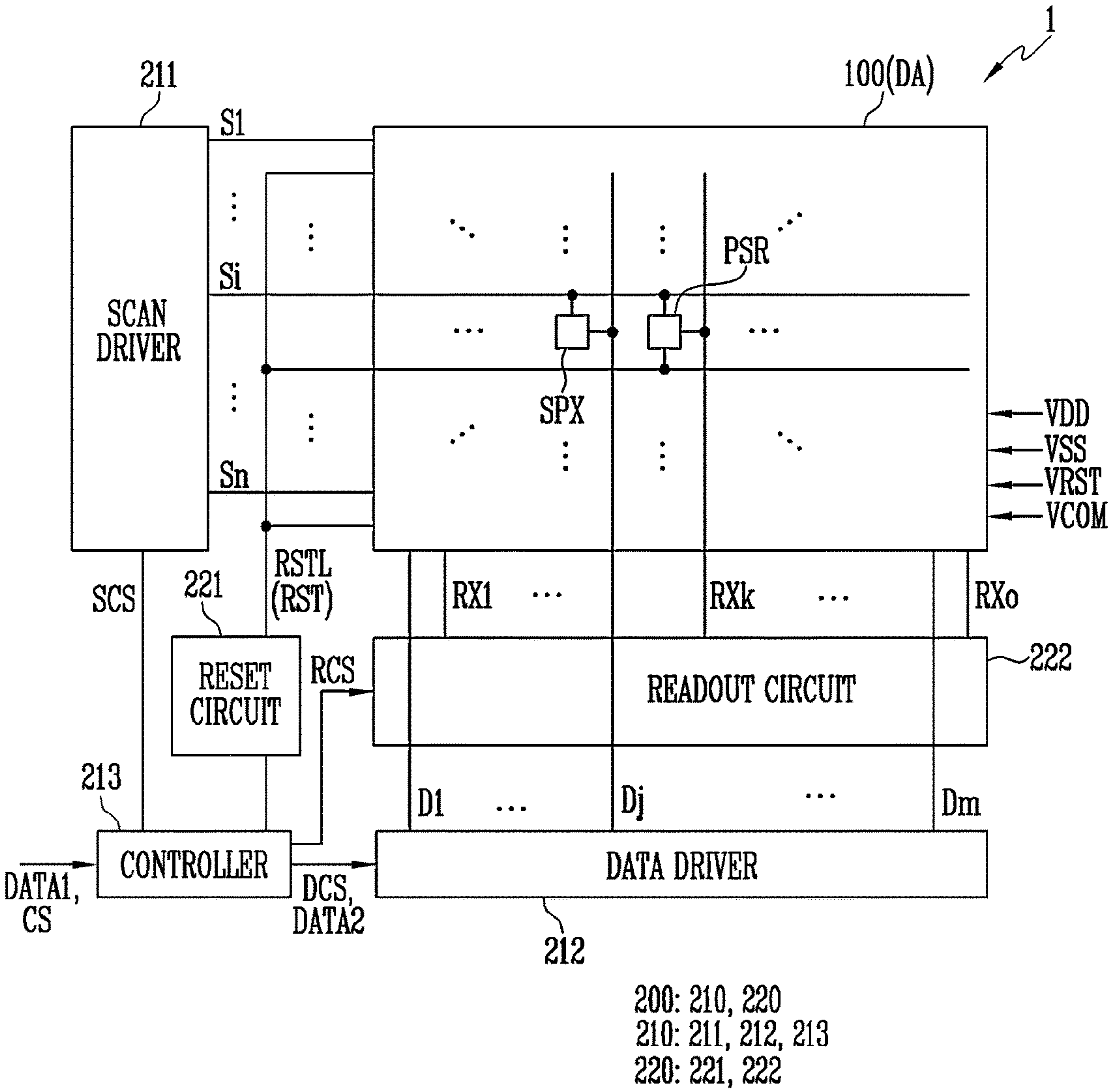
FIG. 2 is a schematic block diagram illustrating an embodiment of the display device of FIG. 1.

FIG. 2 is a schematic block diagram illustrating an embodiment of the display device 1 of FIG. 1.

Referring to FIGS. 1 and 2, the display device 1 may include the display panel 100 and the driving circuit 200.

The display panel 100 may include signal lines, the sub-pixel SPX, and the photo-sensing pixel PSR. The signal lines may include scan lines S1 to Sn, data lines D1 to Dm, readout lines RX1 to RXo, and a reset line RSTL (or a reset control line). Here, n, m, and o may each be positive integers.

The sub-pixel SPX may be disposed or positioned in an area (e.g., a pixel area) defined by the scan lines S1 to Sn and the data lines D1 to Dm. The photo-sensing pixel PSR may be disposed or positioned in an area defined by the scan lines S1 to Sn and the readout lines RX1 to RXo. The sub-pixel SPX and the photo-sensing pixel PSR may be arranged in a two-dimensional array in the display area DA of the display panel 100, but the present disclosure is not necessarily limited thereto.

The sub-pixel SPX may be electrically connected to at least one of the scan lines S1 to Sn and one of the data lines D1 to Dm. The photo-sensing pixel PSR may be electrically connected to one of the scan lines S1 to Sn, one of the readout lines RX1 to RXo, and the reset line RSTL. The connection configuration between the sub-pixel SPX, the photo-sensing pixel PSR, and the signals will be described below with reference to FIG. 6.

Power voltages VDD, VSS, VRST, and VCOM needed to drive the sub-pixel SPX and the photo-sensing pixel PSR may be provided to the display panel 100. The power voltages VDD, VSS, VRST, and VCOM may be provided from a power supply. The power supply may be implemented as a power management IC (PMIC).

The driving circuit 200 may include a scan driver 211, a data driver 212, a controller 213, a reset circuit 221, and a readout circuit 222. For example, the scan driver 211, the data driver 212, and the controller 213 may be included in the panel driver 210. The reset circuit 221 and the readout circuit 222 may be included in the sensor driver 220. However, the present disclosure is not necessarily limited thereto. In an embodiment, the reset circuit 221 may be included in the panel driver 210.

The scan driver 211 may be electrically connected to the sub-pixel SPX and the photo-sensing pixel PSR by the scan lines S1 to Sn. The scan driver 211 may generate scan signals based on a scan control signal SCS, and supply the scan signals to the scan lines S1 to Sn. The scan control signal SCS may include a start signal, a clock signal, and the like, and may be provided from the controller 213 to the scan driver 211. For example, the scan driver 211 may be implemented as a shift register configured to sequentially shift a pulse-type start signal based on clock signals and generate scan signals and output the generated scan signals to the scan lines S1 to Sn. The scan driver 211 may selectively drive the sub-pixel SPX and the photo-sensing pixel PSR while scanning the display panel 100.

Although the scan driver 211 may be formed along with the sub-pixel SPX of the display panel 100, the present disclosure is not necessarily limited thereto. In an embodiment, the scan driver 211 may be implemented as an integrated circuit.

The sub-pixel SPX that is selectively driven by the scan driver 211 may emit light at a luminance corresponding to a data signal provided to a corresponding data line among the data lines D1 to Dm. The photo-sensing pixel PSR that is selectively driven by the scan driver 211 may output an electrical signal (e.g., a sensing signal) corresponding to sensed light to a corresponding readout line. For example, the sub-pixel SPX that is selectively driven through an i-th scan line Si may emit light at a luminance corresponding to a data signal supplied to a j-th data line Dj (here, i and j each are positive integers). For example, the photo-sensing pixel PSR that is selectively driven through the i-th scan line Si may output an electrical signal corresponding to the sensed light to a k-th readout line RXk (here, k is a positive integer).

The data driver 212 may generate a data signal (or a data voltage) based on image data DATA2 and a data control signal DCS that are provided from the controller 213, and supply the data signal to the display panel 100 (or the sub-pixel SPX) through the data lines D1 to Dm. The data control signal DCS may be a signal for controlling the operation of the data driver 212, and include a data enable signal (or a load signal) for instructing a valid data signal to be outputted, a horizontal start signal, a data clock signal, and the like. For example, the data driver 212 may include a shift register configured to shift a horizontal start signal in synchronization with the data clock signal and generate a sampling signal, a latch configured to latch the image data DATA2 in response to the sampling signal, a digital-analog converter (or a decoder) configured to convert the latched image data (e.g., digital data) to an analog data signal, and a buffer (or an amplifier) configured to output the data signal to the corresponding data line (e.g., the j-th data line Dj).

The controller 213 may receive input image data DATA1 and a control signal CS from an external device (e.g., a graphic processor, an application processor, or a first processor), generate a scan control signal SCS and a data control signal DCS based on the control signal CS, and generate image data DATA2 by converting the input image data DATA1. Here, the control signal CS may include a vertical synchronization signal, a horizontal synchronization signal, a reference clock signal, and the like. The vertical synchronization signal may refer to a start of frame data (i.e., data corresponding to a frame period in which one frame image is displayed). The horizontal synchronization signal may refer to a start of a data row (i.e., one data row among a plurality of data rows included in the frame data). The controller 213 may convert the input image data DATA1 into the image data DATA2 having a format corresponding to pixel arrangement in the display panel 100.

Furthermore, the controller 213 may generate a reset control signal and a readout control signal RCS, based on the control signal CS.

The reset circuit 221 may be connected in common to all photo-sensing pixels PSR provided in the display panel 100 through one reset line RSTL. The reset circuit 221 may simultaneously provide a reset signal RST to all of the photo-sensing pixels PSR in response to the reset control signal. Because the reset signal RST is simultaneously provided to all of the photo-sensing pixels PSR, the reset signal RST may be referred to as a global reset signal.

The readout circuit 222 may receive sensing signals from the photo-sensing pixels PSR through the readout lines RX1 to RXo, and perform a signal processing operation for the sensing signals.

For example, the readout circuit 222 may perform a correlated double sampling (CDS) operation to remove a noise from the sensing signals provided from the photo-sensing pixels PSR. A timing of the CDS operation of the readout circuit 222 may be determined by the readout control signal RCS. The readout circuit 222 may convert an analog sensing signal into a digital signal (or a digital value). The configuration for the CDS operation and the analog-digital conversion may be provided for each of the readout lines RX1 to RXo. The readout circuit 222 may process in parallel the sensing signals provided from the readout lines RX1 to RXo.

The processed sensing signals, i.e., the readout sensing signal, may be transmitted to an external device (e.g., an application processor) as a piece of sensing data (or biometric information), so that biometric authentication (e.g., fingerprint authentication or the like) may be performed based on the sensing data. In an embodiment, the readout sensing signals may be supplied to the controller 213, so that biometric authentication may be performed in the controller 213.

Figure 3:
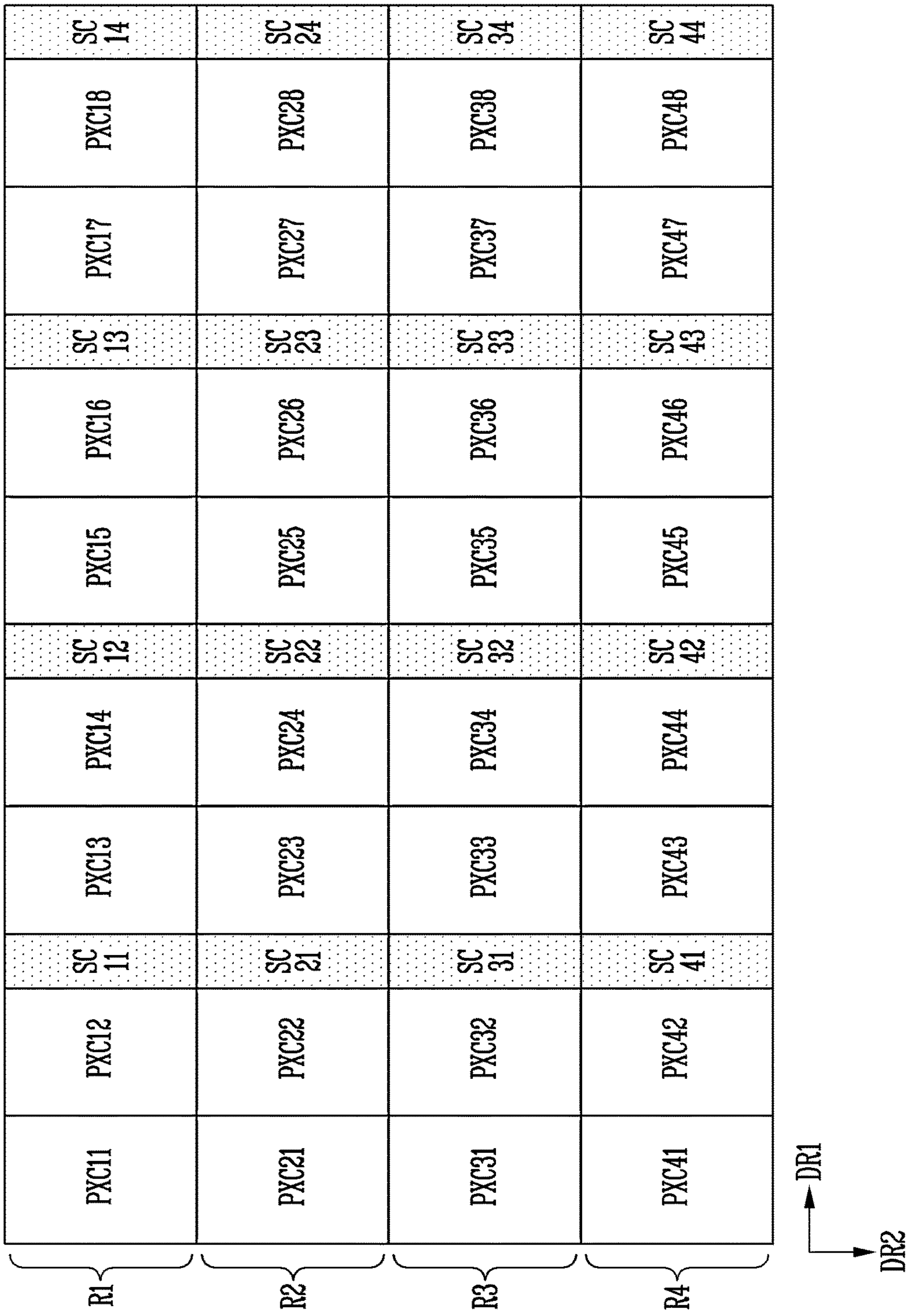
FIG. 3 is a schematic diagram illustrating an example of arrangement of pixels circuits and sensing circuits in a display area of a display panel included in the display device of FIG. 2.
Figure 4:
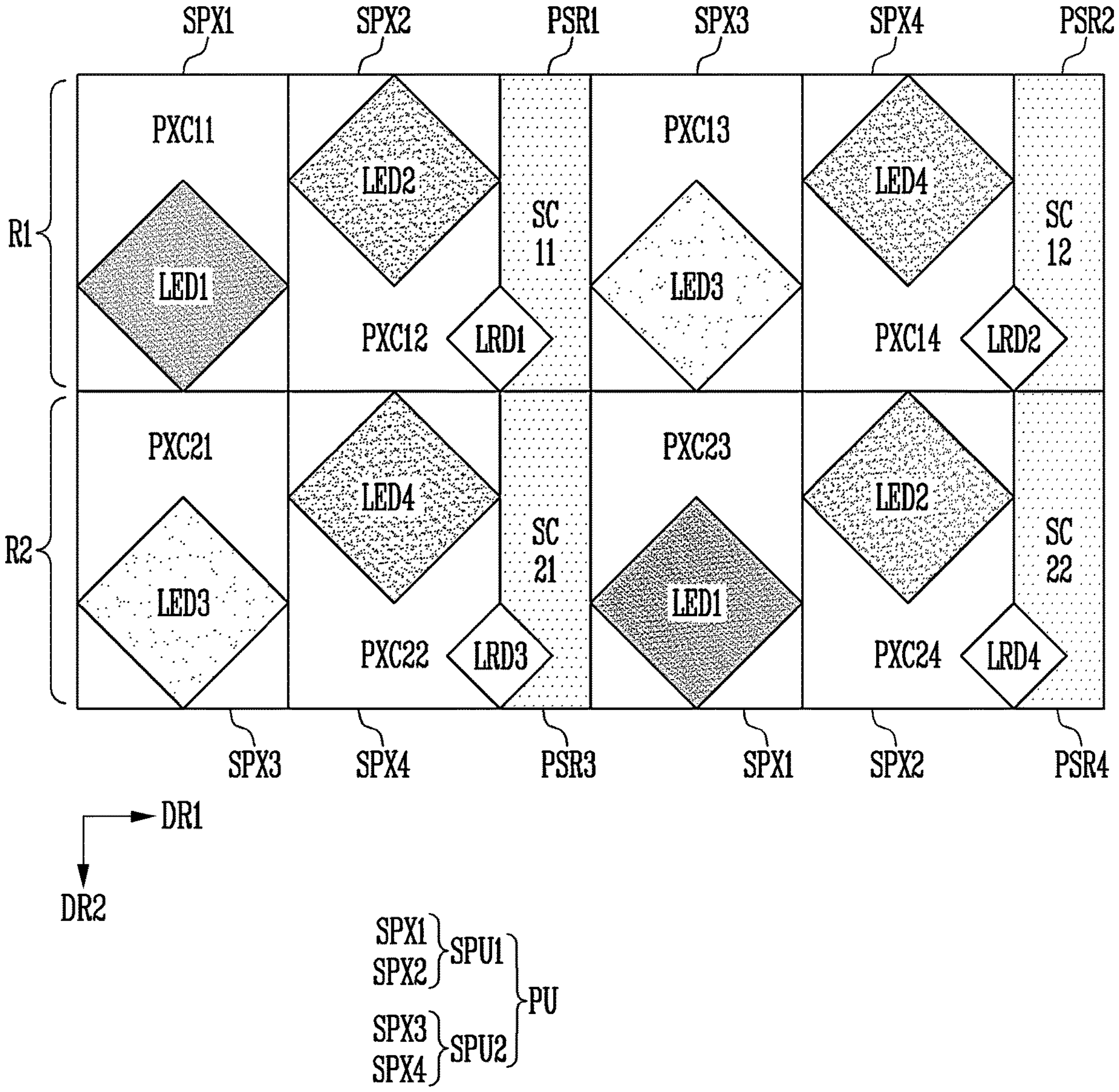
FIG. 4 is a schematic diagram illustrating an example of the display area of the display panel included in the display device of FIG. 2.
Figure 5A:
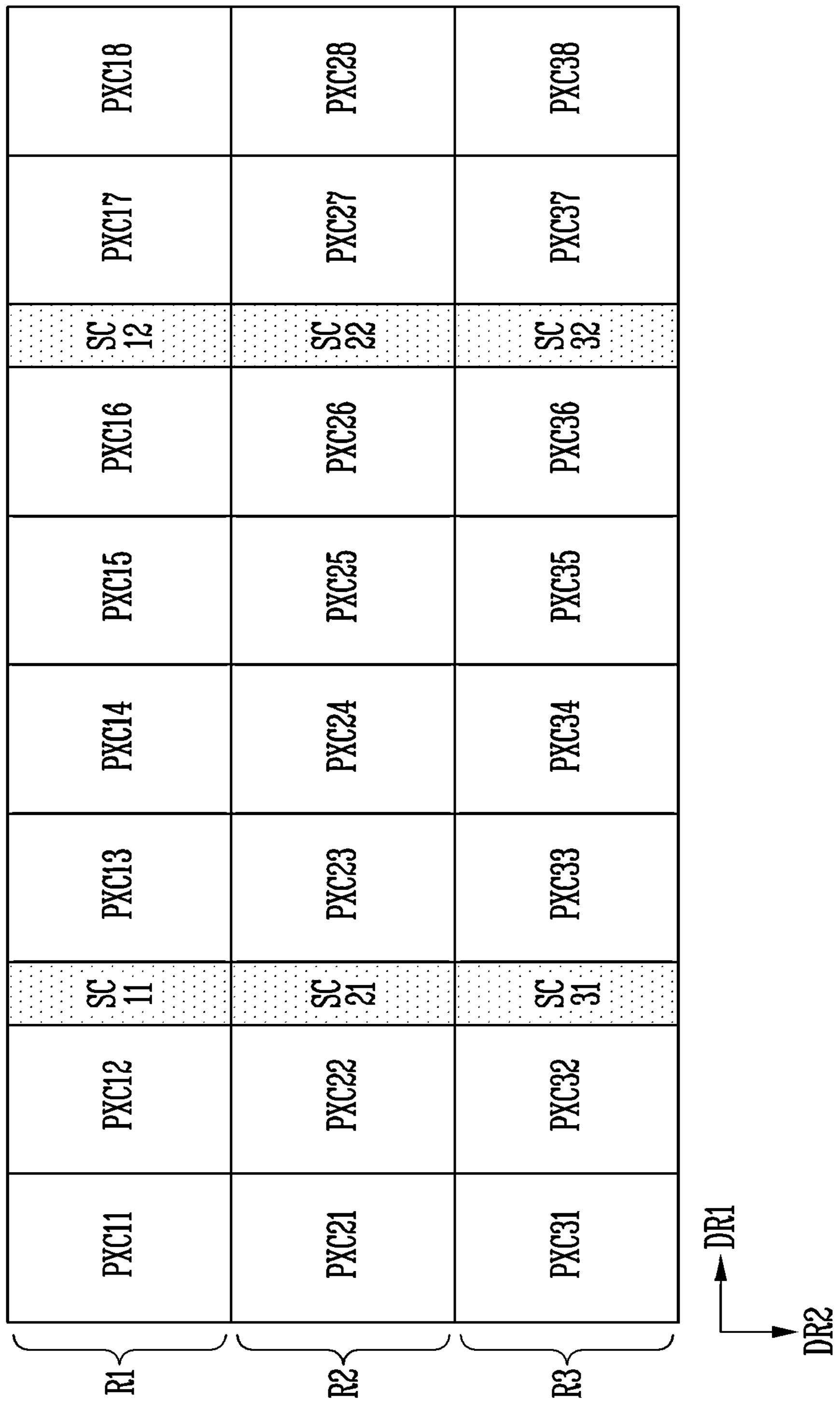
FIGS. 5A to 5C are schematic plan views illustrating one area of the display area included in the display device in accordance with an embodiment.
Figure 5B:
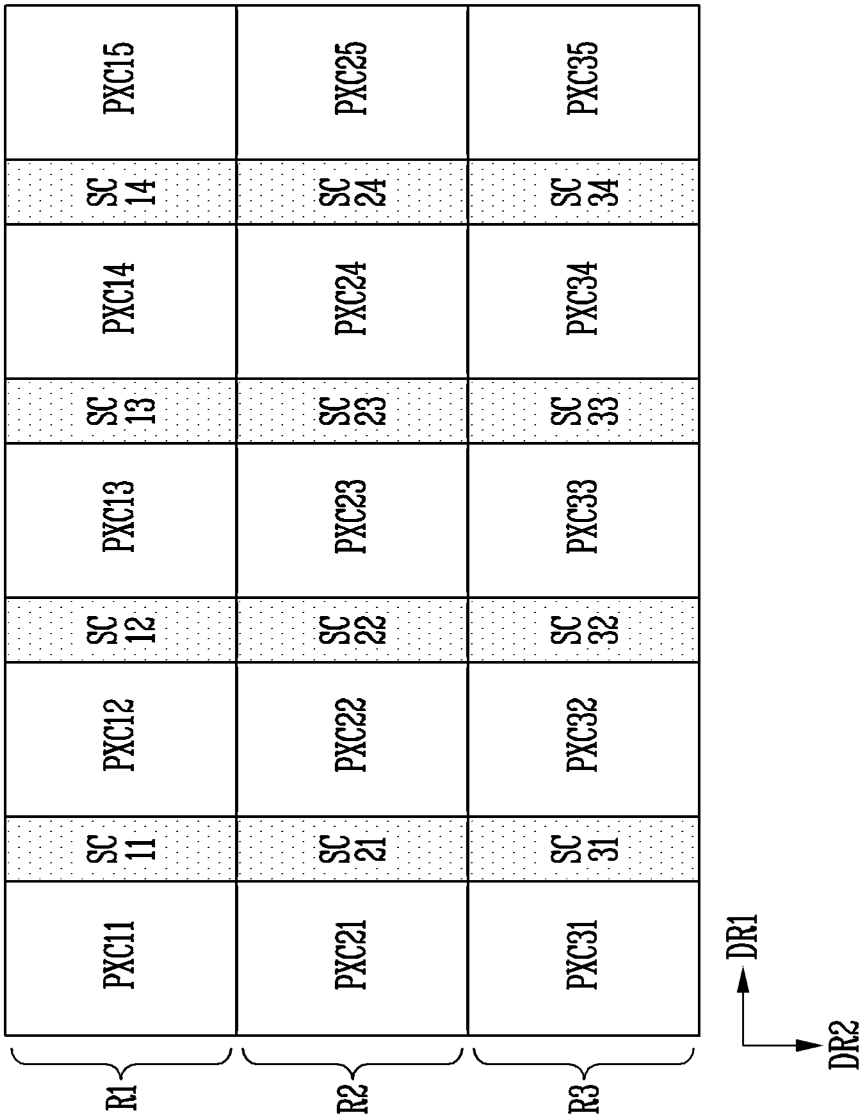
Figure 5C:
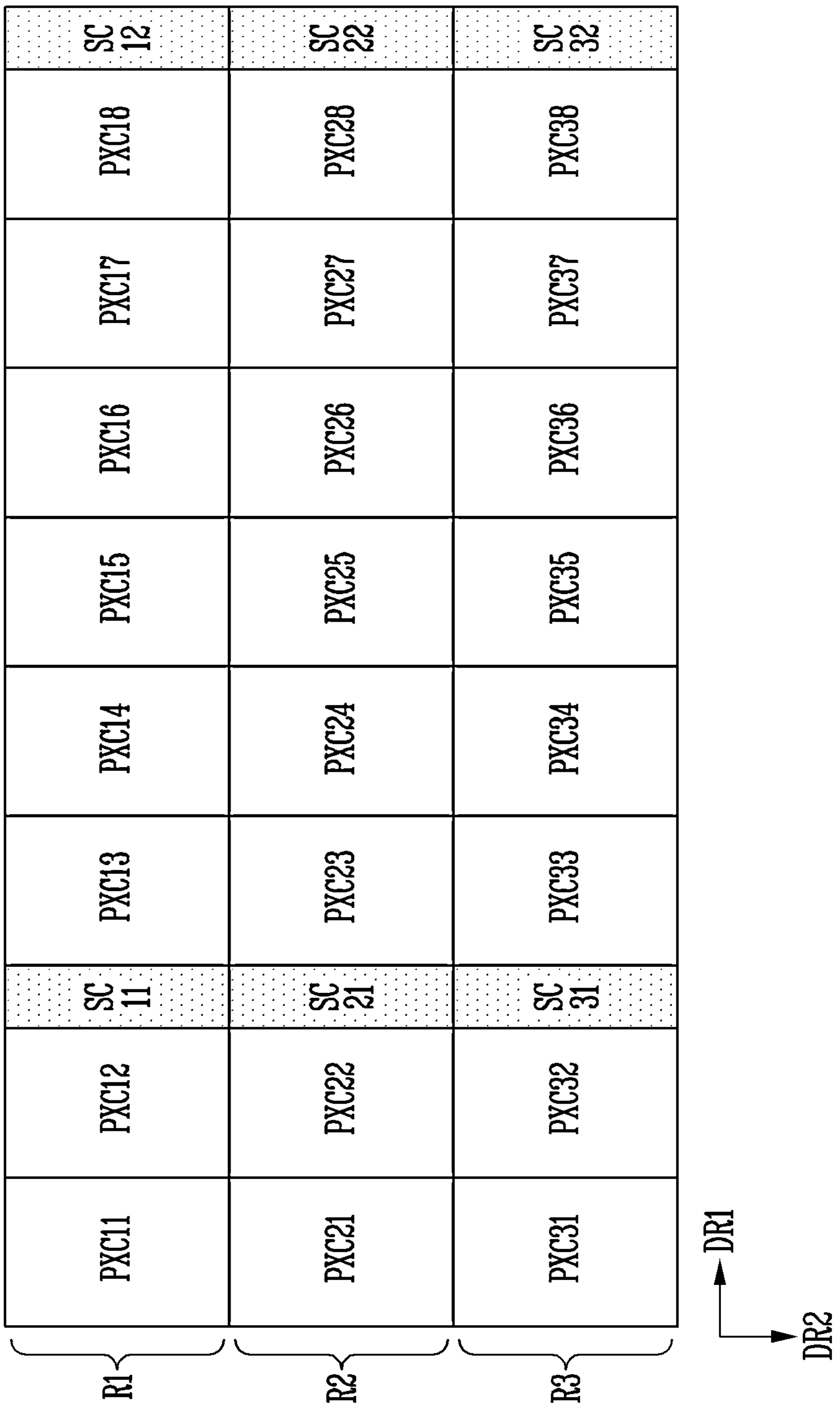

FIG. 3 is a schematic diagram illustrating an example of arrangement of pixel circuits and sensing circuits in the display area DA of the display panel 100 included in the display device 1 of FIG. 2. FIG. 4 is a schematic diagram illustrating an example of the display area DA of the display panel 100 included in the display device 1 of FIG. 2. FIGS. 5A to 5C are schematic plan views illustrating one area of the display area DA included in the display device 1 in accordance with an embodiment.

The embodiments of FIGS. 5A to 5C refer to modifications of the embodiment of FIG. 3 with regard to the number of pixel circuits that are disposed between two sensor circuits adjacent to each other, and the like.

Referring to FIGS. 1 to 5B, sub-pixels SPX1 to SPX4 and a plurality of photo-sensing pixels PSR may be disposed in the display area DA of the display panel 100.

The display area DA may be divided into pixel rows R1 to R4. Each of the pixel rows R1 to R4 may extend in a first direction DR1, and may be arranged in a second direction DR2. Each of the pixel rows R1 to R4 may include sub-pixels SPX1 to SPX4. Each of the sub-pixels SPX1 to SPX4 may include one of pixel circuits PXC11 to PXC48 and one of light emitting elements LED1 to LED4.

In an embodiment, the first sub-pixel SPX1, the second sub-pixel SPX2, and the third sub-pixel SPX3 may respectively emit light of a first color, light of a second color, and light of a third color. The light of the first color, the light of the second color, and the light of the third color may be light of different colors. Each of the light of the first color, the light of the second color, and the light of the third color may be one of red light, green light, and blue light. A first light emitting element LED1 configured to emit light of the first light may be positioned in the first sub-pixel SPX1. A second light emitting element LED2 configured to emit light of the second light may be positioned in the second sub-pixel SPX2. A third light emitting element LED3 configured to emit light of the third light may be positioned in the third sub-pixel SPX3. A fourth light emitting element LED4 configured to emit light of the second light may be positioned in the fourth sub-pixel SPX4. The second light emitting element LED2 and the fourth light emitting element LED4 may emit light of the same color.

In FIG. 4, each of the light emitting elements LED1 to LED4 may be understood as an emission area corresponding to a light emitting layer. However, the foregoing is provided for convenience of explanation, and the color of light emitted from each of the light emitting elements LED1 to LED4, or the position, surface area, shape, or the like of each of the light emitting elements LED1 to LED4 is not necessarily limited thereto.

In an embodiment, on each of odd-numbered pixel rows including the first pixel row R1 (or a first horizontal line) and the third pixel row R3 (or a third horizontal line), the sub-pixels SPX1 to SPX4 may be arranged in the first direction DR1 in a sequence of the first sub-pixel SPX1 configured to emit red light, the second sub-pixel SPX2 configured to emit green light, the third sub-pixel SPX3 configured to emit blue light, and the fourth sub-pixel SPX4 configured to emit green light.

On each of even-numbered pixel rows including the second pixel row R2 (or a second horizontal line) and the fourth pixel row R4 (or a fourth horizontal line), the sub-pixels SPX1 to SPX4 may be arranged in the first direction DR1 in a sequence of the third sub-pixel SPX3, the fourth sub-pixel SPX4, the first sub-pixel SPX1, and the second sub-pixel SPX2. In an embodiment, the first sub-pixel SPX1 and the second sub-pixel SPX2 may form a first sub-pixel unit SPU1. The third sub-pixel SPX3 and the fourth sub-pixel SPX4 may form a second sub-pixel unit SPU2. On each of the odd-numbered pixel rows R1 and R3, the first sub-pixel units SPU1 and the second sub-pixel units SPU2 may be alternately disposed. On each of the even-numbered pixel rows R2 and R4, the second sub-pixel units SPU2 and the first sub-pixel units SPU1 may be alternately disposed in a manner opposite to that of the odd-numbered pixel rows R1 and R3.

The first and second sub-pixel units SPU1 and SPU2 that are adjacent to each other may be understood as constituting one pixel unit PU. For example, FIG. 4 illustrates the pixel unit PU on each of the first pixel row R1 and the second pixel row R2. The present disclosure is not necessarily limited to the aforementioned example, and the arrangement of the sub-pixels SPX1 to SPX4 may be changed in various ways.

On the first pixel row R1, the pixel circuits PXC11 to PXC18 that respectively correspond to the sub-pixels SPX1 to SPX4 of the first pixel row R1 may be arranged in the first direction DR1. On the second pixel row R2, the pixel circuits PXC21 to PXC28 that respectively correspond to the sub-pixels SPX1 to SPX4 of the second pixel row R2 may be arranged in the first direction DR1. On the third pixel row R3, the pixel circuits PXC31 to PXC38 that respectively correspond to the sub-pixels SPX1 to SPX4 of the third pixel row R3 may be arranged in the first direction DR1. On the fourth pixel row R4, the pixel circuits PXC41 to PXC48 that respectively correspond to the sub-pixels SPX1 to SPX4 of the fourth pixel row R4 may be arranged in the first direction DR1.

In FIG. 3, the first, second, third, and fourth pixel circuits PXC11, PXC12, PXC13, and PXC14 of the first pixel row R1 may be included in one pixel unit PU, and the fifth, sixth, seventh, and eighth pixel circuits PXC15, PXC16, PXC17, and PXC18 of the first pixel row R1 may be included in another pixel unit PU.

Likewise, the first to fourth pixel circuits PXC21 to PXC24 of the second pixel row R2, the fifth to eighth pixel circuits PXC25 to PXC28 of the second pixel row R2, the first to fourth pixel circuits PXC31 to PXC34 of the third pixel row R3, the fifth to eighth pixel circuits PXC35 to PXC38 of the third pixel row R3, the first to fourth pixel circuits PXC41 to PXC44 of the fourth pixel row R4, and the fifth to eighth pixel circuits PXC45 to PXC48 of the fourth pixel row R4 may also be included in respective different pixel units PU.

In an embodiment, each of the pixel rows R1 to R4 may include light receiving elements LRD1 to LRD4. In FIG. 4, it can be understood that each of the light receiving elements LRD1 to LRD4 is a light receiving area corresponding to the light receiving layer. However, the aforementioned example is provided for convenience of explanation, and the positions, the surface areas, the shapes, or the like of the light receiving elements LRD1 to LRD4 may be changed in various ways.

Each of the light receiving elements LRD1 and LRD2 of the first pixel row R1 may overlap at least some of the pixel circuits PXC11 to PXC14 of the first pixel row R1 and the sensor circuits SC11 and SC12 of the first pixel row R1. Each of the light receiving elements LRD3 and LRD4 of the second pixel row R2 may overlap at least some of the pixel circuits PXC21 to PXC24 of the second pixel row R2 and the sensor circuits SC21 and SC22 of the second pixel row R2.

In an embodiment, the first light receiving element LRD1 may overlap at least a portion of the first sensor circuit SC11 of the first pixel row R1. The third light receiving element LRD3 may overlap at least a portion of the first sensor circuit SC21 of the second pixel row R2.

Furthermore, the second light receiving element LRD2 may overlap at least a portion of the second sensor circuit SC12 of the first pixel row R1. The fourth light receiving element LRD4 may overlap at least a portion of the second sensor circuit SC22 of the second pixel row R2.

The light receiving elements LRD1 to LRD4 may be formed in the display area AA in an arrangement as shown in FIG. 4.

In an embodiment, the sensor circuits SC11 to SC44 may be electrically connected to corresponding light receiving elements. The first sensor circuit SC11 of the first pixel row R1 may be electrically connected to the first light receiving element LRD1, thus forming a first photo-sensing pixel PSR1. For example, the first sensor circuit SC11 and the first light receiving element LRD1 may form the first photo-sensing pixel PSR1. The second sensor circuit SC21 of the first pixel row R1 may be electrically connected to the second light receiving element LRD2, thus forming a second photo-sensing pixel PSR2. For example, the second sensor circuit SC21 and the second light receiving element LRD2 may form the second photo-sensing pixel PSR2. The first sensor circuit SC21 of the second pixel row R2 may be electrically connected to the third light receiving element LRD3, thus forming a third photo-sensing pixel PSR3. For example, the first sensor circuit SC21 and the third light receiving element LRD3 may form the third photo-sensing pixel PSR3. The second sensor circuit SC22 of the second pixel row R2 may be electrically connected to the fourth light receiving element LRD4, thus forming a fourth photo-sensing pixel PSR4. For example, the second sensor circuit SC22 and the fourth light receiving element LRD4 may form the fourth photo-sensing pixel PSR4. However, the present disclosure is not necessarily limited to the aforementioned example. In an embodiment, only some of the sensor circuits SC11 to SC44 may be provided, and the some may be connected to a plurality of light receiving elements.

The first sensor circuit SC11 of the first pixel row R1 may be disposed between the first sub-pixel unit SPU1 and the second sub-pixel unit SPU2 included in the pixel unit PU. For example, the first and second pixel circuits PXC11 and PXC12 of the first pixel row R1 may be included in the first sub-pixel unit SPU1. The third and fourth pixel circuits PXC13 and PXC14 of the first pixel row R1 may be included in the second sub-pixel unit SPU2. Therefore, at least two pixel circuits (e.g., PXC13 and PXC14) may be disposed between the first sensor circuit SC11 and the second sensor circuit SC12 that are adjacent to each other on the first pixel row R1.

The second sensor circuit SC12 of the first pixel row R1, the first sensor circuit SC21 of the second pixel row R2, and the second sensor circuit SC22 of the second pixel row R2 may be disposed between the first sub-pixel unit SPU1 and the second sub-pixel unit SPU2 in a manner similar to that of the first sensor circuit SC11 of the first pixel row R1. The arrangement of the sensor circuits SC11 to SC44 is not necessarily limited to the aforementioned example. In an embodiment, as illustrated in FIG. 5A, four pixel circuits, e.g., the third pixel circuit PXC13, the fourth pixel circuit PXC14, the fifth pixel circuit PXC15, and the sixth pixel circuit PXC16 may be disposed between the first sensor circuit SC11 and the second sensor circuit SC12 adjacent to each other on the first pixel row R1. In an embodiment, as illustrated in FIG. 5B, one pixel circuit, e.g., the second pixel circuit PXC12, may be disposed between the first sensor circuit SC11 and the second sensor circuit SC12 that are adjacent to each other on the first pixel row R1. In an embodiment, as illustrated in FIG. 5C, six pixel circuits, e.g., the third pixel circuit PXC13, the fourth pixel circuit PXC14, the fifth pixel circuit PXC15, the sixth pixel circuit PXC16, the seventh pixel circuit PXC17, and the eighth pixel circuit PX18, may be disposed between the first sensor circuit SC11 and the second sensor circuit SC12 adjacent to each other on the first pixel row R1.

Figure 6:
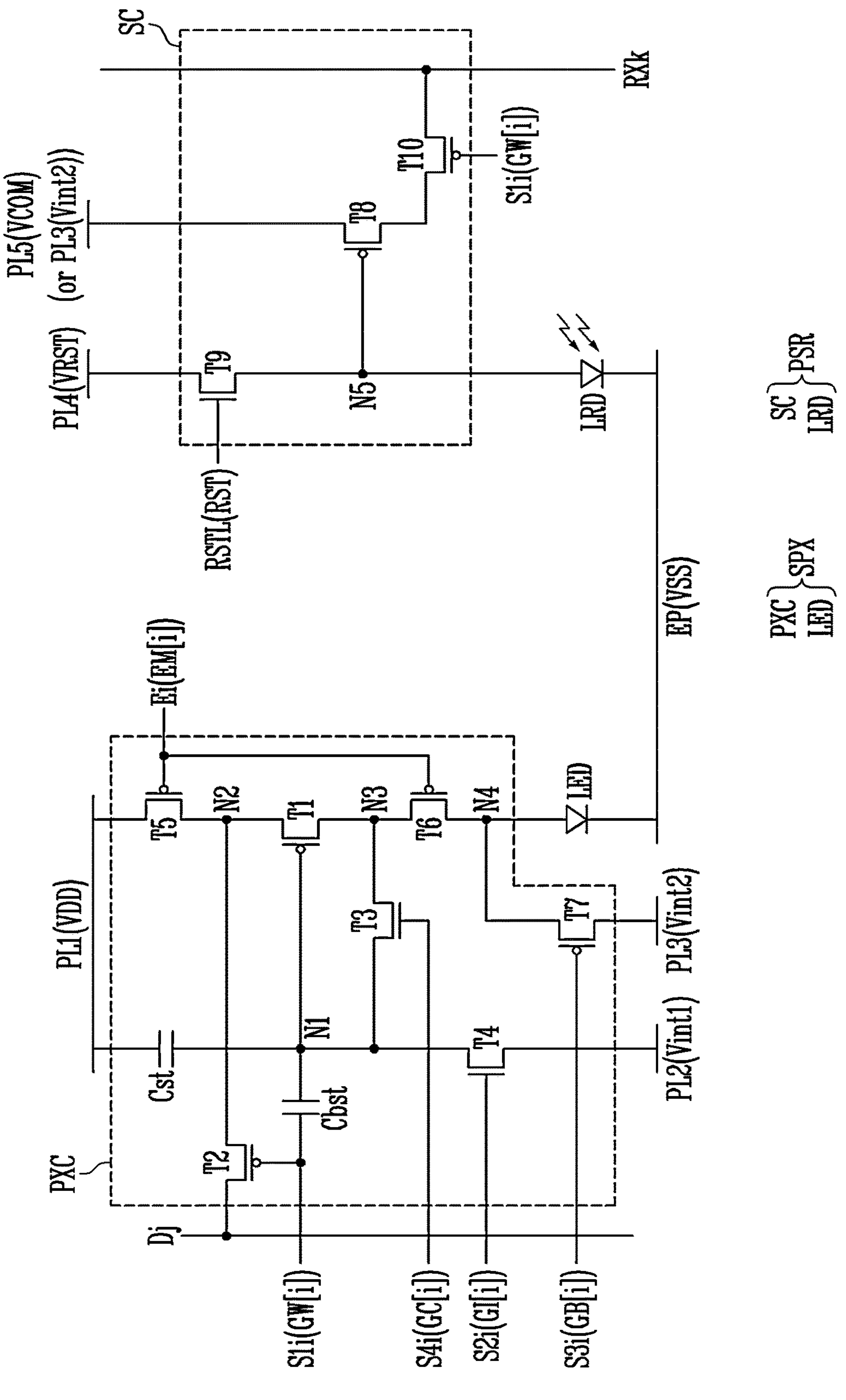
FIG. 6 is a schematic circuit diagram illustrating an example of a sub-pixel and a photo-sensing pixel which are included in the display area of FIG. 1.

FIG. 6 is a schematic circuit diagram illustrating an example of the sub-pixel SPX and the photo-sensing pixel PSR that are included in the display area of FIG. 1. For convenience of description, FIG. 6 illustrates the sub-pixel SPX that is positioned on the i-th horizontal line (or the i-th pixel row) and connected to the j-th data line Dj.

Referring to FIGS. 1 and 6, the sub-pixel SPX and the photo-sensing pixel PSR may be disposed on the i-th horizontal line.

The sub-pixel SPX may include a light emitting element LED and a pixel circuit PXC. In an embodiment, the pixel circuit PXC may include first, second, third, fourth, fifth, sixth, and seventh transistors T1, T2, T3, T4, T5, T6, and T7, a storage capacitor Cst, and a boost capacitor Cbst.

The first transistor T1 (or a driving transistor) may be connected between a first power line PL1 and a first electrode (or an anode electrode) of the light emitting element LED. The first transistor T1 may include a gate electrode electrically connected to a first node N1. The first transistor T1 may control, based on the voltage of the first node N1, the amount of current (or driving current) flowing from the first power line PL1 to an electrode EP (or a power line) via the light emitting element LED. A first power voltage VDD may be supplied to the first power line PL1. A second power voltage VSS may be supplied to the electrode EP. The first power voltage VDD may be set to a voltage higher than the second power voltage VSS.

The second transistor T2 may be electrically connected between the j-th data line Dj and a second node N2. A gate electrode of the second transistor T2 may be connected to a 1i-th scan line S1*i* (or a first scan line). In case that a first scan signal GW[i] (e.g., a first scan signal of a low level) is supplied to the 1i-th scan line S1*i*, the second transistor T2 may be turned on to electrically connect the j-th data line Dj to the second node N2. In the case where each of the first transistor T1 and the third transistor T3 is turned on, the second transistor T2 may transmit a data signal of the j-th data line Dj to the second node N2 in response to the first scan signal GW[i].

The third transistor T3 may be electrically connected between the first node N1 and a third node N3. A gate electrode of the third transistor T3 may be electrically connected to a 4i-th scan line S4*i* (or a third scan line). The third transistor T3 may be turned on in case that a fourth scan signal GC[i] is supplied to the 4i-th scan line S4*i*. If the third transistor T3 is turned on, the first transistor T1 may have a diode-connected form.

The fourth transistor T4 may be electrically connected between the first node N1 and a second power line PL2. A gate electrode of the fourth transistor T4 may be electrically connected to a 2i-th scan line S2*i* (or a second scan line). A first initialization power voltage Vint may be provided to the second power line PL2. The fourth transistor T4 may be turned on by a second scan signal GI[i] supplied to the 2i-th scan line S2*i*. If the fourth transistor T4 is turned on, the first initialization power voltage Vint may be supplied to the first node N1 (i.e., the gate electrode of the first transistor T1).

The fifth transistor T5 may be electrically connected between the first power line PL1 and the second node N2. A gate electrode of the fifth transistor T5 may be electrically connected to an i-th emission control line Ei. The sixth transistor T6 may be electrically connected between the third node N3 and the light emitting element LED (or a fourth node N4). A gate electrode of the sixth transistor T6 may be electrically connected to the i-th emission control line Ei. The fifth transistor T5 and the sixth transistor T6 may be turned off in case that an emission control signal EM [i] (e.g., an emission control signal EM [i] of a high level) is supplied to the i-th emission control line Ei, and may be turned on in the other cases.

The seventh transistor T7 may be electrically connected between the first electrode (i.e., the fourth node N4) of the light emitting element LED and a third power line PL3. A gate electrode of the seventh transistor T7 may be electrically connected to a 3i-th scan line S3*i*. A second initialization power voltage Vint2 may be provided to the third power line PL3. In an embodiment, the second initialization power voltage Vint2 may differ from the first initialization power voltage Vint1. The seventh transistor T7 may be turned on by a third scan signal GB[i] supplied to the 3i-th scan line S3*i* to supply the second initialization power voltage Vint2 to the first electrode of the light emitting element LD.

The storage capacitor Cst may be connected or formed between the first power line PL1 and the first node N1.

The boost capacitor Cost (or a capacitor) may be connected or formed between the gate electrode of the second transistor T2 and the gate electrode of the first transistor T1.

The photo-sensing pixel PSR may include a sensor circuit SC and a light receiving element LRD. The sensor circuit SC may include eighth, ninth, and tenth transistors T8, T9, and T10.

The eighth and tenth transistors T8 and T10 may be connected in series between a fifth power line PL5 and a k-th readout line RXk (where k is a positive integer).

The eighth transistor T8 (or a first sensor transistor) may be electrically connected between the fifth power line PL5 and the tenth transistor T10. A gate electrode of the eighth transistor T8 may be electrically connected to a fifth node N5 (or a sensor node). The eighth transistor T8 may control current flowing from the fifth power line PL5 to the k-th readout line RXk through the tenth transistor T10 in response to a voltage of the fifth node N5. A common voltage VCOM may be supplied to the fifth power line PL5.

In an embodiment, the fifth power line PL5 may be electrically connected to or integrally formed with the third power line PL3. The common voltage VCOM applied to the fifth power line PL5 may be the same as the second initialization power voltage Vint2. However, the present disclosure is not necessarily limited to the aforementioned example. In an embodiment, the fifth power line PL5 may be electrically connected to or integrally formed with the second power line PL2. The common voltage VCOM applied to the fifth power line PL5 may be identical to the first initialization power voltage Vint1.

The tenth transistor T10 ("second sensor transistor", or "switching transistor") may be electrically connected between the eighth transistor T8 and the k-th readout line RXk. A gate electrode of the tenth transistor T10 may be connected to the 1i-th scan line S1*i*. For example, the gate electrode of the tenth transistor T10 and the gate electrode of the second transistor T2 may share the 1i-th scan line S1*i*.

The ninth transistor T9 (or a third sensor transistor) may be electrically connected between a fourth power line PL4 (or a reference power line) and the fifth node N5. A gate electrode of the ninth transistor T9 may be electrically connected to the reset line RSTL. A reset voltage VRST may be supplied to the fourth power line PL4. The reset voltage VRST may be a DC voltage having a constant level. For example, the reset voltage VRST may be approximately −7V, but is not necessarily limited thereto.

At least one light receiving element LRD may be electrically connected between the fifth node N5 and the electrode EP to which the second power voltage VSS is provided.

The light receiving element LRD may generate charge (or current) based on incident light. For example, the light receiving element LRD may perform a function of photoelectric conversion. For example, the light receiving element LRD may be implemented as a photo diode.

If the ninth transistor T9 is turned on in response to a reset signal RST supplied to the reset control line RSTL, the reset voltage VRST may be supplied to the fifth node N5. For example, the voltage of the fifth node N5 may be reset by the reset voltage VRST. After the reset voltage VRST has been applied to the fifth node N5, the light receiving element LRD may perform a function of photoelectric conversion.

The voltage of the fifth node N5 may be changed by the operation of the light receiving element LRD. The voltage of the fifth node N5 (or the charge or current generated from the light receiving element LRD) may be changed depending on the intensity of light that is incident on the light receiving element LRD or the time during which light is incident (or the time during which the light receiving element LRD is exposed).

If the tenth transistor T10 is turned on by the first scan signal GW[i] supplied to the 1i-th scan line S1*i*, a detection value (current and/or voltage) generated based on the voltage of the fifth node N5 may flow to the k-th readout line RXk.

In an embodiment, each of the pixel circuit PXC and the sensor circuit SC may include a P-type transistor and an N-type transistor. Each of the third transistor T3, the fourth transistor T4, and the ninth transistor T9 may be formed of an oxide semiconductor transistor including an oxide semiconductor (or a second type semiconductor). For example, each of the third transistor T3, the fourth transistor T4, and the ninth transistor T9 may be formed of an N-type oxide semiconductor transistor, and include an oxide semiconductor layer as an active layer, but is not necessarily limited thereto.

Each of the other transistors (e.g., the first, second, fifth, sixth, seventh, eighth, and tenth transistors T1, T2, T5, T6, T7, T8, and T10) may be formed of a poly-silicon transistor including a silicon semiconductor (or a first type semiconductor), and may include a poly-silicon semiconductor layer as an active layer. For example, the active layer may be formed through a low-temperature poly-silicon (LTPS) process.

Hereinafter, with reference to FIGS. 7 and 8, the following description will be focused on a stacked structure (or a cross-sectional structure) of the sub-pixel SPX including the light emitting element LED and the photo-sensing pixel PSR including the light receiving element LRD.

Figure 7:
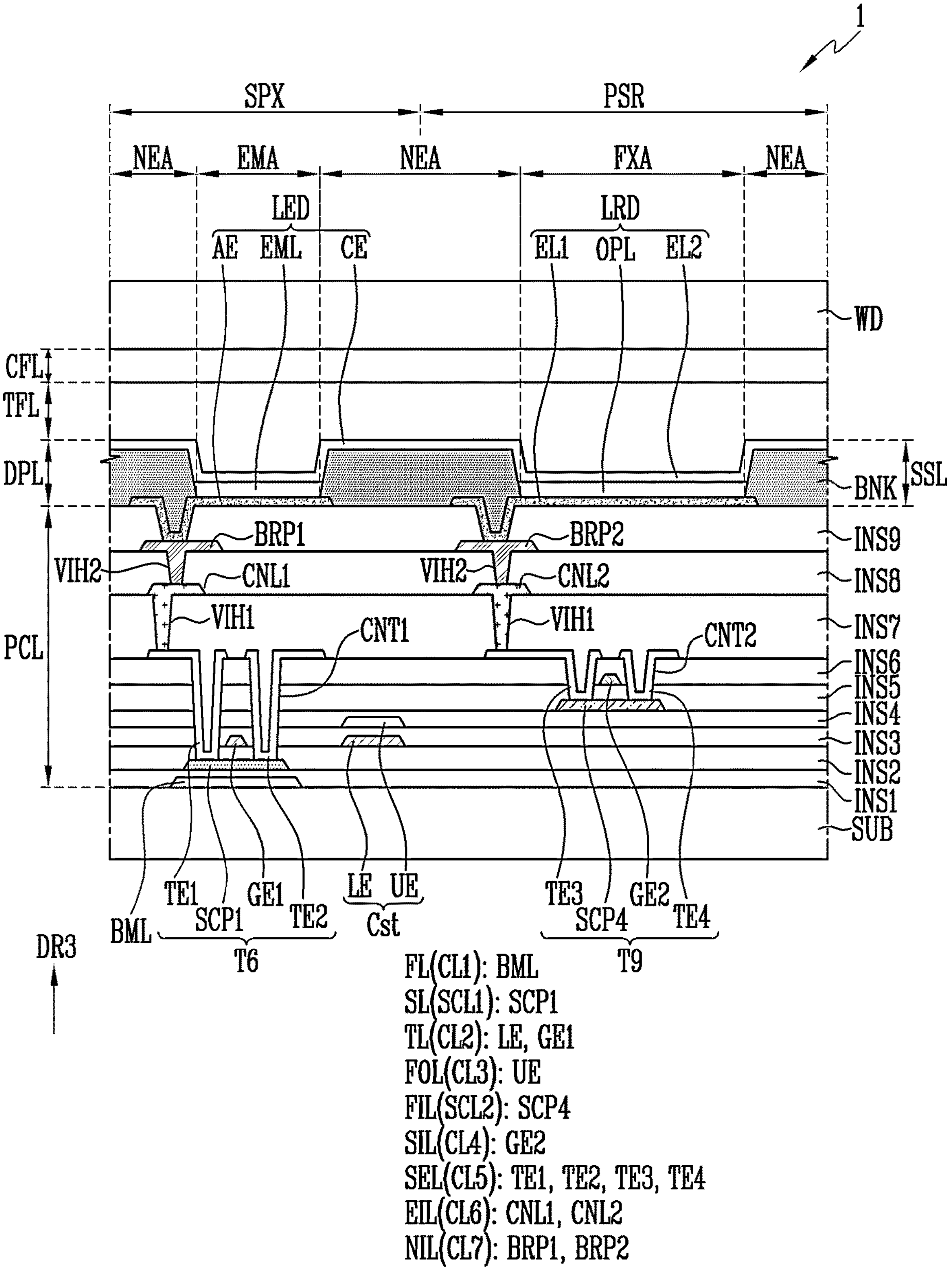
FIG. 7 is a schematic cross-schematic sectional view illustrating one area of the display device in accordance with an embodiment.

FIG. 7 is a schematic cross-sectional view illustrating one area of the display device 1 in accordance with an embodiment. FIG. 8 is a schematic cross-sectional view illustrating a reflection path of light in the display device 1 of FIG. 7.

Figure 8:
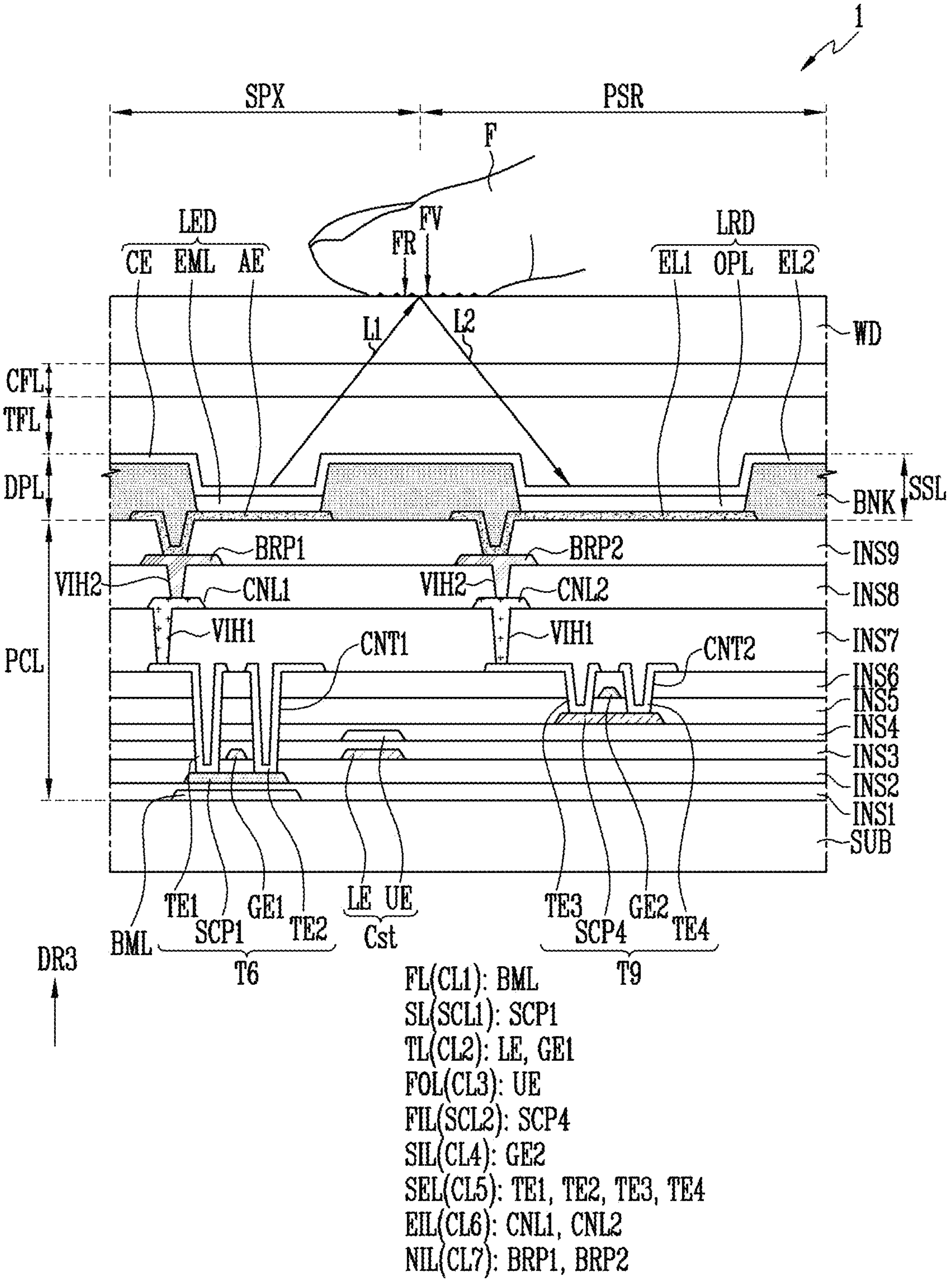
FIG. 8 is a schematic cross-sectional view illustrating a reflection path of light in the display device of FIG. 7.

FIGS. 7 and 8 illustrate a cross-section of a portion corresponding to the sixth transistor T6 among the first to seventh transistors T1 to T7 illustrated in FIG. 6 and a cross-section of a portion corresponding to the ninth transistor T9 among the eighth to tenth transistors T8 to T10.

Referring to FIGS. 1 to 8, the display device 1 may include the sub-pixel SPX and the photo-sensing pixel PSR that are provided in an area of a substrate SUB.

A pixel circuit layer PCL of the sub-pixel SPX and a pixel circuit layer PCL of the photo-sensing pixel PSR may be disposed on the substrate SUB. One or more insulating layers may be disposed in the pixel circuit layer PCL. The insulating layer may include a first insulating layer INS1, a second insulating layer INS2, a third insulating layer INS3, a fourth insulating layer INS4, a fifth insulating layer INS5, a sixth insulating layer INS6, a seventh insulating layer INS7, an eighth insulating layer INS8, and a ninth insulating layer INS9.

The first insulating layer INS1 (or a buffer layer) may be disposed on the surface of the substrate SUB. The first insulating layer INS1 may prevent impurities from diffusing into the sixth transistor T6 and the ninth transistor T9. The first insulating layer INS1 may be formed of an inorganic layer including inorganic material (or substance). The first insulating layer INS1 may include silicon nitride ($SiN_x$), silicon oxide ($SiO_x$), silicon oxynitride ($SiO_xN_y$), and/or aluminum oxide ($AlO_x$). Although the first insulating layer INS1 may have a single-layer structure, the first insulating layer INS1 may have a multilayer structure having at least two or more layers. The first insulating layer INS1 may be omitted depending on the material of the substrate SUB or processing conditions.

The second insulating layer INS2 (or a first gate insulating layer) may be disposed on the surface of the first insulating layer INS1. The second insulating layer INS2 may include the same material as the first insulating layer INS1, or may include suitable (or selected) materials among materials exemplified as the constituent material of the first insulating layer INS1. For example, the second insulating layer INS2 may be formed of an inorganic layer including inorganic material.

The third insulating layer INS3 (or a second gate insulating layer) may be disposed on the surface of the second insulating layer INS2. The third insulating layer INS3 may include the same material as the first insulating layer INS1, or may include one or more suitable (or selected) materials among materials exemplified as the constituent material of the first insulating layer INS1.

The fourth insulating layer INS2 (or a first interlayer insulating layer) may be disposed on the surface of the third insulating layer INS3. The fourth insulating layer INS4 may be an inorganic layer including inorganic material or an organic layer including organic material.

The fifth insulating layer INS5 (or a third gate insulating layer) may be disposed on the surface of the fourth insulating layer INS4. The fifth insulating layer INS5 may be an inorganic layer including inorganic material or an organic layer including organic material.

The sixth insulating layer INS6 (or a second interlayer insulating layer) may be disposed on the surface of the fifth insulating layer INS5. The sixth insulating layer INS6 may be an inorganic layer including inorganic material or an organic layer including organic material.

The seventh insulating layer INS7 (or a first via layer) may be disposed on the surface of the sixth insulating layer INS6. The seventh insulating layer INS7 may be an inorganic layer including inorganic material or an organic layer including organic material. The inorganic layer may include, for example, silicon oxide ($SiO_x$), silicon nitride ($SiN_x$), silicon oxynitride ($SiO_xN_y$), and/or aluminum oxide ($AlO_x$). The organic layer may include, for example, polyacrylates resin, epoxy resin, phenolic resin, polyamides resin, polyimides rein, unsaturated polyesters resin, poly-phenylen ethers resin, poly-phenylene sulfides resin, and/or benzocyclobutene resin.

The eighth insulating layer INS8 (or a second via layer) may be disposed on the surface of the seventh insulating layer INS7. The eighth insulating layer INS8 may include the same material as the seventh insulating layer INS7, or may include one or more suitable (or selected) materials among materials exemplified as the constituent material of the seventh insulating layer INS7. For example, the eighth insulating layer INS8 may be an organic layer including organic material.

The ninth insulating layer INS9 (or a third via layer) may be disposed on the surface of the eighth insulating layer INS8. The ninth insulating layer INS9 may include the same material as the seventh insulating layer INS7, or may include one or more suitable (or selected) materials among materials exemplified as the constituent material of the seventh insulating layer INS7. For example, the ninth insulating layer INS9 may be an organic layer including organic material.

The pixel circuit layer PCL may include a plurality of layers disposed between the foregoing insulating layers. For example, the pixel circuit layer PCL may include a first additional layer FL, a second additional layer SL, a third additional layer TL, a fourth additional layer FOL, a fifth additional layer FIL, a sixth additional layer SIL, a seventh additional layer SEL, an eighth additional layer EIL, and a ninth additional layer NIL.

The first additional layer FL may be disposed between the substrate SUB and the first insulating layer INS1, and form a first conductive layer CL1. The second additional layer SL may be disposed between the first insulating layer INS1 and the second insulating layer INS2, and form a first semiconductor layer SCL1. The third additional layer TL may be disposed between the second insulating layer INS2 and the third insulating layer INS3, and form a second conductive layer CL2. The fourth additional layer FOL may be disposed between the third insulating layer INS3 and the fourth insulating layer INS4, and form a third conductive layer CL3. The fifth additional layer FIL may be disposed between the fourth insulating layer INS1 and the fifth insulating layer INS5, and form a second semiconductor layer SCL2. The sixth additional layer SIL may be disposed between the fifth insulating layer INS5 and the sixth insulating layer INS6, and form a fourth conductive layer CL4. The seventh additional layer SEL may be disposed between the sixth insulating layer INS6 and the seventh insulating layer INS7, and form a fifth conductive layer CL5. The eighth additional layer EIL may be disposed between the seventh insulating layer INS7 and the eighth insulating layer INS8, and form a sixth conductive layer CL6. The ninth additional layer NIL may be disposed between the eighth insulating layer INS8 and the ninth insulating layer INS9, and form a seventh conductive layer CL7.

The first semiconductor layer SCL1 may include a silicon semiconductor. For example, the silicon semiconductor may include amorphous silicon, polycrystalline silicon, or the like. The first semiconductor layer SCL1 includes low-temperature polysilicon, but is not necessarily limited thereto. The first semiconductor layer SCL1 may include a first area with high conductivity, and a second area with low conductivity. The first area may be doped with an N-type dopant or a P-type dopant. The P-type transistor may include a doping area doped with a P-type dopant. The N-type transistor may include a doping area doped with an N-type dopant. The second area may be an undoped area or an area doped with a lower concentration compared to the first area. The conductivity of the first area may be greater than the conductivity of the second area. The first area may substantially function as an electrode or a signal line. The second area may substantially correspond to an active pattern (or a channel area) of the corresponding transistor. A portion of the first semiconductor layer SCL1 may be an active area of the transistor. Another portion of the first semiconductor layer SCL1 may be a source or drain of the transistor. Another portion of the first semiconductor layer SCL1 may be a connection electrode or a connection signal line. However, the present disclosure is not necessarily limited to the aforementioned example.

The second semiconductor layer SCL2 may include an oxide semiconductor. The oxide semiconductor may include a plurality of areas distinguished from each other depending on whether metal oxide has been reduced. An area where metal oxide has been reduced (hereinafter, referred to as "reduced area") may have relatively high conductivity compared to an area where metal oxide has not been reduced (hereinafter, referred to as "unreduced area"). The reduced area may be substantially used as a source/drain of the corresponding transistor or a signal line. The unreduced area may substantially correspond to the active pattern (or the channel area) of the transistor. A portion of the second semiconductor layer SCL2 may be an active pattern of the transistor. Another portion of the second semiconductor layer SCL2 may be a source/drain area of the transistor. Another portion of the second semiconductor layer SCL2 may be a signal transmission area. However, the present disclosure is not necessarily limited to the aforementioned example.

The sixth transistor T6 and the ninth transistor T9 may be disposed in the pixel circuit layer PCL. The sixth transistor T6 may include a first gate electrode GE1, a first semiconductor pattern SCP1, a first terminal TE1, and a second terminal TE2. The ninth transistor T9 may include a second gate electrode GE2, a fourth semiconductor pattern SCP4, a third terminal TE3, and a fourth terminal TE4.

The first semiconductor pattern SCP1 may correspond to a second additional layer SL disposed on the first insulating layer INS1. The first semiconductor pattern SCP1 may be formed of the first semiconductor layer SCL1. The first semiconductor pattern SCP1 may include a channel area, a first contact area that contacts a first end of the channel area, and a second contact area that contacts a second end of the channel area. The second insulating layer INS2 may be disposed on the first semiconductor pattern SCP1.

The first gate electrode GE1 may correspond to the third additional layer TL disposed on the second insulating layer INS2. The first gate electrode GE1 may be formed of the second conductive layer CL2. The second conductive layer CL2 may be formed of a single-layer structure or a multi-layer structure made of molybdenum (Mo), copper (Cu), chromium (Cr), gold (Au), silver (Ag), titanium (Ti), nickel (Ni), neodymium (Nd), indium (In), tin (Sn), and an oxide or alloy thereof. For example, the second conductive layer CL2 may be formed as a multiplayer structure formed by sequentially or repetitively stacking titanium, copper, and/or indium tin oxide, but is not necessarily limited thereto. The first gate electrode GE1 may overlap one area of the first semiconductor pattern SCP1. The one area of the first semiconductor pattern SCP1 that overlaps the first gate electrode GE1 may be the channel area of the sixth transistor T6.

The third insulating layer INS3 may be disposed on the first gate electrode GE1.

The first terminal TE1 and the second terminal TE2 may correspond to the seventh additional layer SEL disposed on the sixth insulating layer INS6. The first terminal TE1 and the second terminal TE2 may be formed of the fifth conductive layer CL5. The fifth conductive layer CL5 may be formed as a single-layer or multilayer structure formed of molybdenum, copper, aluminum, chromium, gold, silver, titanium, nickel, neodymium, indium, tin, and an oxide or alloy thereof.

The first terminal TE1 may be electrically connected to the second contact area of the first semiconductor pattern SCP1 through a first contactor CNT1 passing through the second insulating layer INS2, the third insulating layer INS3, the fourth insulating layer INS4, the fifth insulating layer INS5, and the sixth insulating layer INS6. The first terminal TE1 may be electrically connected to an anode electrode AE of the light emitting element LD. The second terminal TE2 may be electrically connected to the first contact area of the first semiconductor pattern SCP1 through another first contactor CNT1 passing through the second insulating layer INS2, the third insulating layer INS3, the fourth insulating layer INS4, the fifth insulating layer INS5, and the sixth insulating layer INS6.

The seventh insulating layer INS7 may be disposed on the first terminal TE1 and the second terminal TE2.

The fourth semiconductor pattern SCP4 may correspond to a fifth additional layer FIL disposed on the fourth insulating layer INS4. The fourth semiconductor pattern SCP4 may be formed of the second semiconductor layer SCL2. The fourth semiconductor pattern SCP4 may include a channel area, a first contact area that contacts a first end of the channel area, and a second contact area that contacts a second end of the channel area. The fifth insulating layer INS5 may be disposed on the fourth semiconductor pattern SCP4.

The second gate electrode GE2 may correspond to the sixth additional layer SIL disposed on the fifth insulating layer INS5. The second gate electrode GE2 may be formed of the fourth conductive layer CL4. The fourth conductive layer CL4 may include the same material as the second conductive layer CL2 or the fifth conductive layer CL5, or may include a suitable (or selected) material from among materials exemplified as the material of the second conductive layer CL2 or the fifth conductive layer CL5. The second gate electrode GE2 may overlap one area of the fourth semiconductor pattern SCP4. The one area of the fourth semiconductor pattern SCP4 that overlaps the second gate electrode GE2 may be the channel area of the ninth transistor T9.

The sixth insulating layer INS6 may be disposed on the second gate electrode GE2.

The third terminal TE3 and the fourth terminal TE4 may correspond to the seventh additional layer SEL disposed on the sixth insulating layer INS6. The third terminal TE3 and the fourth terminal TE4 may be formed of the fifth conductive layer CL5.

The third terminal TE3 may be electrically connected to the first contact area of the fourth semiconductor pattern SCP4 through a second contactor CNT2 passing through the fifth insulating layer INS5 and the sixth insulating layer INS6. The third terminal TE3 may be electrically connected to a first electrode EL1 of the light receiving element LRD. The fourth terminal TE4 may be electrically connected to the second contact area of the fourth semiconductor pattern SCP4 through another second contactor CNT2 passing through the fifth insulating layer INS5 and the sixth insulating layer INS6.

The seventh insulating layer INS7 may be disposed on the third terminal TE3 and the fourth terminal TE4.

A bottom metal pattern BML may be disposed in the pixel circuit layer PCL. The bottom metal pattern BML may correspond to the first additional layer FL disposed on the substrate SUB. The bottom metal pattern BML may be formed of the first conductive layer CL1 and overlap the sixth transistor T6, but is not necessarily limited thereto. The first conductive layer CL1 may include the same material as the second conductive layer CL2 or the fifth conductive layer CL5, or may include a suitable (or selected) material from among materials exemplified as the material of the second conductive layer CL2 or the fifth conductive layer CL5. In an embodiment, the bottom metal pattern BML may be electrically connected to the sixth transistor T6, thus stabilizing the channel area of the sixth transistor T6.

The storage capacitor Cst may be disposed in the pixel circuit layer PCL. The storage capacitor Cst may include a lower electrode LE and an upper electrode UE.

The lower electrode LE may correspond to the third additional layer TL disposed on the second insulating layer INS2. The lower electrode LE may be formed of the second conductive layer CL2 and be provided in the same layer as the first gate electrode GE1, but is not necessarily limited thereto. The third insulating layer INS3 may be disposed on the lower electrode LE.

The upper electrode UE may correspond to the fourth additional layer FOL disposed on the third insulating layer INS3. The upper electrode UE may be formed of the third conductive layer CL3, but is not necessarily limited thereto. The third conductive layer CL3 may include the same material as the second conductive layer CL2 or the fifth conductive layer CL5, or may include a suitable (or selected) material from among materials exemplified as the material of the second conductive layer CL2 or the fifth conductive layer CL5. The upper electrode UE may overlap the lower electrode LE with the third insulating layer INS3 interposed therebetween, thus forming a capacitance.

A first connection line CNL1, a second connection line CNL2, a second connection line CNL2, a first bridge pattern BRP1, and a second bridge pattern BRP2 may be disposed in the pixel circuit layer PCL.

The first connection line CNL1 and the second connection line CNL2 may correspond to the eighth additional layer EIL disposed on the seventh insulating layer INS7. The first connection line CNL1 and the second connection line CNL2 may be formed of the sixth conductive layer CL6. The sixth conductive layer CL6 may include the same material as the second conductive layer CL2 or the fifth conductive layer CL5, or may include a suitable (or selected) material from among materials exemplified as the material of the second conductive layer CL2 or the fifth conductive layer CL5.

The first connection line CNL1 and the second connection line CNL2 may be spaced apart from each other on the seventh insulating layer INS7. The first connection line CNL1 may be electrically connected to the first terminal TE1 of the sixth transistor T6 through a first via hole VIH1 passing through the seventh insulating layer INS7. The second connection line CNL2 may be electrically connected to the third terminal TE3 of the ninth transistor T9 through another via hole VIH1 passing through the seventh insulating layer INS7.

The eighth insulating layer INS8 may be disposed on the first connection line CNL1 and the second connection line CNL2.

The first bridge pattern BRP1 and the second bridge pattern BRP2 may correspond to the ninth additional layer NIL disposed on the eighth insulating layer INS8. The first bridge pattern BRP1 and the second bridge pattern BRP2 may be formed of the seventh conductive layer CL7. The seventh conductive layer CL7 may include the same material as the second conductive layer CL2 or the fifth conductive layer CL5, or may include a suitable (or selected) material from among materials exemplified as the material of the second conductive layer CL2 or the fifth conductive layer CL5.

The first bridge pattern BRP1 and the second bridge pattern BRP2 may be disposed at positions spaced apart from each other on the eighth insulating layer INS8. The first bridge pattern BRP1 may be electrically connected to the first connection line CNL1 via a second via hole VIH2 passing through the eighth insulating layer INS8. The second bridge pattern BRP2 may be electrically connected to the second connection line CNL2 via another second via hole VIH2 passing through the eighth insulating layer INS8.

The ninth insulating layer INS9 may be disposed on the first bridge pattern BRP1 and the second bridge pattern BRP2.

The display element layer DPL may be disposed on the pixel circuit layer PCL of the sub-pixel SPX. The sensor layer SSL may be disposed on the pixel circuit layer PCL of the photo-sensing pixel PSR.

The light emitting element LED and the bank BNK may be disposed in the display element layer DPL. The light emitting element LED may include an anode electrode AE (or a pixel electrode), a light emitting layer EML, and a cathode electrode CE (or a common electrode). The light emitting element LED may be electrically connected to the sixth transistor T6 by the first bridge pattern BRP1 and the first connection line CNL1. The light emitting layer EML may include a hole transport layer, an organic material layer (or a light generation layer), and an electron transport layer.

The light receiving element LRD and the bank BNK may be disposed in the sensor layer SSL. The light receiving element LRD may be an optical fingerprint sensor. The light receiving element LRD may recognize a fingerprint by sensing light reflected by ridges FR of a finger F and valleys FV between the ridges FR. For example, if the finger F of the user makes contact on a window WD, first light L1 outputted from the light emitting element LED (or the light emitting layer EML) is reflected by the ridges FR or the valleys FV of the finger F, and reflected second light L2 may reach the light receiving element LRD (or a light receiving layer OPL) of the sensor layer SSL. The light receiving element LRD may distinguish between the second light L2 reflected by the ridges FR of the finger F and the second light L2 reflected by the valleys FV of the finger F, thereby recognizing the pattern of the fingerprint of the user. The light receiving element LRD may be electrically connected to the ninth transistor T9. The light receiving element LRD may include a first electrode EL1 (or a first sensor electrode), a light receiving layer OPL (or a photoelectric conversion layer), and a second electrode EL2 (or a second sensor electrode).

The anode electrode AE and the first electrode EL1 may be disposed on the ninth insulating layer INS9. The anode electrode AE and the first electrode EL1 may be formed of a metal layer made of silver (Ag), magnesium (Mg), aluminum (Al), platinum (Pt), palladium (Pd), gold (Au), nickel (Ni), neodymium (Nd), iridium (Ir), chromium (Cr), or an alloy thereof, and/or indium tin oxide (ITO), indium zinc oxide (IZO), zinc oxide (ZnO), indium tin zinc oxide (ITZO), or the like, but are not necessarily limited thereto. The anode electrode AE may be electrically connected to the first bridge pattern BRP1 through a contact hole passing through the ninth insulating layer INS9. The first electrode EL1 may be electrically connected to the second bridge pattern BRP2 through another contact hole passing through the ninth insulating layer INS9.

The anode electrode AE and the first electrode EL1 may be simultaneously or sequentially formed by patterning using a mask.

The bank BNK may be a pixel defining layer that defines (or partitions) an emission area EMA of the sub-pixel SPX and a light receiving area FXA of the photo-sensing pixel PSR. The bank BNK may be an organic layer including organic material (or substance). The organic material may include acryl resin, epoxy resin, phenolic resin, polyamide resin, polyimide resin, or the like.

In an embodiment, the bank BNK may include light absorbing material or be coated with light absorbent, so that the pixel defining layer PDL can function to absorb light introduced from the outside. For example, the bank BNK may include carbon-based black pigment, but is not necessarily limited thereto. The bank BNK may include opaque metal such as chromium (Cr), molybdenum (Mo), an alloy (MoTi) of molybdenum (Mo) and titanium (Ti), tungsten (W), vanadium (V), niobium (Nb), tantalum (Ta), manganese (Mn), cobalt (Co), or nickel (Ni), having high light absorptivity.

The bank BNK may include openings corresponding to the emission area EMA and the light receiving area FXA.

The light emitting layer EML may be disposed on the anode electrode AE. The light emitting layer EML may include an organic light emitting layer. The light emitting layer EML may emit light such as red light, green light, or blue light depending on organic material included in the light emitting layer EML, but is not necessarily limited thereto.

The light receiving layer OPL may be disposed on the first electrode EL1. The light receiving layer OPL may sense the intensity of light by emitting electrons in response to light of a specific wavelength band.

The light receiving layer OPL may include low-molecular organic material (or substance). For example, the light receiving layer OPL may be made of a phthalocyanine compound including copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and/or zinc (Zn).

Alternatively, the low-molecular organic material included in the light receiving layer OPL may be formed of a bi-layer structure including both a layer including a phthalocyanine compound including copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and/or zinc (Zn) and a layer including C60, or may be formed of a mixing layer in which a phthalocyanine compound and C60 are mixed with each other. However, the present disclosure is not necessarily limited to the aforementioned embodiment. In an embodiment, the light receiving layer OPL may include a polymer organic layer.

In an embodiment, the light receiving layer OPL may determine a light detection band of the photo-sensing pixel PSR by controlling selection of metal components included in the phthalocyanine compound. For example, a phthalocyanine compound including copper may absorb a visible light wavelength of a band ranging from approximately 600 nm to approximately 800 nm. A phthalocyanine compound including tin may absorb a near-infrared wavelength of a band ranging from approximately 800 nm to approximately 1000 nm. Therefore, a photo-sensing pixel PSR (or a photo sensor) capable of detecting a wavelength of a band desired by a user can be implemented by controlling selection of metals to be included in the phthalocyanine compound. For example, the light receiving element LRD may be formed to selectively absorb a wavelength of a red light band, a wavelength of a green light band, or a wavelength of a blue light band through the light receiving layer OPL.

The cathode electrode CE may be disposed on the light emitting layer EML. The second electrode EL2 may be disposed on the light receiving layer OPL. The cathode electrode CE and the second electrode EL2 may be a common electrode formed integrally in the display area DA. The second power voltage VSS may be supplied to the cathode electrode CE and the second electrode EL2.

The cathode electrode CE and the second electrode EL2 may be formed of a metal layer made of Ag, Mg, Al, Pt, Pd, Au, Ni, Nd, Ir, Cr, or the like, and/or a transparent conductive layer made of ITO, IZO, ZnO, ITZO, or the like. In an embodiment, the cathode electrode CE and the second electrode EL2 may be formed of a multilayer structure having two or more layers including a thin metal layer. For example, the common electrode CD may be formed of a triple-layer structure of ITO/Ag/ITO.

A thin-film encapsulation layer TFE may be formed on surfaces of the cathode electrode CE and the second electrode EL2.

The thin-film encapsulation layer TFE may be formed of a single layer, or multi-layers. The thin-film encapsulation layer TFE may include a plurality of insulating layers covering the light emitting element LED and the light receiving element LRD. For example, the thin-film encapsulation layer TFE may include at least one inorganic layer and at least one organic layer. For example, the thin-film encapsulation layer TFE may have a structure formed by alternately stacking the inorganic layers and the organic layers.

A color filter layer CFL may be disposed on the thin-film encapsulation layer TFE. The color filter layer CFL may include a light blocking pattern and a color filter. The light blocking pattern may be disposed in a non-emission area NEA that encloses the light emitting area EMA of the sub-pixel SPX and the light receiving area FXA of the light-sensing pixel PSR. The color filter may be disposed in the light emitting area EMA and the light receiving area FXA. The color filter layer CFL may be used as an anti-reflection layer to block external light reflection.

The window WD may be disposed on the color filter layer CFL.

The window WD may protect an exposed surface of the display device 1 or the display panel (referred to herein as "100" in FIG. 1). The window WD may protect the display device 1 from external impact, and provide an input surface and/or a display surface to the user. The window WD (or a cover glass) may have a multilayer structure selected from among a glass substrate, a plastic film, and a plastic substrate. The multilayer structure may be formed through a successive process or an adhesion process using an adhesive layer. The window WD may entirely or partially have flexibility.

Figure 9:
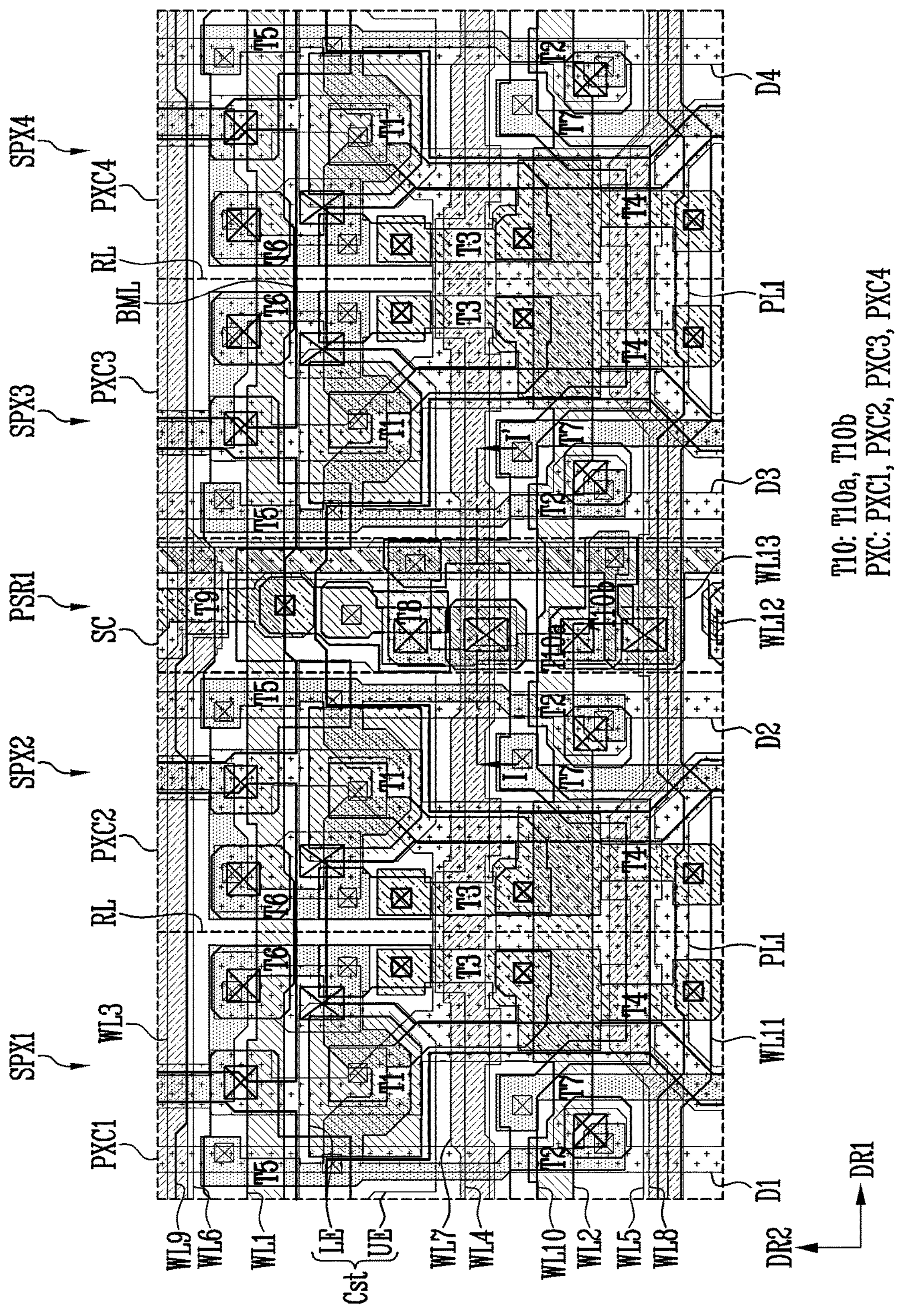
FIG. 9 is a schematic plan view illustrating sub-pixels and a photo-sensing pixel in accordance with an embodiment.
Figure 10:
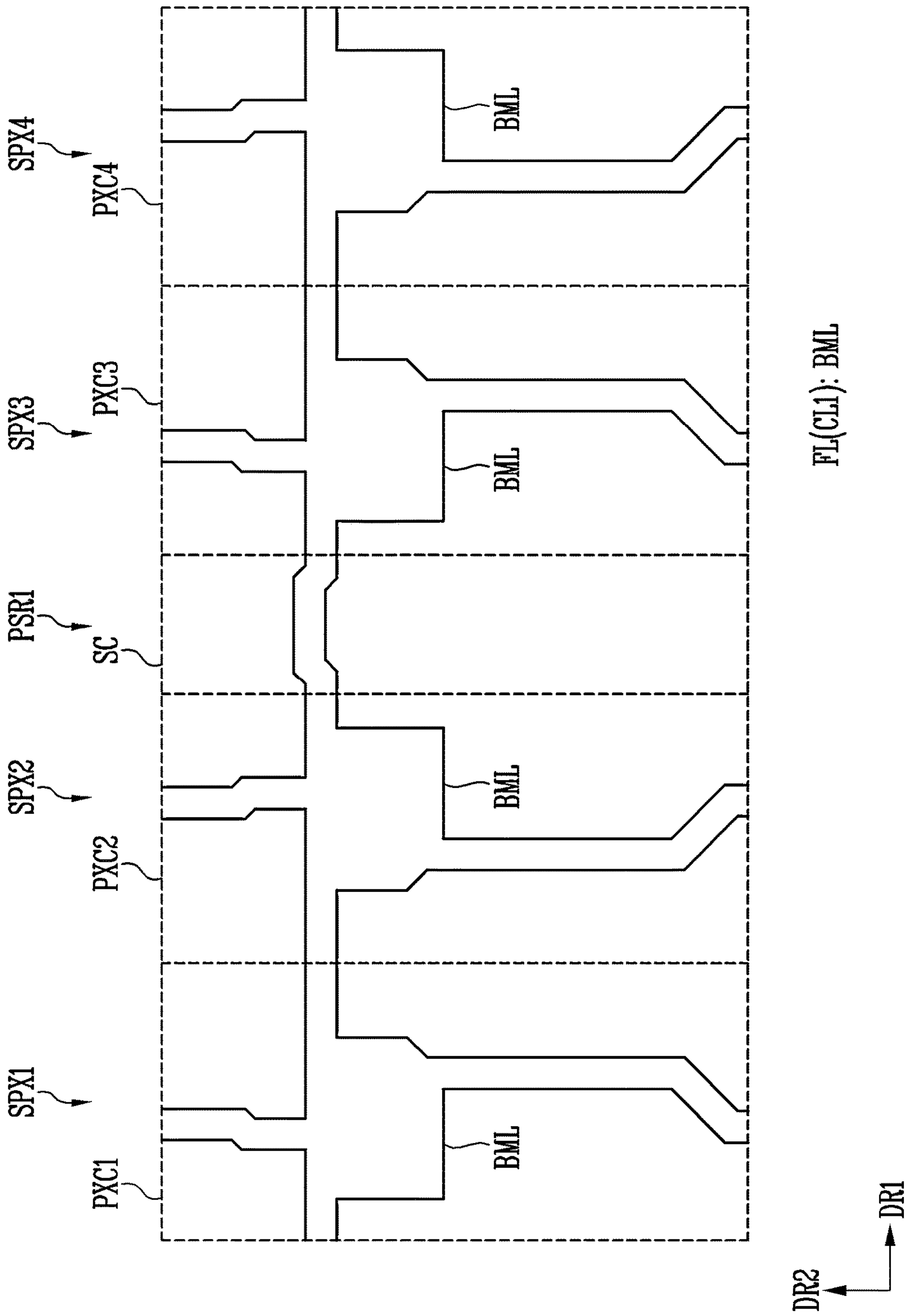
FIG. 10 is a schematic plan view illustrating components included in a first additional layer in FIG. 9.
Figure 11:
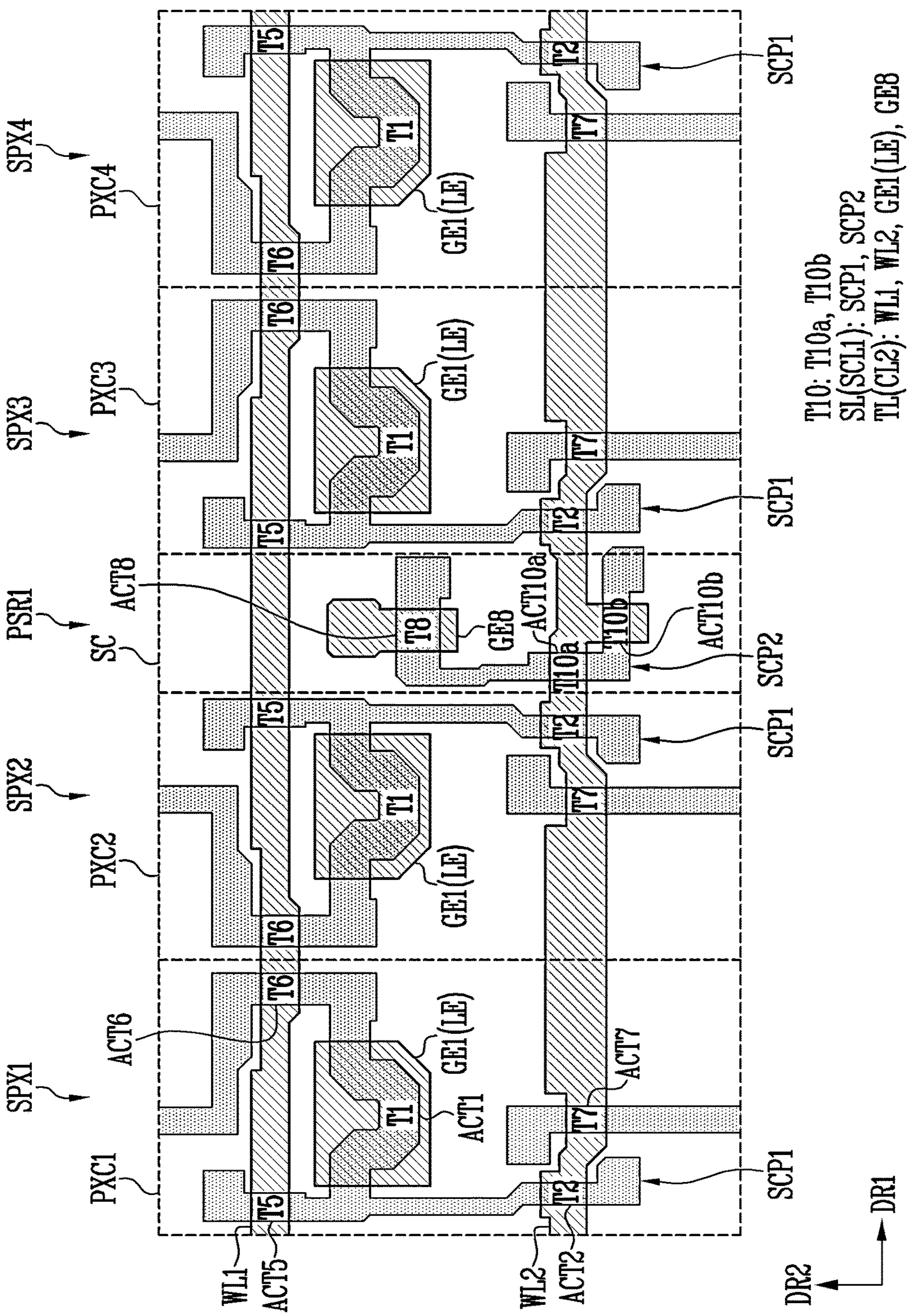
FIG. 11 is a schematic plan view illustrating components included in a second additional layer and a third additional layer in FIG. 9.
Figure 12:
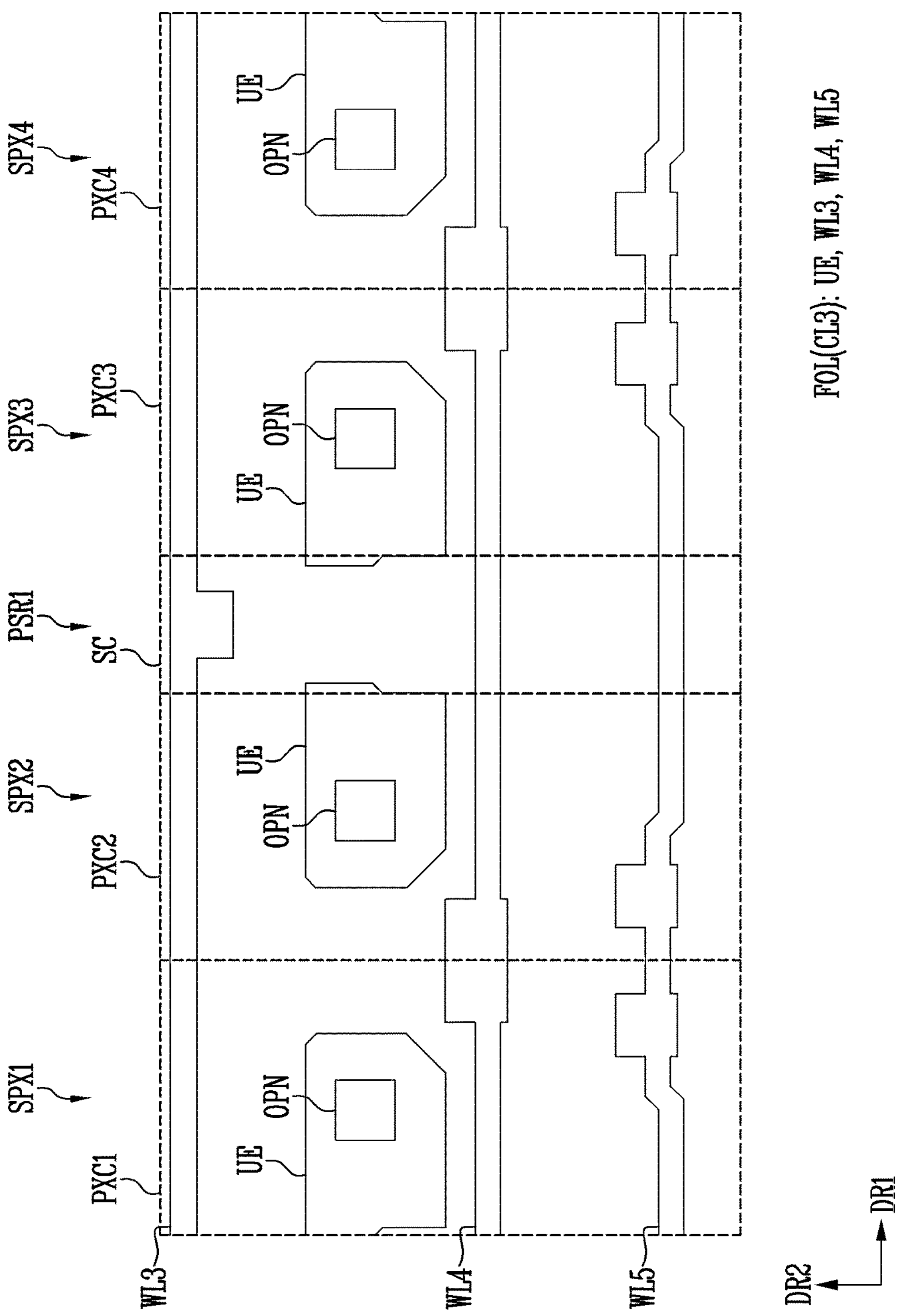
FIG. 12 is a schematic plan view illustrating components included in a fourth additional layer in FIG. 9.
Figure 13:
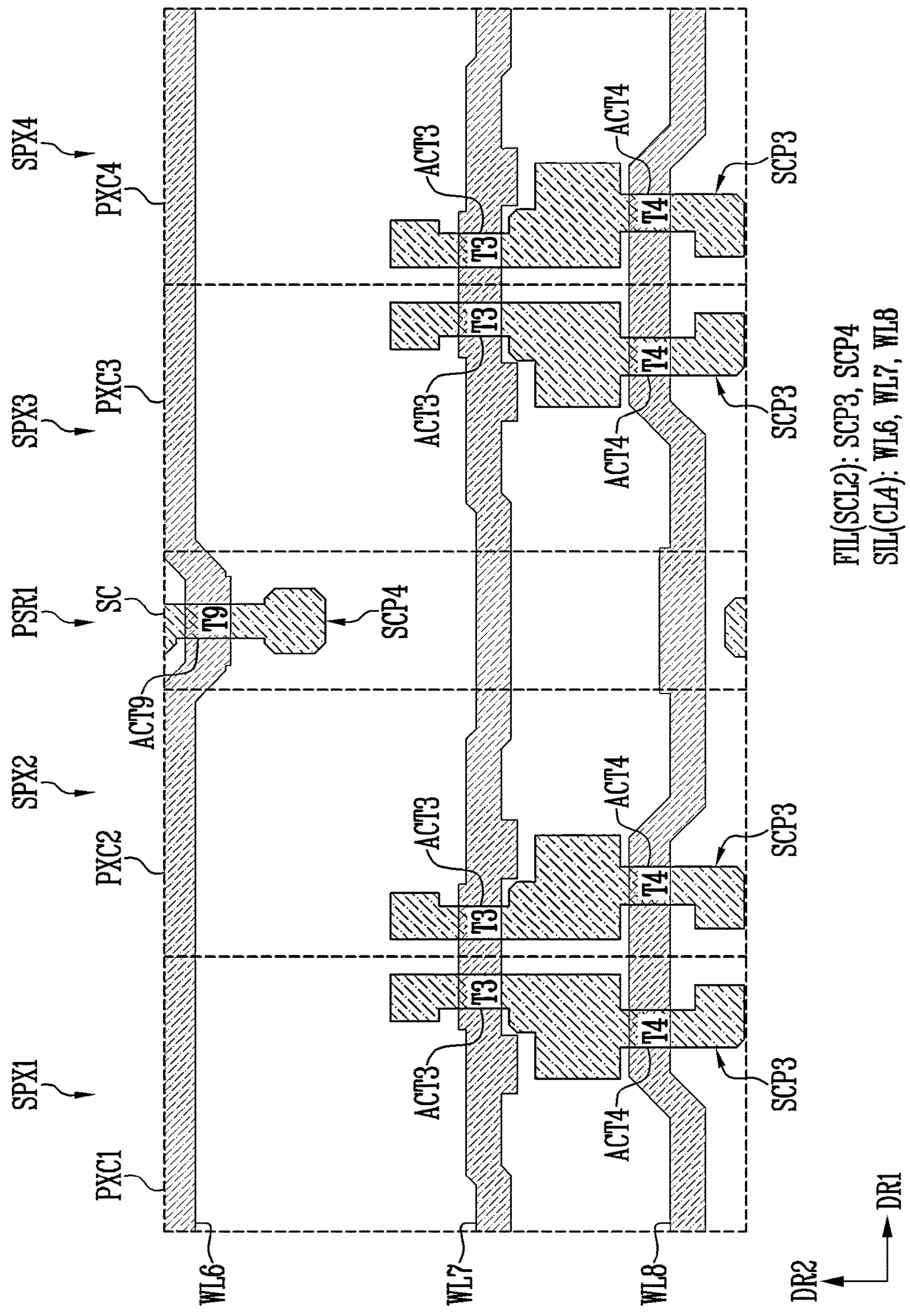
FIG. 13 is a schematic plan view illustrating components included in a fifth additional layer and a sixth additional layer in FIG. 9.
Figure 14:
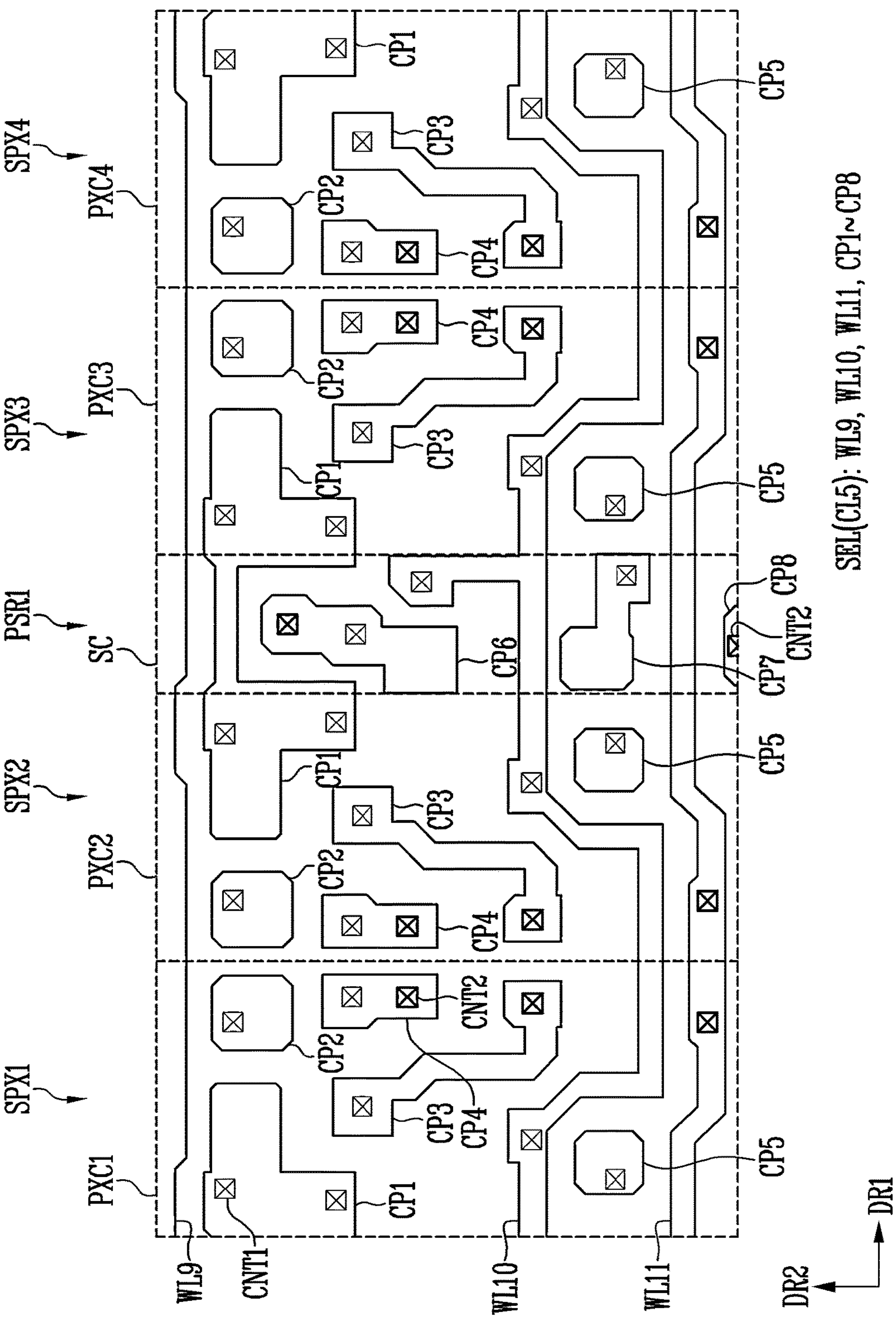
FIG. 14 is a schematic plan view illustrating components included in a seventh additional layer in FIG. 9.
Figure 15:
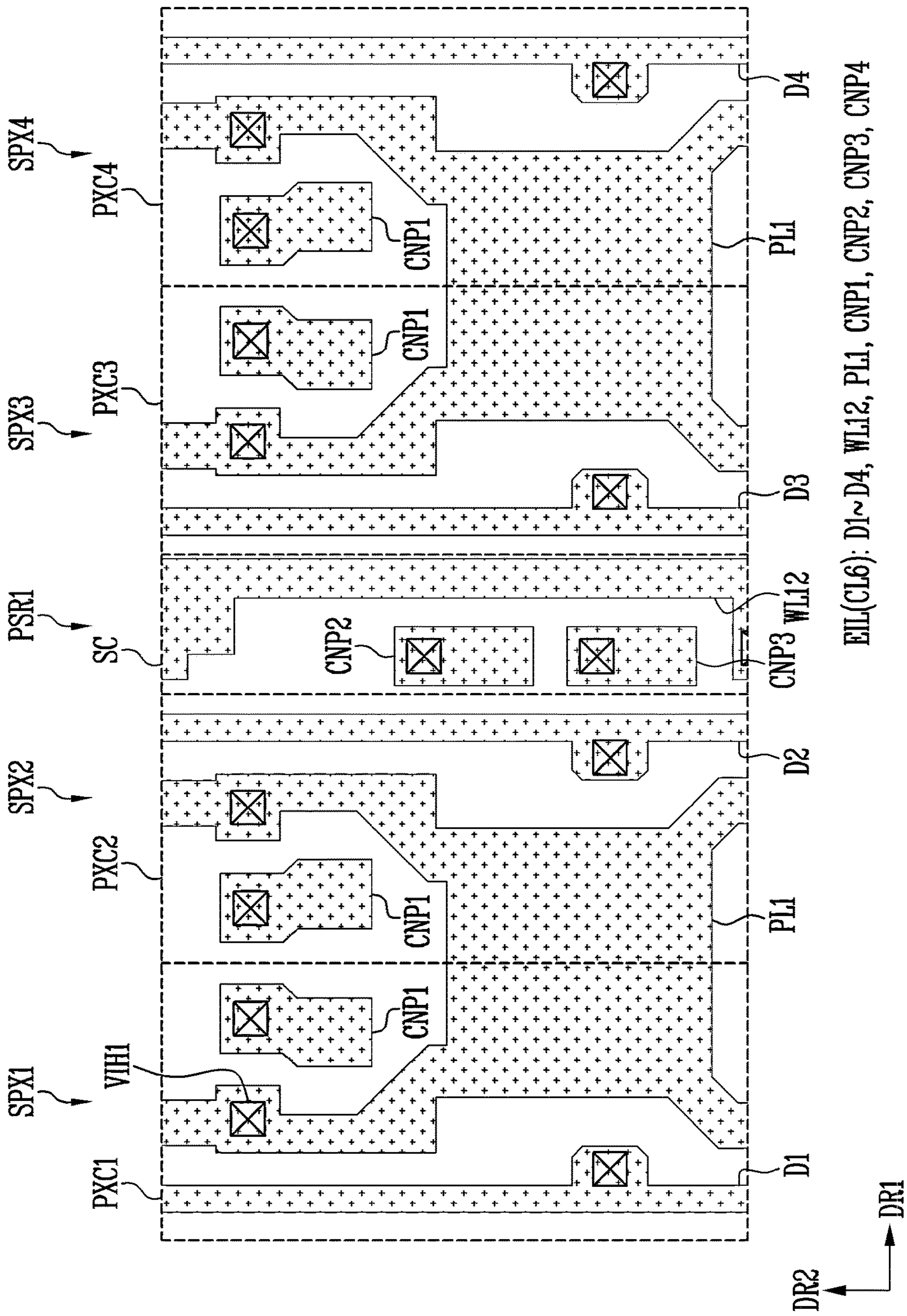
FIG. 15 is a schematic plan view illustrating components included in an eighth additional layer in FIG. 9.
Figure 16:
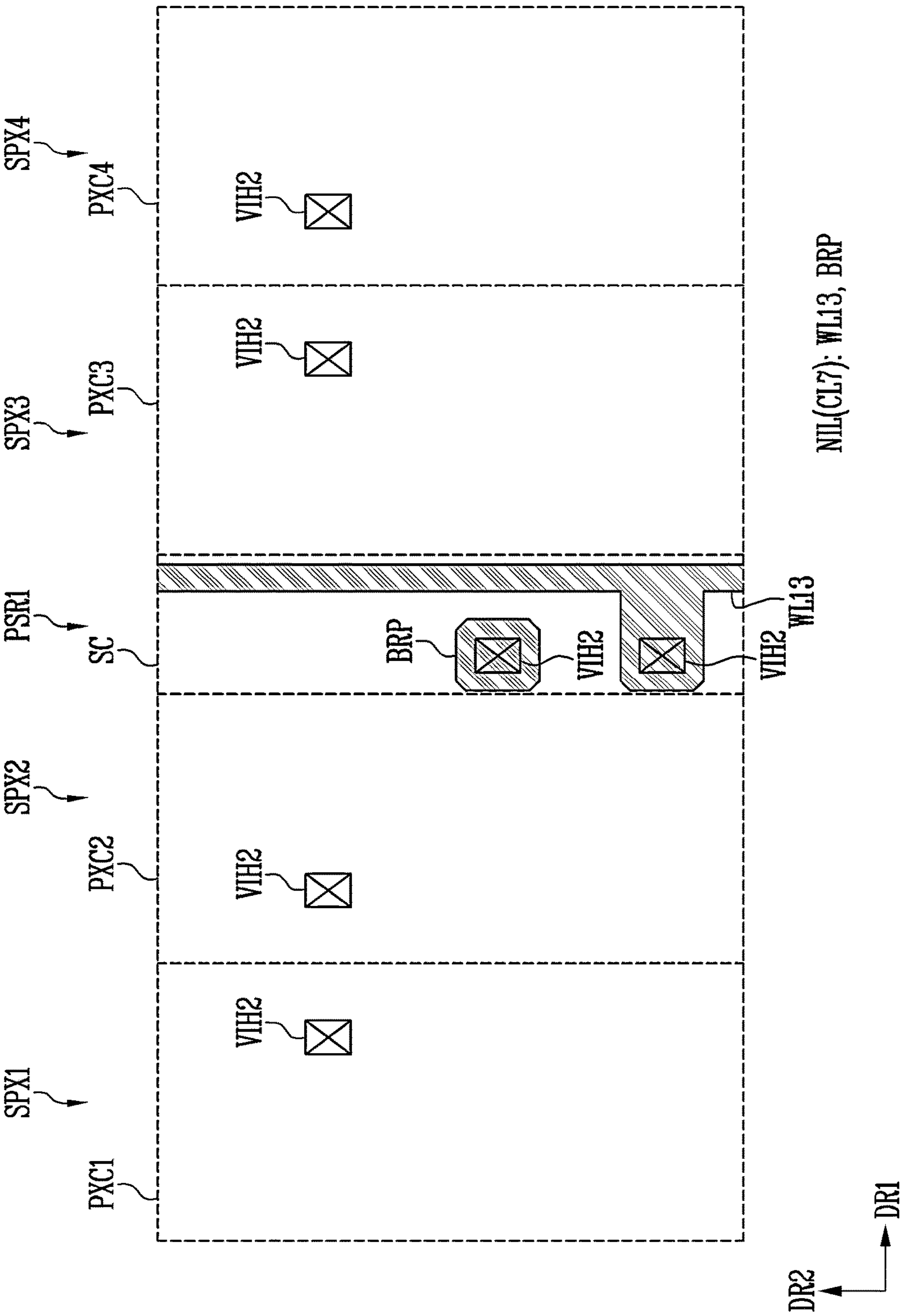
FIG. 16 is a schematic plan view illustrating components included in a ninth additional layer in FIG. 9.
Figure 17:
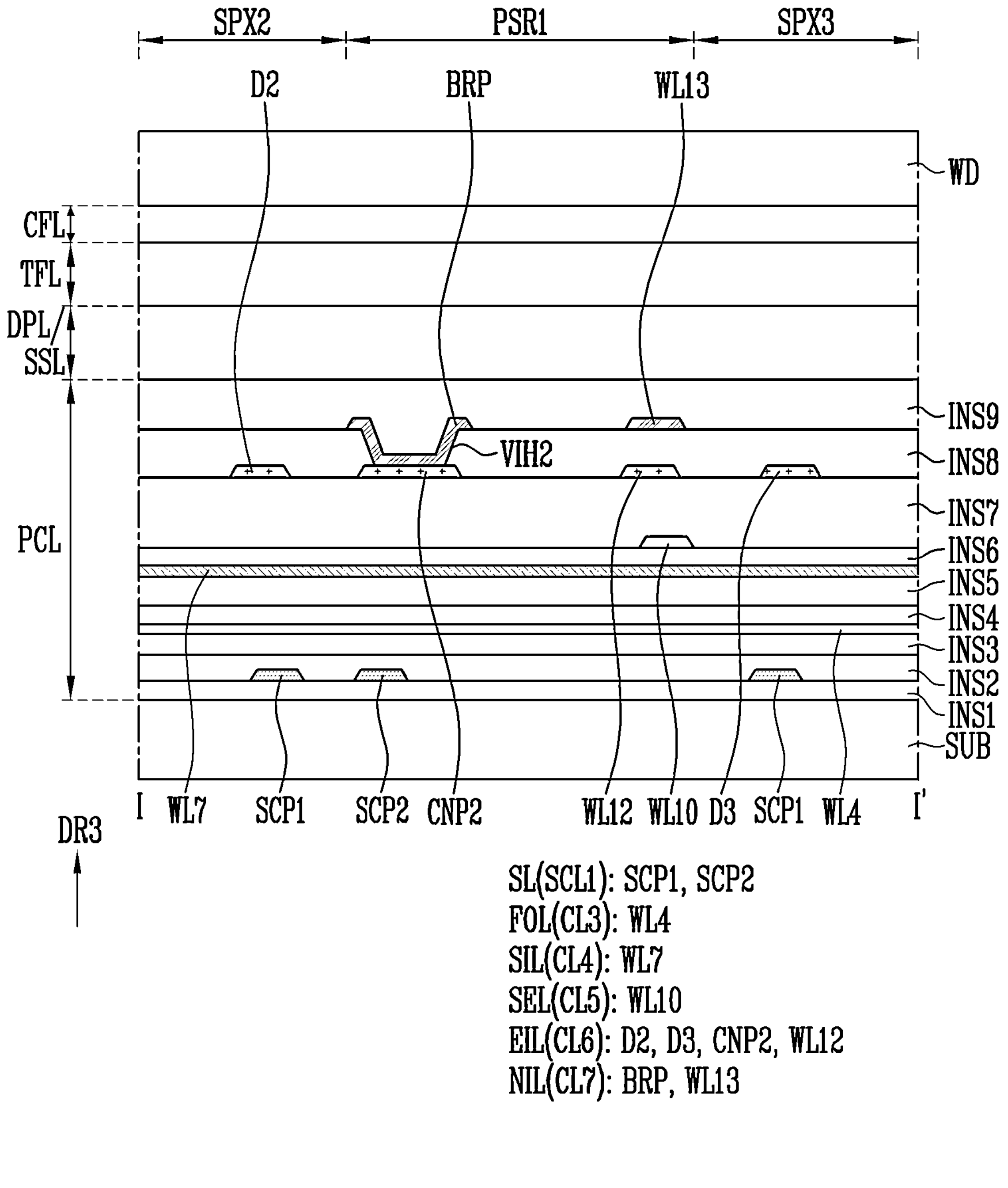
FIGS. 17 to 19 are schematic cross-sectional views taken along line I-I' of FIG. 9.
Figure 18:
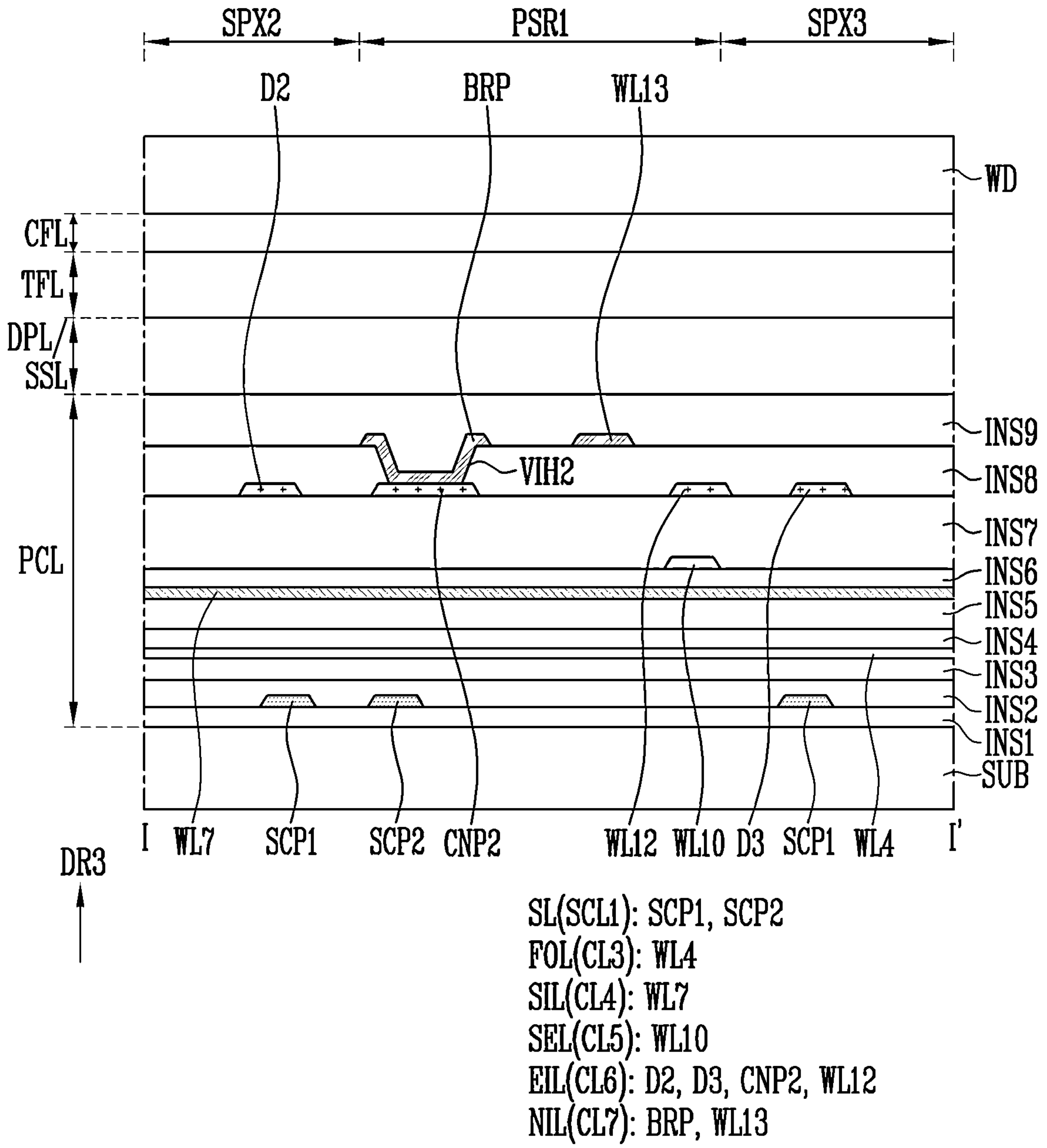
Figure 19:
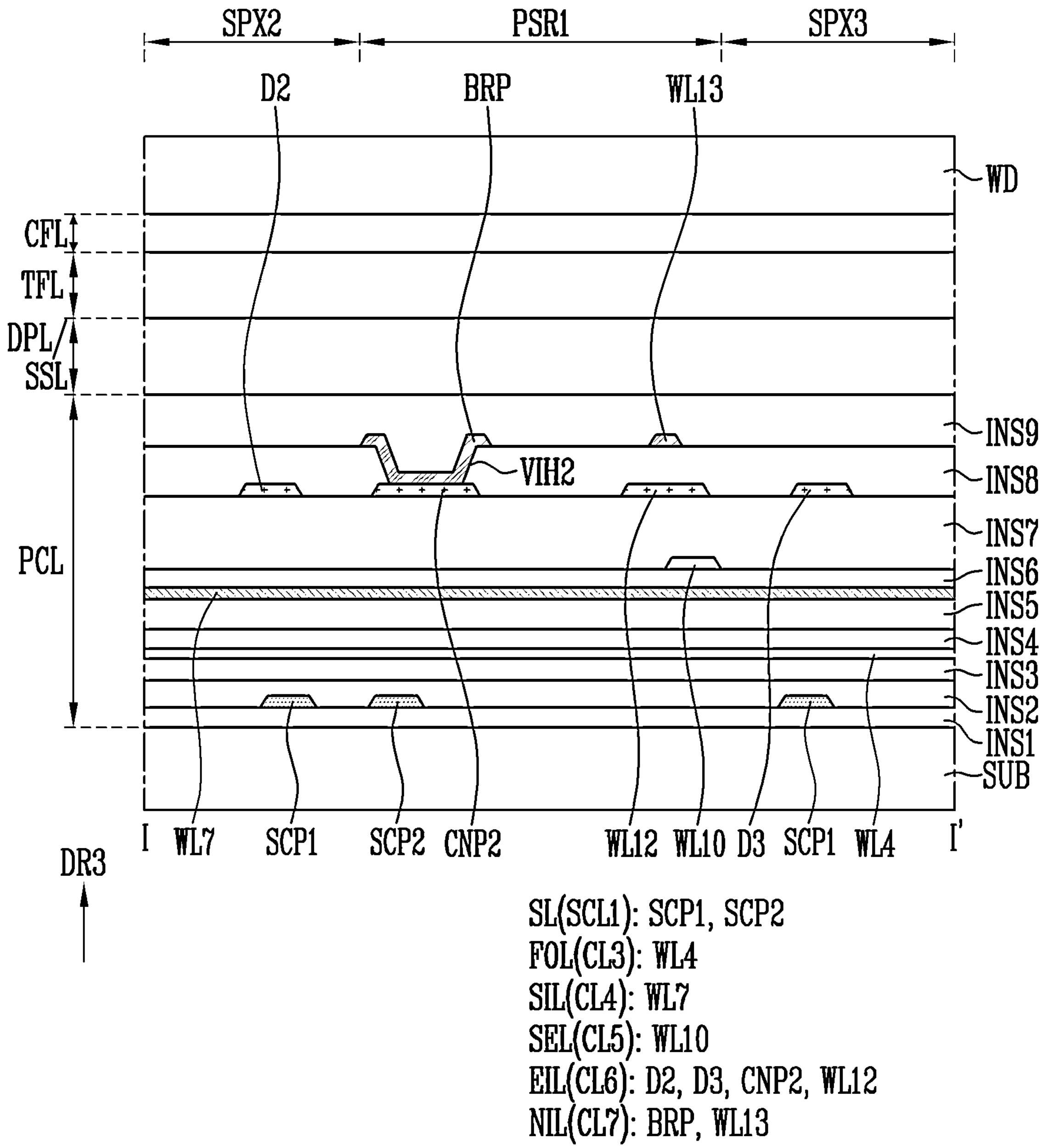

FIG. 9 is a schematic plan view illustrating the sub-pixels SPX1 to SPX4 and the photo-sensing pixel PSR1 in accordance with an embodiment. FIG. 10 is a schematic plan view illustrating components included in the first additional layer FL in FIG. 9. FIG. 11 is a schematic plan view illustrating components included in the second additional layer SL and the third additional layer TL in FIG. 9. FIG. 12 is a schematic plan view illustrating components included in the fourth additional layer FOL in FIG. 9. FIG. 13 is a schematic plan view illustrating components included in the fifth additional layer FIL and the sixth additional layer SIL in FIG. 9. FIG. 14 is a schematic plan view illustrating components included in the seventh additional layer SEL in FIG. 9. FIG. 15 is a schematic plan view illustrating components included in the eighth additional layer EIL in FIG. 9. FIG. 16 is a schematic plan view illustrating components included in the ninth additional layer NIL in FIG. 9. FIGS. 17 to 19 are schematic cross-sectional views taken along line I-I' of FIG. 9.

FIGS. 18 and 19 illustrate modifications of the embodiment of FIG. 17 with regard to an arrangement relationship and shapes of a twelfth additional line WL12 and a thirteenth additional line WL13.

In FIGS. 9 to 19, for the convenience of explanation, the first sub-pixel SPX1, the second sub-pixel SPX2, the third sub-pixel SPX3, the fourth sub-pixel SPX4, and the first photo-sensing pixel PSR1 arranged on the same pixel row (or the same horizontal line) are illustrated.

Referring to FIGS. 1 to 19, the first sub-pixel SPX1, the second sub-pixel SPX2, the third sub-pixel SPX3, and the fourth sub-pixel SPX4 may be arranged in the first direction DR1. The first photo-sensing pixel PSR1 may be disposed between the second sub-pixel SPX2 and the third sub-pixel SPX3.

Each of the first to fourth sub-pixels SPX1 to SPX4 may include a pixel circuit PXC. For example, the first sub-pixel SPX1 may include a first pixel circuit PXC1. The second sub-pixel SPX2 may include a second pixel circuit PXC2. The third sub-pixel SPX3 may include a third pixel circuit PXC3. The fourth sub-pixel SPX4 may include a fourth pixel circuit PXC4.

The first photo-sensing pixel PSR1 may include a sensor circuit SC.

The first to fourth sub-pixels SPX1 to SPX4 may include the substrate SUB, the pixel circuit layer PCL, the display element layer DPL, the encapsulation layer TFE, the color filter layer CFL, and the window WD. The sensor circuit SC may include the substrate SUB, the pixel circuit layer PCL, the sensor layer SSL, the encapsulation layer TFE, the color filter layer CFL, and the window WD.

The substrate SUB may include transparent insulating material to allow light transmission. The substrate SUB may be a rigid substrate or a flexible substrate.

The first to fourth pixel circuits PXC1 to PXC4, the sensor circuit SC, and the signal lines may be disposed in the pixel circuit layer PCL.

The light emitting element (refer to "LED" in FIG. 6) electrically connected to each of the first to fourth pixel circuits PXC1 to PXC4 may be disposed in the display element layer DPL. The light receiving element (refer to "LRD" in FIG. 6) electrically connected to the sensor circuit SC may be disposed in the sensor layer SSL.

The first insulating layer INS1, the second insulating layer INS2, the third insulating layer INS3, the fourth insulating layer INS4, the fifth insulating layer INS5, the sixth insulating layer INS6, the seventh insulating layer INS7, the eighth insulating layer INS8, and the ninth insulating layer INS9 may be sequentially stacked on the substrate SUB in the third direction DR3.

One or more conductive layers and at least one or more semiconductor layer may be disposed on the substrate SUB. For example, the conductive layer may include a first conductive layer CL1 positioned between the substrate SUB and the first insulating layer INS1, a second conductive layer CL2 positioned between the second insulating layer INS2 and the third insulating layer INS3, a third conductive layer CL3 positioned between the third insulating layer INS3 and the fourth insulating layer INS4, a fourth conductive layer CL4 positioned between the fifth insulating layer INS5 and the sixth insulating layer INS6, a fifth conductive layer CL5 positioned between the sixth insulating layer INS6 and the seventh insulating layer INS7, a sixth conductive layer CL6 positioned between the seventh insulating layer INS7 and the eighth insulating layer INS8, and a seventh conductive layer CL7 positioned between the eighth insulating layer INS8 and the ninth insulating layer INS9. The semiconductor layer may include a first semiconductor layer SCL1 formed of polysilicon and positioned between the first insulating layer INS1 and the second insulating layer INS2, and a second semiconductor layer SCL2 formed of an oxide semiconductor and positioned between the fourth insulating layer INS4 and the fifth insulating layer INS5. The first conductive layer CL1, the first semiconductor layer SCL1, the second conductive layer CL2, the third conductive layer CL3, the second semiconductor layer SCL2, the fourth conductive layer CL4, the fifth conductive layer CL5, the sixth conductive layer CL6, and the seventh conductive layer CL7 may be successively stacked on one surface of the substrate SUB in the third direction DR3. According to the stacking order, the first conductive layer CL1 may correspond to the first additional layer FL, the first semiconductor layer SCL1 may correspond to the second additional layer SL, the second conductive layer CL2 may correspond to the third additional layer TL, the third conductive layer CL3 may correspond to the fourth additional layer FOL, the second semiconductor layer SCL2 may correspond to the fifth additional layer FIL, the fourth conductive layer CL4 may correspond to the sixth additional layer SIL, the fifth conductive layer CL5 may correspond to the seventh additional layer SEL, the sixth conductive layer CL6 may correspond to the eighth additional layer EIL, and the seventh conductive layer CL7 may correspond to the ninth additional layer NIL.

The signal lines may be disposed in the display area (refer to "DA" in FIG. 1) where the first to fourth sub-pixels SPX1 to SPX4 and the first photo-sensing pixel PSR1 are positioned. For example, first to thirteenth additional lines WL1 to WL13, the first to fourth data lines D1 to D4, and the first power line PL1 may be disposed in the display area DA.

The first additional line WL1 may extend in the first direction DR1 and may correspond to the third additional layer TL (or the second conductive layer CL2). In an embodiment, the first additional line WL1 may correspond to the i-th emission control line Ei described with reference to FIG. 6. One area of the first additional line WL1 may be the gate electrode of the fifth transistor T5 (hereinafter, referred to as "fifth gate electrode") of each of the first to fourth pixel circuits PXC1 to PXC4. Furthermore, another area of the first additional line WL1 may be the gate electrode of the sixth transistor T6 (hereinafter, referred to as "sixth gate electrode") of each of the first to fourth pixel circuits PXC1 to PXC4.

The second additional line WL2 may extend in the first direction DR1 and be spaced apart from the first additional line WL1. The second additional line WL2 may correspond to the third additional layer TL (or the second conductive layer CL2). In an embodiment, the second additional line WL2 may correspond to the 1i-th scan line S1*i* described with reference to FIG. 6. One area of the second additional line WL2 may be the gate electrode of the second transistor T2 (hereinafter, referred to as "second gate electrode") of each of the first to fourth pixel circuits PXC1 to PXC4. Furthermore, another area of the second additional line WL2 may be the gate electrode of the seventh transistor T7 (hereinafter, referred to as "seventh gate electrode") of each of the first to fourth pixel circuits PXC1 to PXC4. In addition, another area of the second additional line WL2 may correspond to a gate electrode of a 10a-th transistor T10*a* (hereinafter referred to as "10a-th gate electrode") of the sensor circuit SC and a gate electrode of a 10b-th transistor T10*b* (hereinafter referred to as "10b-th gate electrode").

The third additional line WL3 may extend in the first direction DR1 and may correspond to the fourth additional layer FOL (or the third conductive layer CL3). The third additional line WL3 may be a dummy line overlapping the sixth additional line WL6 formed of the sixth additional layer SIL.

The fourth additional line WL4 may extend in the first direction DR1 and be spaced apart from the third additional line WL3. The fourth additional line WL4 may correspond to the fourth additional layer FOL (or the third conductive layer CL3). The fourth additional line WL4 may be a dummy line overlapping the seventh additional line WL7 formed of the sixth additional layer SIL.

The fifth additional line WL5 may extend in the first direction DR1 and be spaced apart from the third and fourth additional lines WL3 and WL4. The fifth additional line WL5 may correspond to the fourth additional layer FOL (or the third conductive layer CL3). The fifth additional line WL5 may be a dummy line overlapping the eighth additional line WL8 formed of the sixth additional layer SIL.

The sixth additional line WL6 may extend in the first direction DR1 and may correspond to the sixth additional layer SIL (or the fourth conductive layer CL4). In an embodiment, the sixth additional line WL6 may be a reset line RSTL described with reference to FIG. 6 and be supplied with a reset signal RST. One area of the sixth additional line WL6 may be the gate electrode of the ninth transistor T9 (hereinafter, referred to as "ninth gate electrode") of the sensor circuit SC. The sixth additional line WL6 may overlap the third additional line WL3 and be electrically connected to the third additional line WL3. In this case, the reset signal RST may also be applied to the third additional line WL3.

The seventh additional line WL7 may extend in the first direction DR1 and be spaced apart from the sixth additional line WL6. The seventh additional line WL7 may correspond to the sixth additional layer SIL (or the fourth conductive layer CL4). In an embodiment, the seventh additional line WL7 may correspond to the 4i-th scan line S4*i* described with reference to FIG. 6 and be supplied with a fourth scan signal GC[i]. One area of the seventh additional line WL7 may be the gate electrode of the third transistor T3 (hereinafter, referred to as "third gate electrode") of each of the first to fourth pixel circuits PXC1 to PXC4. The seventh additional line WL7 may overlap the fourth additional line WL4 and be electrically connected to the fourth additional line WL4. In this case, the fourth scan signal GC[i] may also be applied to the fourth additional line WL4.

The eighth additional line WL8 may extend in the first direction DR1 and may be spaced apart from the sixth and seventh additional lines WL6 and WL7. The eighth additional line WL8 may correspond to the sixth additional layer SIL (or the fourth conductive layer CL4). In an embodiment, the eighth additional line WL8 may correspond to the 2i-th scan line S2*i* described with reference to FIG. 6 and may be supplied with a second scan signal GI[i]. One area of the eighth additional line WL8 may be the gate electrode of the fourth transistor T4 (hereinafter, referred to as "fourth gate electrode") of each of the first to fourth pixel circuits PXC1 to PXC4. The eighth additional line WL8 may overlap the fifth additional line WL5 and be electrically connected to the fifth additional line WL5. In this case, the second scan signal GI[i] may also be applied to the fifth additional line WL5.

The ninth additional line WL9 may extend in the first direction DR1 and correspond to the seventh additional layer SEL (or the fifth conductive layer CL5). In an embodiment, the ninth additional line WL9 may correspond to the fourth power line PL4 described with reference to FIG. 6. The ninth additional line WL9 may be supplied with the reset voltage VRST. The ninth additional line WL9 may be electrically connected to the twelfth additional line WL12 formed of the eighth additional layer EIL.

The tenth additional line WL10 may extend in the first direction DR1 and be spaced apart from the ninth additional line WL9. The tenth additional line WL10 may correspond to the seventh additional layer SEL (or the fifth conductive layer CL5). In an embodiment, the tenth additional line WL10 may correspond to the third power line PL3 described with reference to FIG. 6. The tenth additional line WL10 may be supplied with a second initialization power voltage Vint2. The tenth additional line WL10 may be electrically connected to the first semiconductor pattern SCP1 of the seventh transistor T7 formed of the second additional layer SL. The tenth additional line WL10 may be electrically connected to the second semiconductor pattern SCP2 of the eighth transistor T8 formed of the second additional layer SL.

The eleventh additional line WL11 may extend in the first direction DR1 and be spaced apart from the ninth and tenth additional lines WL9 and WL10. The eleventh additional line WL11 may correspond to the seventh additional layer SEL (or the fifth conductive layer CL5). In an embodiment, the eleventh additional line WL11 may correspond to the second power line PL2 described with reference to FIG. 6. The eleventh additional line WL11 may be supplied with a first initialization power voltage Vint1. The eleventh additional line WL11 may be electrically connected to the third semiconductor pattern SCP3 of the fourth transistor T4 formed of the fifth additional layer FIL.

The twelfth additional line WL12 may extend in the second direction DR2 and correspond to the eighth additional layer EIL (or the sixth conductive layer CL6). The twelfth additional line WL12 may be electrically connected to the ninth connection line WL9 through a corresponding first via hole VIH1 passing through the seventh insulating layer INS7. In this case, the reset signal VRST may be applied to the twelfth additional line WL12. In an embodiment, the ninth additional line WL9 may be a horizontal power line of the fourth power line PL4. The twelfth additional line WL12 may be a vertical power line of the fourth power line PL4. The fourth power line PL4 may have a mesh structure due to the ninth additional line WL9 and the twelfth additional line WL12 that are electrically connected to each other. Furthermore, the twelfth additional line WL12 may be electrically connected to an eighth conductive pattern CP8 through another first via hole VIH1 passing through the seventh insulating layer INS7.

The eighth conductive pattern CP8 may be formed of the seventh additional layer SEL (or the fifth conductive layer CL5), and be electrically connected to the twelfth additional line WL12 through the corresponding first via hole VIH1. Furthermore, the eighth conductive pattern CP8 may be electrically connected to the fourth semiconductor pattern SCP4 of the ninth transistor T9 formed of the fifth additional layer FIL through a corresponding second contactor CNT2 passing through the sixth insulating layer INS6 and the fifth insulating layer INS5. In an embodiment, the twelfth additional line WL12 formed of the eighth additional layer EIL may be electrically connected to the fourth semiconductor pattern SCP4 of the ninth transistor T9 formed of the fifth additional layer FIL through the eighth conductive pattern CP8 formed of the seventh additional layer SEL.

The thirteenth additional line WL13 may extend in the second direction DR2 and correspond to the ninth additional layer NIL (or the seventh conductive layer CL7). In an embodiment, the thirteenth additional line WL13 may correspond to the k-th readout line RXk (hereinafter referred to as "readout line") described with reference to FIG. 6. In an embodiment, the thirteenth additional line WL13 may be electrically connected to a third connection pattern CNP3 through a corresponding second via hole VIH2 passing through the eighth insulating layer INS8.

The third connection pattern CNP3 may correspond to the eighth additional layer EIL (or the sixth conductive layer CL6). A first end of the third connection pattern CNP3 may be electrically connected to the thirteenth additional line WL13 formed in a different layer (or formed of the ninth additional layer NIL) through the corresponding second via hole VIH2. A second end of the third connection pattern CNP3 may be electrically connected to the seventh conductive pattern CP7 through a corresponding first via hole VIH1 passing through the seventh insulating layer INS7.

The seventh conductive pattern CP7 may correspond to the seventh additional layer SEL (or the fifth conductive layer CL5). A first end of the seventh conductive pattern CP7 may be electrically connected to the third connection pattern CNP3 formed in a different layer (or formed of the eighth additional layer EIL) through the corresponding first via hole VIH1. A second end of the seventh conductive pattern CP7 may be electrically connected to the second semiconductor pattern SCP2 of the tenth transistor T10 formed of the second additional layer SL through a corresponding first contactor CNT1 passing through the sixth insulating layer INS6, the fifth insulating layer INS5, the fourth insulating layer INS4, the third insulating layer INS3, and the second insulating layer INS2.

In an embodiment, the thirteenth additional line WL13 formed of the ninth additional layer NIL may be electrically connected to the second semiconductor pattern SCP2 of the tenth transistor T10 formed of the second additional layer SL both through the third connection pattern CNP3 formed of the eighth additional layer EIL and through the seventh conductive pattern CP7 formed of the seventh additional layer SEL.

The first data line D1 may extend in the second direction DR2 and correspond to the eighth additional layer EIL (or the sixth conductive layer CL6). The first data line D1 may be the j-th data line Dj described with reference to FIG. 6. The first data line D1 may be electrically connected to the first semiconductor pattern SCP1 of the second transistor T2 of the first pixel circuit PXC1.

The second data line D2 may extend in the second direction DR2, and be spaced apart from the first data line D1 and the twelfth additional line WL12. The second data line D2 may correspond to the eighth additional layer EIL (or the sixth conductive layer CL6). The second data line D2 may be the j-th data line Dj described with reference to FIG. 6. The second data line D2 may be electrically connected to the first semiconductor pattern SCP1 of the second transistor T2 of the second pixel circuit PXC2.

The third data line D3 may extend in the second direction DR2, and be spaced apart from the twelfth additional line WL12 and the first and second data lines D1 and D2. The third data line D3 may correspond to the eighth additional layer EIL (or the sixth conductive layer CL6). The third data line D3 may be the j-th data line Dj described with reference to FIG. 6. The third data line D3 may be electrically connected to the first semiconductor pattern SCP1 of the second transistor T2 of the third pixel circuit PXC3.

The fourth data line D4 may extend in the second direction DR2, and be spaced apart from the twelfth additional line WL12 and the first to third data lines D1, D2, and D3. The fourth data line D4 may correspond to the eighth additional layer EIL (or the sixth conductive layer CL6). The fourth data line D4 may be the j-th data line Dj described with reference to FIG. 6. The fourth data line D4 may be electrically connected to the first semiconductor pattern SCP1 of the second transistor T2 of the fourth pixel circuit PXC4.

The first power line PL1 may extend in the second direction DR2, and be spaced apart from the twelfth additional line WL12 and the first to fourth data lines D1 to D4. The first power line PL1 may correspond to the eighth additional layer EIL (or the sixth conductive layer CL6). The first power line PL1 may be the first power line PL1 described with reference to FIG. 6. The first power line PL1 may be supplied with a first power voltage VDD. The first sub-pixel SPX1 and the second sub-pixel SPX2 may share one first power line PL1. The third sub-pixel SPX3 and the fourth sub-pixel SPX4 may share one first power line PL1. However, the present disclosure is not necessarily limited to the aforementioned example.

In each of the first to fourth sub-pixels SPX1 to SPX4, the first power line PL1 may be electrically connected to the first conductive pattern CP1 formed of the seventh additional layer SEL through a corresponding first via hole VIH1 passing through the seventh insulating layer INS7.

The first conductive pattern CP1 may be formed of the seventh additional layer SEL, and be electrically connected to the first power line PL1 through the corresponding first via hole VIH1. Furthermore, the first conductive pattern CP1 may be electrically connected to the first semiconductor pattern SCP1 of the fifth transistor T5 of each pixel circuit PXC through a corresponding first contactor CTN1 passing through the sixth insulating layer INS6, the fifth insulating layer INS5, the fourth insulating layer INS4, the third insulating layer INS3, and the second insulating layer INS2. In an embodiment, the first power line PL1 formed of the eighth additional layer EIL may be electrically connected to the first semiconductor pattern SCP1 of the fifth transistor T5 formed of the second additional layer SL through the first conductive pattern CP1 formed of the seventh additional layer SEL.

The first data line D1, the second data line D2, the third data line D3, the fourth data line D4, and the first power line PL1 may be formed through the same process as the twelfth additional line WL12, including the same material, and may be disposed in the same layer.

The first pixel circuit PXC1, the second pixel circuit PXC2, the third pixel circuit PXC3, and the fourth pixel circuit PXC4 may have a substantially similar or identical structure. For example, the first and second pixel circuits PXC1 and PXC2 positioned on a left side of the sensor circuit SC and the third and fourth pixel circuits PXC3 and PXC4 positioned on a right side of the sensor circuit SC may be mutually symmetrical. For example, the first pixel circuit PXC1 and the third pixel circuit PXC3 may be mutually symmetrical. The second pixel circuit PXC2 and the fourth pixel PXC4 may be mutually symmetrical. In an embodiment, the first pixel circuit PXC1 and the second pixel circuit PXC2 may form a mirror symmetry with respect to a certain line RL extending in the second direction DR2. The third pixel circuit PXC3 and the fourth pixel circuit PXC4 may form a mirror symmetry with respect to the certain line RL extending in the second direction DR2. However, the present disclosure is not necessarily limited to the aforementioned example.

Hereinafter, for the sake of explanation, the following description will be centered on the first pixel circuit PXC1, and to the extent that an element is not described in detail with respect to this figure, it may be understood that the element is at least similar to a corresponding element that has been described elsewhere within the present disclosure.

The first pixel circuit PXC1 may include first, second, third, fourth, fifth, sixth, and seventh transistors T1, T2, T3, T4, T5, T6, and T7, and a storage capacitor Cst.

The first transistor T1 may include a first active pattern ACT1 and a first gate electrode GE1.

The first active pattern ACT1 may be one area of the first semiconductor pattern SCP1 overlapping the first gate electrode GE1. The first semiconductor pattern SCP1 may correspond to the second additional layer SL (or the first semiconductor layer SCL1). The first active pattern ACT1 may be a channel area of the first transistor T1.

For example, the channel area may be an undoped semiconductor pattern without impurities, and may be an intrinsic semiconductor. The other area of the semiconductor pattern except the channel area may be a semiconductor pattern doped with impurities.

One area of the first semiconductor pattern SCP1 connected to a first side of the first active pattern ACT1 (or the channel area) (e.g., a left side of the first active pattern ACT1 in a plan view) without overlapping the first gate electrode GE1 may be a first contact area. One area of the first semiconductor pattern SCP1 connected to a second side of the first active pattern ACT1 (e.g., a right side of the first active pattern ACT1 in a plan view) without overlapping the first gate electrode GE1 may be a second contact area. The first contact area and the second contact area may extend in opposite directions from the first active pattern ACT1 (or the channel area). The first contact area and the second contact area may face each other in the first direction DR1 with the first active pattern ACT1 interposed therebetween.

The first contact area may be connected to the first side of the first active pattern ACT1, and connected both to the first semiconductor pattern SCP1 of the second transistor T2 and the first semiconductor pattern SCP1 of the fifth transistor T5. The second contact area may be connected to the second side of the first active pattern ACT1, and connected to the first semiconductor pattern SCP1 of the sixth transistor T6.

The first gate electrode GE1 may overlap the first active pattern ACT1, and correspond to the third additional layer TL (or the second conductive layer CL2). The first gate electrode GE1 may be an island-shaped conductive pattern. The first gate electrode GE1 may be electrically connected to the third transistor T3 and the fourth transistor T4 through the third conductive pattern CP3.

The third conductive pattern CP3 may correspond to the seventh additional layer SEL (or the fifth conductive layer CL5). A first end of the third conductive pattern CP3 may be electrically connected to the first gate electrode GE1 through a corresponding first contactor CNT1 that sequentially passes through the sixth insulating layer INS6, the fifth insulating layer INS5, the fourth insulating layer INS4, and the third insulating layer INS3. A second end of the third conductive pattern CP3 may be electrically connected to one area of the third semiconductor pattern SCP3 shared by the third transistor T3 and the fourth transistor T4 through a corresponding second contactor CNT2 that sequentially passes through the sixth insulating layer INS6 and the fifth insulating layer INS5.

In an embodiment, the first gate electrode GE1 may overlap the bottom metal pattern BML.

The bottom metal pattern BML may correspond to the first additional layer FL (or the first conductive layer CL1). The bottom metal pattern BML may overlap the first transistor T1 (or the bottom electrode LE, the upper electrode UE), in a plan view. The bottom metal pattern BML may shield the first transistor T1 (or the bottom electrode LE, the upper electrode UE) from below. A constant voltage (e.g., the first power voltage VDD) may be applied to the bottom metal pattern BML, but the present disclosure is not necessarily limited thereto. The bottom metal pattern BML may extend in the first direction DR1 and the second direction DR2 based on the first transistor T1. The bottom metal pattern BML may have a mesh structure over the entirety of the display area DA.

The second transistor T2 may include a second active pattern ACT2 and a second gate electrode.

The second active pattern ACT2 may be one area of the first semiconductor pattern SCP1 overlapping the second additional line WL2. The first semiconductor pattern SCP1 may correspond to the second additional layer SL (or the first semiconductor layer SCL1). The second active pattern ACT2 may be a channel area of the second transistor T2.

One area of the first semiconductor pattern SCP1 connected to a first side of the second active pattern ACT2 (e.g., a lower side of the second active pattern ACT2 in a plan view) without overlapping the second additional line WL2 may be a first contact area. One area of the first semiconductor pattern SCP1 connected to a second side of the second active pattern ACT2 (e.g., an upper side of the second active pattern ACT2 in a plan view) without overlapping the second additional line WL2 may be a second contact area.

The first contact area may be connected to the first side of the second active pattern ACT2, and electrically connected to the fifth conductive pattern CP5. The second contact area may be connected to the second side of the second active pattern ACT2, and connected to the first contact area of the first transistor T1.

The fifth conductive pattern CP5 may correspond to the seventh additional layer SEL (or the fifth conductive layer CL5). The fifth conductive pattern CP5 may be electrically connected to the first semiconductor pattern SCP1 corresponding to the first contact area of the second transistor T2 through a corresponding first contactor CNT1 passing through the sixth insulating layer INS6, the fifth insulating layer INS5, the fourth insulating layer INS4, the third insulating layer INS3, and the second insulating layer INS2.

The second gate electrode may be one area of the second additional line WL2 overlapping the second active pattern ACT2.

The third transistor T3 may include a third active pattern ACT3 and a third gate electrode.

The third active pattern ACT3 may be one area of the third semiconductor pattern SCP3 overlapping the seventh additional line WL7, and form a channel area of the third transistor T3. The third semiconductor pattern SCP3 may correspond to the fourth additional layer FIL (or the second semiconductor layer SCL2).

One area of the third semiconductor pattern SCP3 connected to a first side of the third active pattern ACT3 (e.g., an upper side of the third active pattern ACT3 in a plan view) without overlapping the seventh additional line WL7 may be a first contact area. One area of the third semiconductor pattern SCP3 connected to a second side of the third active pattern ACT3 (e.g., a lower side of the third active pattern ACT3 in a plan view) without overlapping the seventh additional line WL7 may be a second contact area.

The first contact area may be connected to the first side of the third active pattern ACT3, and electrically connected to the first transistor T1 and the sixth transistor T6 through the fourth conductive pattern CP4. The second contact area may be connected to the second side of the third active pattern ACT3, and connected to the third semiconductor pattern SCP3 of the fourth transistor T4.

The fourth conductive pattern CP4 may correspond to the seventh additional layer SEL (or the fifth conductive layer CL5). A first end of the fourth conductive pattern CP4 may be electrically connected to the first contact area of the third transistor T3 through a corresponding second contactor CNT2 passing through the sixth insulating layer INS6 and the fifth insulating layer INS5. A second end of the fourth conductive pattern CP4 may be electrically connected to one area of the first semiconductor pattern SCP1 that is shared by the first transistor T1 and the sixth transistor T6 through a corresponding first contactor CNT1 passing through the sixth insulating layer INS6, the fifth insulating layer INS5, the fourth insulating layer INS4, the third insulating layer INS3, and the second insulating layer INS2.

The third gate electrode may be one area of the seventh additional line WL7 overlapping the third active pattern ACT3.

The fourth transistor T4 may include a fourth active pattern ACT4 and a fourth gate electrode.

The fourth active pattern ACT4 may be one area of the third semiconductor pattern SCP3 overlapping the eighth additional line WL8, and form a channel area of the fourth transistor T4. The third semiconductor pattern SCP3 may correspond to the fifth additional layer FIL (or the second semiconductor layer SCL2).

One area of the third semiconductor pattern SCP3 connected to a first side of the fourth active pattern ACT4 (e.g., an upper side of the fourth active pattern ACT4 in a plan view) without overlapping the eighth additional line WL8 may be a first contact area. One area of the third semiconductor pattern SCP3 connected to a second side of the fourth active pattern ACT4 (e.g., a lower side of the fourth active pattern ACT4 in a plan view) without overlapping the eighth additional line WL8 may be a second contact area.

The third contact area may be connected to the first side of the fourth active pattern ACT4, and connected to the third semiconductor pattern SCP3 of the third transistor T3. The second contact area may be connected to the second side of the fourth active pattern ACT4, and electrically connected to the eleventh additional line WL11 formed of the seventh additional layer SEL through a corresponding second contactor CNT2 passing through the sixth insulating layer INS6 and the fifth insulating layer INS5.

The fourth gate electrode may be one area of the eighth additional line WL8 overlapping the fourth active pattern ACT4.

The fifth transistor T5 may include a fifth active pattern ACT5 and a fifth gate electrode.

The fifth active pattern ACT5 may be one area of the first semiconductor pattern SCP1 overlapping the first additional line WL1, and form a channel area of the fifth transistor T5. The first semiconductor pattern SCP1 may correspond to the second additional layer SL (or the first semiconductor layer SCL1).

One area of the first semiconductor pattern SCP1 connected to a first side of the fifth active pattern ACT5 (e.g., an upper side of the fifth active pattern ACT5 in a plan view) without overlapping the first additional line WL1 may be a first contact area. One area of the first semiconductor pattern SCP1 connected to a second side of the fifth active pattern ACT5 (e.g., a lower side of the fifth active pattern ACT5 in a plan view) without overlapping the first additional line WL1 may be a second contact area.

The first contact area may be connected to the first side of the fifth active pattern ACT5, and electrically connected to the first conductive pattern CP1 through a corresponding first contactor CNT1. The second contact area may be connected to the second side of the fifth active pattern ACT5, and connected to the first semiconductor pattern SCP1 of each of the first and second transistors T1 and T2.

The first conductive pattern CP1 may correspond to the seventh additional layer SEL (or the fifth conductive layer CL5). A first end of the first conductive pattern CP1 may be electrically connected to the first contact area of the fifth transistor T5 through a corresponding first contactor CNT1. A second end of the first conductive pattern CP1 may be electrically connected to the upper electrode UE through a corresponding first contactor CNT1 passing through the sixth insulating layer INS6, the fifth insulating layer INS5, and the fourth insulating layer INS4.

The fifth gate electrode may be one area of the first additional line WL1 overlapping the fifth active pattern ACT5.

The sixth transistor T6 may include a sixth active pattern ACT6 and a sixth gate electrode.

The sixth active pattern ACT6 may be one area of the first semiconductor pattern SCP1 overlapping the first additional line WL1, and form a channel area of the sixth transistor T6. The first semiconductor pattern SCP1 may correspond to the second additional layer SL (or the first semiconductor layer SCL1).

One area of the first semiconductor pattern SCP1 connected to a first side of the sixth active pattern ACT6 (e.g., an upper side of the sixth active pattern ACT6 in a plan view) without overlapping the first additional line WL1 may be a first contact area. One area of the first semiconductor pattern SCP1 connected to a second side of the sixth active pattern ACT6 (e.g., a lower side of the sixth active pattern ACT6 in a plan view) without overlapping the first additional line WL1 may be a second contact area.

The first contact area may be connected to each of the first side of the sixth active pattern ACT6 and the first semiconductor pattern SCP1 of the seventh transistor T7. The second contact area may be connected to each of the second side of the sixth active pattern ACT6 and the first semiconductor pattern SCP1 of the first transistor T1. Furthermore, the second contact area may be electrically connected to the second conductive pattern CP2 through a corresponding first contactor CTN1.

The second conductive pattern CP2 may correspond to the seventh additional layer SEL (or the fifth conductive layer CL5). The second conductive pattern CP2 may be electrically connected to the second contact area of the sixth transistor T6 through a corresponding first contactor CNT1 passing through the sixth insulating layer INS6, the fifth insulating layer INS5, the fourth insulating layer INS4, the third insulating layer INS3, and the second insulating layer INS2. Furthermore, the second conductive pattern CP2 may be electrically connected to the first connection pattern CNP1 formed of the eighth additional layer EIL (or the sixth conductive layer CL6) through a corresponding first via hole VIH1.

A first end of the first connection pattern CNP1 may be electrically connected to the second conductive pattern CP2 through a corresponding first via hole VIH1 passing through the seventh insulating layer INS7. A second end of the first connection pattern CNP1 may be electrically connected to an anode electrode through a corresponding second via hole VIH2 passing through the eighth insulating layer INS8. The anode electrode may be the anode electrode AE described with reference to FIG. 6.

The sixth gate electrode may be one area of the first additional line WL1 overlapping the sixth active pattern ACT6.

The seventh transistor T7 may include a seventh active pattern ACT7 and a seventh gate electrode.

The seventh active pattern ACT7 may be one area of the first semiconductor pattern SCP1 overlapping the second additional line WL2. The first semiconductor pattern SCP1 may correspond to the second additional layer SL (or the first semiconductor layer SCL1). The seventh active pattern ACT7 may be a channel area of the seventh transistor T7.

One area of the first semiconductor pattern SCP1 connected to a first side of the seventh active pattern ACT7 (e.g., a lower side of the seventh active pattern ACT7 in a plan view) without overlapping the second additional line WL2 may be a first contact area. One area of the first semiconductor pattern SCP1 connected to a second side of the seventh active pattern ACT7 (e.g., an upper side of the seventh active pattern ACT7 in a plan view) without overlapping the second additional line WL2 may be a second contact area.

The first contact area may be connected to the first side of the seventh active pattern ACT7, and connected to the first semiconductor pattern SCP1 of the sixth transistor T6. The second contact area may be connected to the second side of the seventh active pattern ACT7, and electrically connected to the tenth additional line WL10 through a corresponding first contactor CNT1 passing through the sixth insulating layer INS6, the fifth insulating layer INS5, the fourth insulating layer INS4, the third insulating layer INS3, and the second insulating layer INS2.

The seventh gate electrode may be one area of the second additional line WL2 overlapping the seventh active pattern ACT7.

The storage capacitor Cst may include a lower electrode LE and an upper electrode UE.

The lower electrode LE may be integrally formed with the first gate electrode GE1. The lower line LE may correspond to the third additional layer TL (or the second conductive layer CL2).

The upper electrode UE may overlap the lower electrode LE and correspond to the fourth additional layer FOL (or the third conductive layer CL3). The upper electrode UE may include an opening OPN formed by removing a portion thereof. The lower electrode LE (or the first gate electrode GE1) may be exposed through the opening OPN. The upper electrode UE may be electrically connected to the first conductive pattern CP1. In an embodiment, the upper electrode UE formed of the fourth additional layer FOL, the first power line PL1 formed of the eighth additional layer EIL, and the first semiconductor pattern SCP1 of the fifth transistor T5 formed of the second additional layer SL may be electrically connected through the first conductive pattern CP1.

The sensor circuit SC may be positioned between the second pixel circuit PXC2 and the third pixel circuit PXC3. However, the present disclosure is not necessarily limited to the aforementioned example and the position of the sensor circuit SC may be changed in various ways.

The sensor circuit SC may include the eighth transistor T8, the ninth transistor T9, and the tenth transistor T10.

The eighth transistor T8 may include an eighth active pattern ACT8 and an eighth gate electrode GE8.

The eighth active pattern ACT8 may be one area of the second semiconductor pattern SCP2 overlapping the eighth gate electrode GE8. The second semiconductor pattern SCP2 may correspond to the second additional layer SL (or the first semiconductor layer SCL1). The second semiconductor pattern SCP2 may be spaced apart from the first semiconductor pattern SCP1. The eighth active pattern ACT8 may be a channel area of the eighth transistor T8.

One area of the second semiconductor pattern SCP2 connected to a first side of the eighth active pattern ACT8 (or the channel area) (e.g., a left side of the eighth active pattern ACT8 in a plan view) without overlapping the eighth gate electrode GE8 may be a first contact area. One area of the second semiconductor pattern SCP2 connected to a second side of the eighth active pattern ACT8 (e.g., a right side of the eighth active pattern ACT8 in a plan view) without overlapping the eighth gate electrode GE8 may be a second contact area.

The first contact area may be connected to each of the first side of the eighth active pattern ACT8 and the second semiconductor pattern SCP2 of the 10a-th transistor T10*a*. The second contact area may be connected to the second side of the eighth active pattern ACT8, and electrically connected to the tenth additional line WL10 through a corresponding first contactor CNT1 passing through the sixth insulating layer INS6, the fifth insulating layer INS5, the fourth insulating layer INS4, the third insulating layer INS3, and the second insulating layer INS2.

The eighth gate electrode GE8 may overlap the eighth active pattern ACT8, and correspond to the third additional layer TL (or the second conductive layer CL2). The eighth gate electrode GE8 may be an island-shaped conductive pattern. The eighth gate electrode GE8 may be electrically connected to the ninth transistor T9 through the sixth conductive pattern CP6.

The sixth conductive pattern CP6 may correspond to the seventh additional layer SEL (or the fifth conductive layer CL5). A first end of the sixth conductive pattern CP6 may be electrically connected to the eighth gate electrode GE8 through a corresponding first contactor CNT1 that sequentially passes through the sixth insulating layer INS6, the fifth insulating layer INS5, the fourth insulating layer INS4, and the third insulating layer INS3. A second end of the sixth conductive pattern CP6 may be electrically connected to one area of the fourth semiconductor pattern SCP4 of the ninth transistor T9 through a corresponding second contactor CNT2 passing through the sixth insulating layer INS6 and the fifth insulating layer INS5. Furthermore, the sixth conductive pattern CP6 may be electrically connected to the second connection pattern CNP2 formed of the eighth additional layer EIL (or the sixth conductive layer CL6).

The second connection pattern CNP2 may be electrically connected to the sixth conductive pattern CP6 through a corresponding first via hole VIH1 passing through the seventh insulating layer INS7. Furthermore, the second connection pattern CNP2 may be electrically connected to the bridge pattern BRP formed of the ninth additional layer NIL (or the seventh conductive layer CL7).

The bridge pattern BRP may be electrically connected to the second connection pattern CNP2 via a corresponding second via hole VIH2 passing through the eighth insulating layer INS8. Furthermore, the bridge pattern BRP may be electrically connected to a first electrode of the light receiving element (refer to "LRD" of FIG. 6) of the sensor circuit SC. The first electrode may be the first electrode EL1 described with reference to FIG. 6. The bridge pattern BRP may be formed through the same process as the thirteenth additional line WL13, including the same material, and may be provided in the same layer.

The ninth transistor T9 may include a ninth active pattern ACT9 and a ninth gate electrode.

The ninth active pattern ACT9 may be one area of the fourth semiconductor pattern SCP4 overlapping the sixth additional line WL6. The fourth semiconductor pattern SCP4 may correspond to the fifth additional layer FIL (or the second semiconductor layer SCL2). The fourth semiconductor pattern SCP4 may be spaced apart from the third semiconductor pattern SCP3. The ninth active pattern ACT9 may be a channel area of the ninth transistor T9.

One area of the fourth semiconductor pattern SCP4 connected to a first side of the ninth active pattern ACT9 (e.g., a lower side of the ninth active pattern ACT9 in a plan view) without overlapping the sixth additional line WL6 may be a first contact area. One area of the fourth semiconductor pattern SCP4 connected to a second side (e.g., an upper side of the ninth active pattern ACT9 in a plan view) of the ninth active pattern ACT9 without overlapping the sixth additional line WL6 may be a second contact area.

The first contact area may be connected to the first side of the ninth active pattern ACT9, and electrically connected to the eighth gate electrode GE8 of the eighth transistor T8 through the sixth conductive pattern CP6. The second contact area may be connected to the second side of the ninth active pattern ACT9, and electrically connected to the eighth conductive pattern CP8 through a corresponding second contactor CNT2.

The ninth gate electrode may be one area of the sixth additional line WL6 overlapping the ninth active pattern ACT2.

The tenth transistor T10 may have a dual gate structure in which sub-transistors are connected in series to prevent current leakage. For example, the tenth transistor T10 may include a 10a-th transistor T10*a* and a 10b-th transistor T10*b*.

The 10a-th transistor T10*a* may include a 10a-th active pattern ACT10*a* and a 10a-th gate electrode.

The 10a-th active pattern ACT10*a* may be one area of the second semiconductor pattern SCP2 overlapping the second additional line WL2. The second semiconductor pattern SCP2 may correspond to the second additional layer SL (or the first semiconductor layer SCL1). The 10a-th active pattern ACT10*a* may be a channel area of the 10a-th transistor T10*a*.

One area of the second semiconductor pattern SCP2 connected to a first side of the 10a-th active pattern ACT10*a* (e.g., an upper side of the 10a-th active pattern ACT10*a* in a plan view) without overlapping the second additional line WL2 may be a first contact area. One area of the second semiconductor pattern SCP2 connected to a second side of the 10a-th active pattern ACT10*a* (e.g., a lower side of the 10a-th active pattern ACT10*a* in a plan view) without overlapping the second additional line WL2 may be a second contact area.

The first contact area may be connected to each of the first side of the 10a-th active pattern ACT10*a* and the second semiconductor pattern SCP2 of the eighth transistor T8. The second contact area may be connected to each of the second side of the 10a-th active pattern ACT10*a* and the second semiconductor pattern SCP2 of the 10b-th transistor T10*b*.

The 10a-th gate electrode may be one area of the second additional line WL2 overlapping the 10a-th active pattern ACT10*a*.

The 10b-th transistor T10*b* may include a 10b-th active pattern ACT10*b* and a 10b-th gate electrode.

The 10b-th active pattern ACT10*b* may be one area of the second semiconductor pattern SCP2 overlapping a protrusion protruding in a direction opposite to the second direction DR2 from the second additional line WL2 extending in the first direction DR1. The 10b-th active pattern ACT10*b* may be a channel area of the 10b-th transistor T10*b*.

One area of the second semiconductor pattern SCP2 connected to a first side of the 10b-th active pattern ACT10*b* (e.g., a left side of the 10b-th active pattern ACT10*b* in a plan view) without overlapping the protrusion of the second additional line WL2 may be a first contact area. One area of the second semiconductor pattern SCP2 connected to a second side of the 10b-th active pattern ACT10*b* (e.g., a right side of the 10b-th active pattern ACT10*b* in a plan view) without overlapping the protrusion of the second additional line WL2 may be a second contact area.

The first contact area may be connected to each of the first side of the 10b-th active pattern ACT10*b* and the second semiconductor pattern SCP2 of the 10a-th transistor T10*a*. The second contact area may be connected to the second side of the 10b-th active pattern ACT10*b*, and electrically connected to the seventh conductive pattern CP7.

The seventh conductive pattern CP7 may correspond to the seventh additional layer SEL (or the fifth conductive layer CL5). The seventh conductive pattern CP7 may be electrically connected to the second semiconductor pattern SCP2 of the 10b-th transistor T10*b* through a corresponding first contactor CNT1 passing through the sixth insulating layer INS6 and the fifth insulating layer INS5. The seventh conductive pattern P7 may be electrically connected to the third connection pattern CNP3 positioned in the eighth additional layer EIL.

In the aforementioned embodiment, the twelfth additional line WL12, the second data line D2, and the third data line D3 that are formed of the eighth additional layer EIL may be spaced apart from each other on the seventh insulating layer INS7. The twelfth additional line WL12 to which a reset voltage VRST having a constant voltage level is applied may be disposed between the second data line D2 and the third data line D3. The thirteenth additional line WL13 (or the readout line RXk) that is formed of the ninth additional layer NIL on the eighth insulating layer INS8 and disposed in a different layer from the twelfth additional line WL12 and the second and third data lines D2 and D3 may overlap the twelfth additional line WL12 in a plan view and a cross-sectional view, but not overlap the second and third data lines D2 and D3. Furthermore, the thirteenth additional line WL13 might not overlap the first power line PL1 in a plan view.

According to the aforementioned embodiment, the thirteenth additional line WL13 corresponding to the readout line RXk and the second and third data lines D2 and D3 are formed of different layers (or positioned on different layers) from each other, whereby a spacing distance between the thirteenth additional line WL13 and the second data line D2 and a spacing distance between the thirteenth additional line WL13 and the third data line D3 can be secured. Furthermore, in the case where the twelfth additional line WL12 formed of the eighth additional layer EIL and positioned between the second data line D2 and the third data line D3 is disposed under the thirteenth additional line WL13 formed of the ninth additional layer NIL, the twelfth additional line WL12 may be used as a shielding component to reduce or prevent coupling capacitance occurring between the third data lines D2 and D3 and the thirteenth additional line WL13. For example, in the case where the twelfth additional line WL12 is used as a shielding component so that a spacing distance between the second and third data lines D2 and D3 and the thirteenth additional line WL13 is secured, it is possible to reduce or prevent a phenomenon where a data signal transmitted to each of the second and third data lines D2 and D3 (or a sensing signal transmitted to the thirteenth additional line WL13) is influenced by a sensing signal transmitted to the thirteenth additional line WL13 (or a data signal transmitted to each of the second and third data lines D2 and D3). For example, a phenomenon of coupling the thirteenth additional line WL13 (or the readout line RXk) with an adjacent data line, e.g., each of the second and third data lines D2 and D3, can be reduced or prevented. Therefore, noise occurring in the sensing signal applied to the thirteenth additional line WL13 by data signals applied to each of the second and third data lines D2 and D3 can be reduced. Furthermore, noise occurring in the data signal applied to each of the second and third data lines D2 and D3 by the sensing signal applied to the thirteenth additional line WL13 (or the k-th readout line RXk) can be reduced. As a result, the fingerprint sensitivity and fingerprint sensing accuracy in the first photo-sensing pixel PSR1 may be increased, whereby the reliability of the display device 1 can be further enhanced.

In the aforementioned embodiment, although there has been illustrated the case where the twelfth additional line WL12 formed of the eighth additional layer EIL and the thirteenth additional line WL13 formed of the ninth additional layer NIL overlap each other, the present disclosure is not necessarily limited thereto. In an embodiment, as illustrated in FIG. 18, the thirteenth additional line WL13 is positioned more adjacent to the bridge pattern BRP on the eighth insulating layer INS8, the thirteenth additional line WL13 might not overlap the twelfth additional line WL12. In this case, the spacing distance between the thirteenth additional line WL13 and the third data line D3 is increased, whereby the coupling capacitance occurring between the thirteenth additional line WL13 and the third data line D3 can more reliably reduced or prevented.

Furthermore, in an embodiment, as illustrated in FIG. 19, the spacing distance between the thirteenth additional line WL13 and the third data line D3 is further increased by designing the width of the thirteenth additional line WL13 to be reduced. In addition, if the width of the twelfth additional line WL12 overlapping the thirteenth additional line WL13 is increased, the shielding effect of the twelfth additional line WL12 functioning as a shielding component can be further maximized. As a result, the coupling capacitance occurring between the thirteenth additional line WL13 and the third data line D3 can more reliably reduced or prevented.

Figure 20:
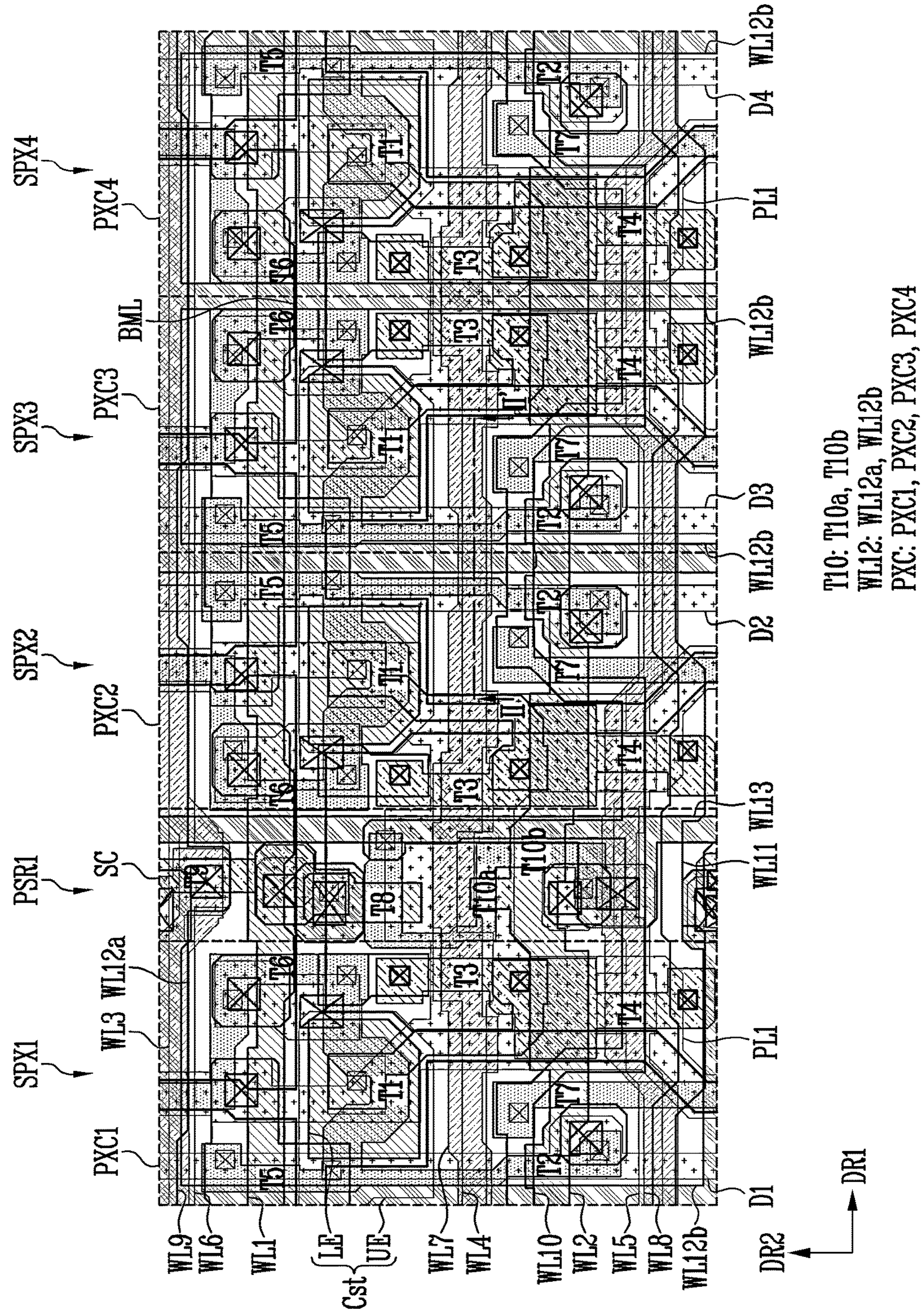
FIG. 20 is a schematic plan view illustrating sub-pixels and a photo-sensing pixel in accordance with an embodiment.
Figure 21:
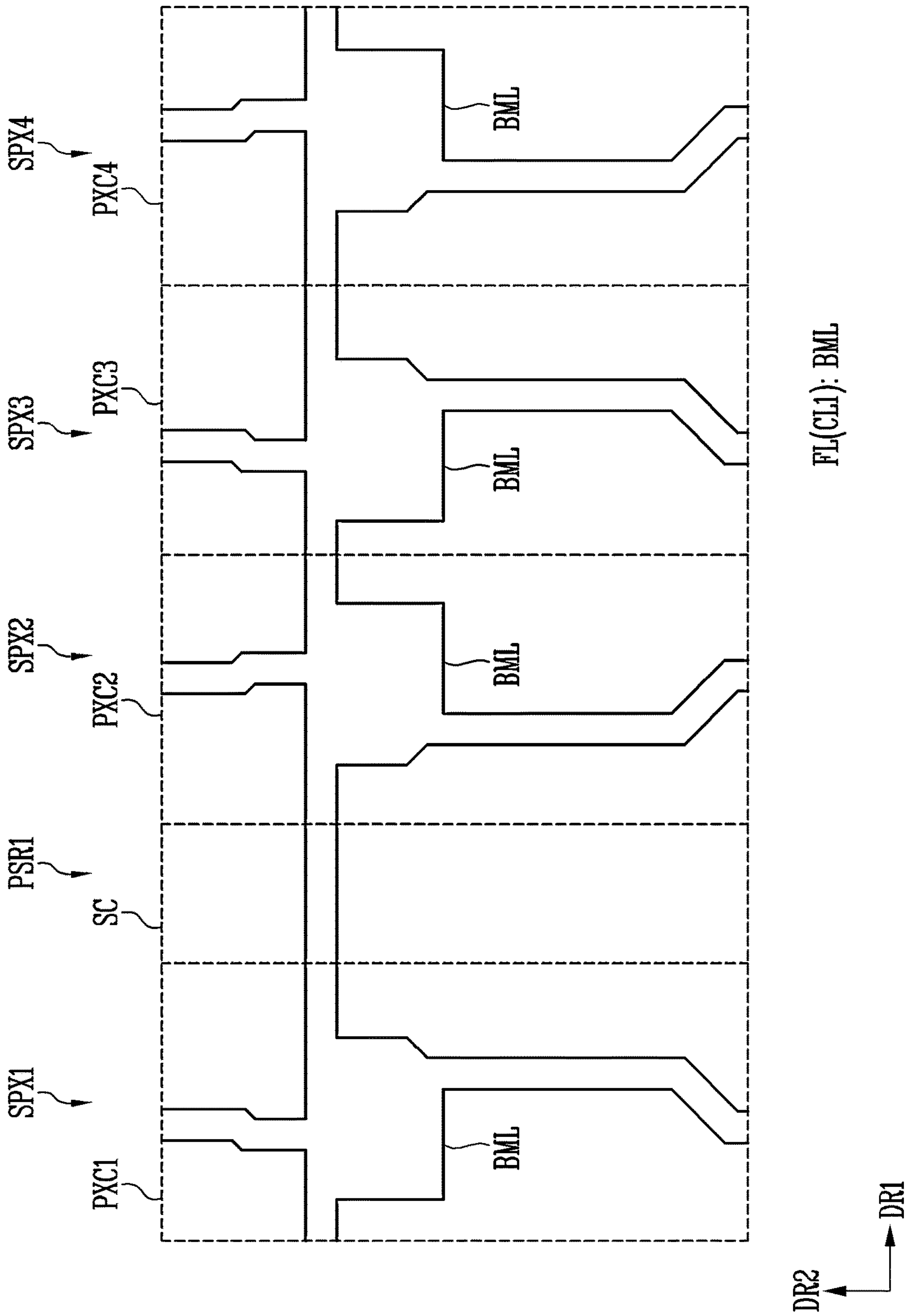
FIG. 21 is a schematic plan view illustrating components included in a first additional layer in FIG. 20.
Figure 22:
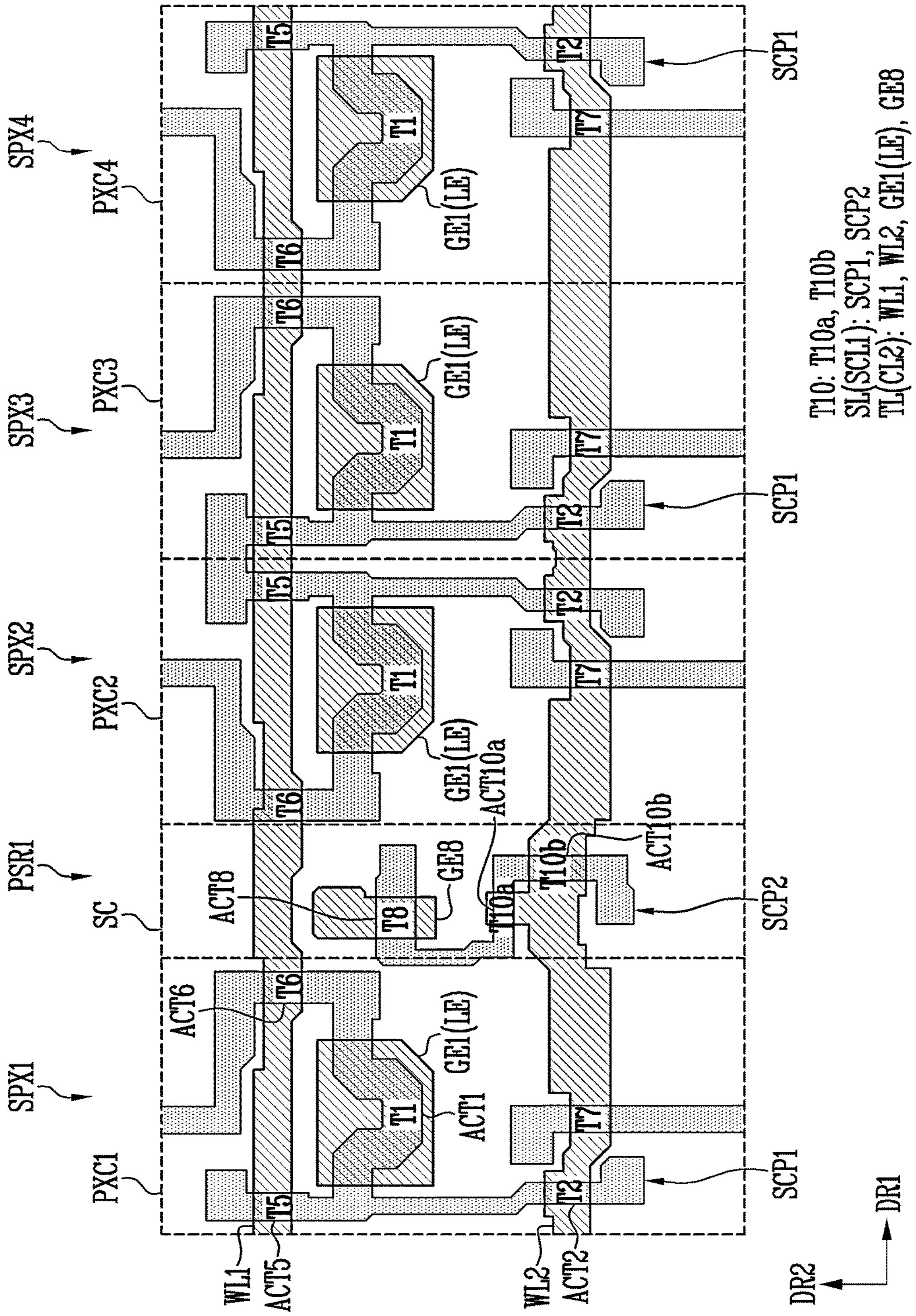
FIG. 22 is a schematic plan view illustrating components included in a second additional layer and a third additional layer in FIG. 20.
Figure 23:
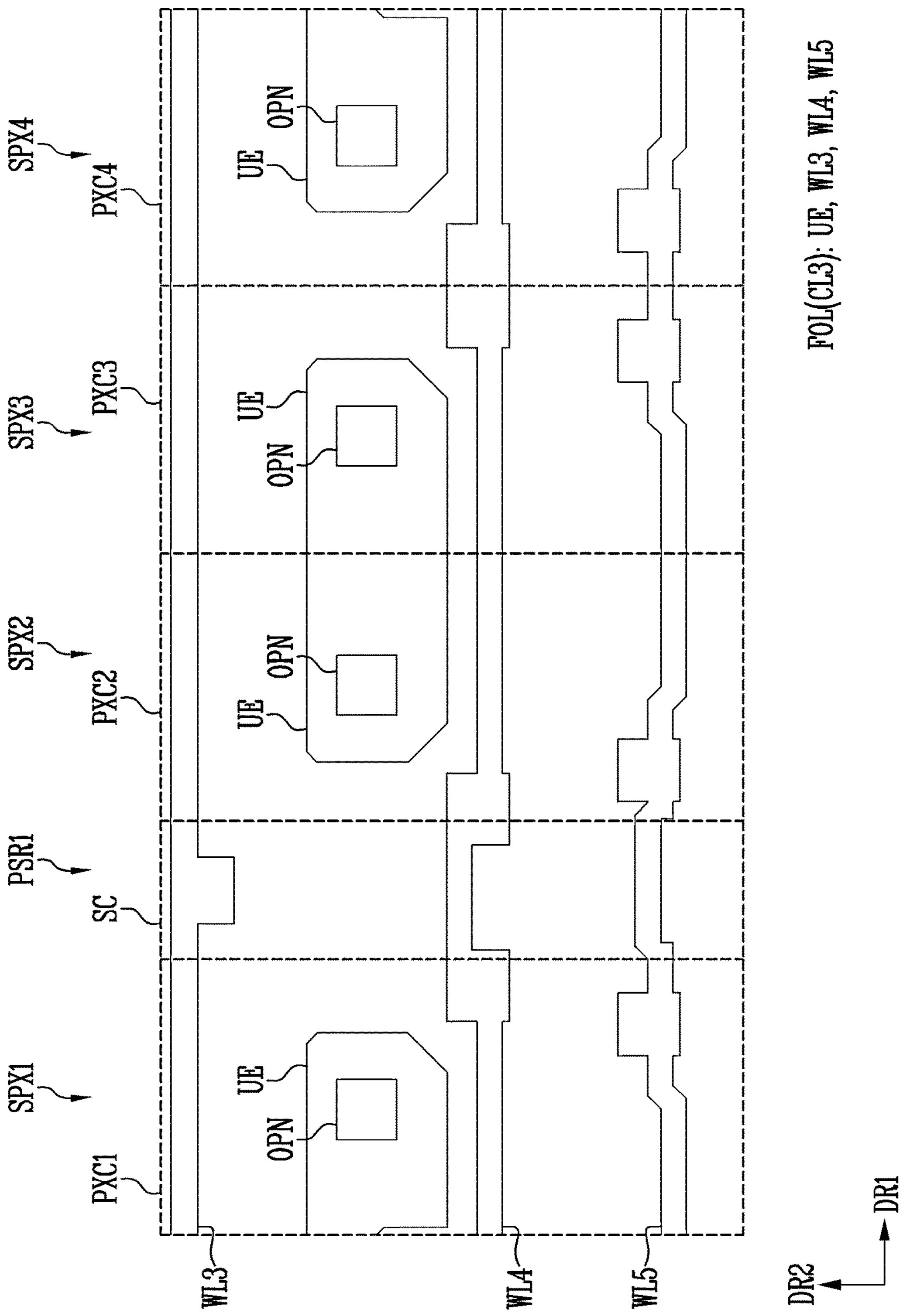
FIG. 23 is a schematic plan view illustrating components included in a fourth additional layer in FIG. 20.
Figure 24:
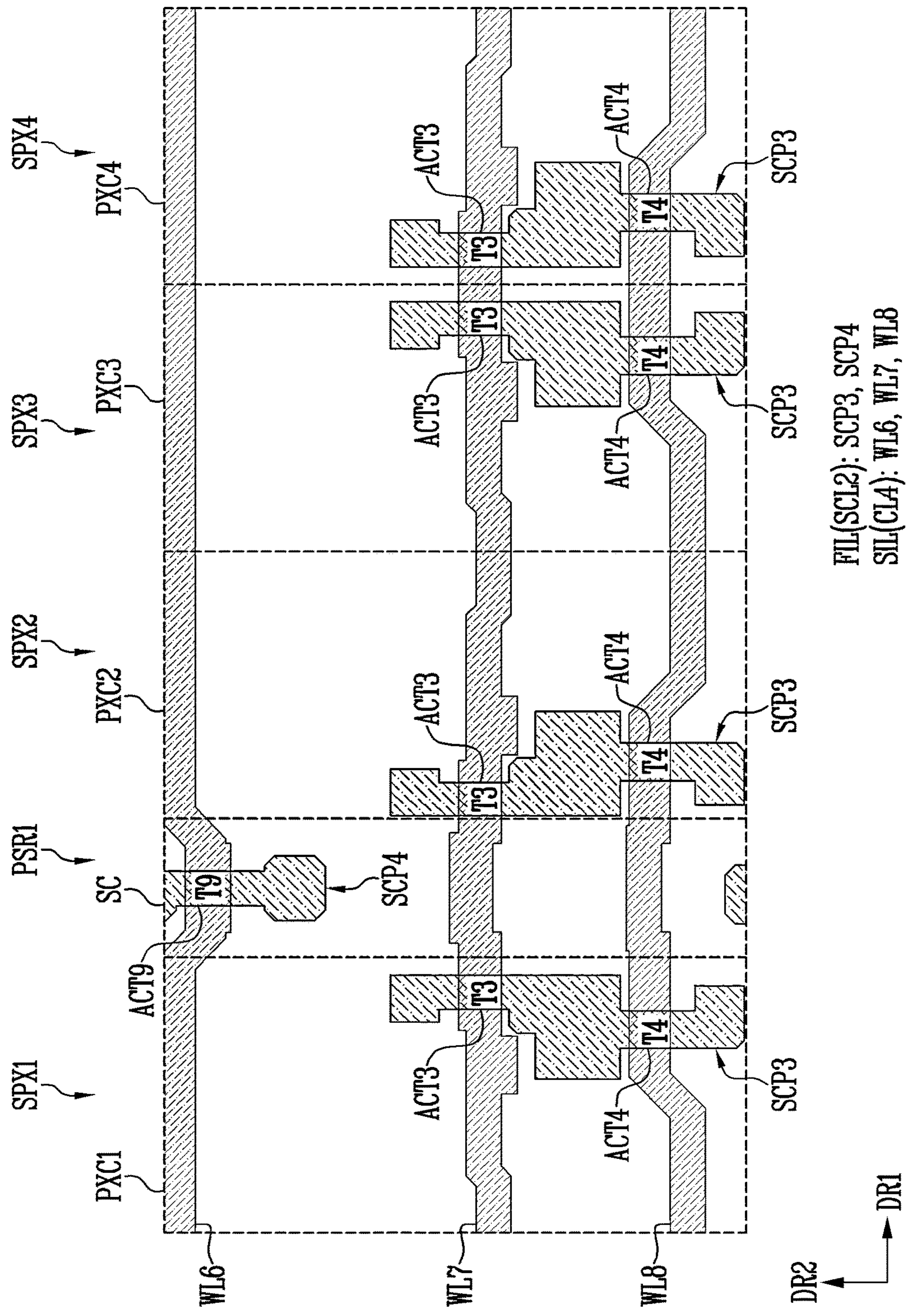
FIG. 24 is a schematic plan view illustrating components included in a fifth additional layer and a sixth additional layer in FIG. 20.
Figure 25:
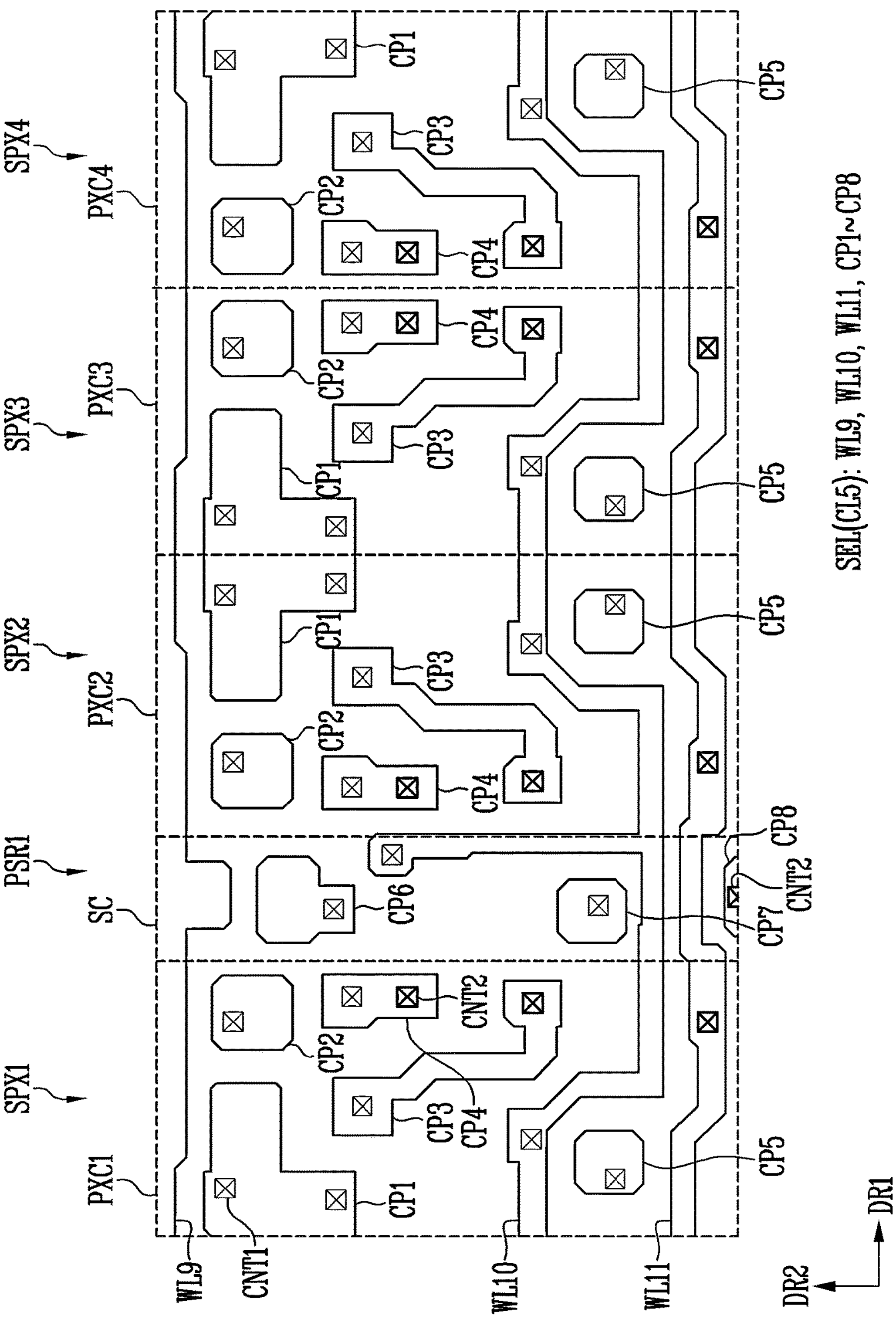
FIG. 25 is a schematic plan view illustrating components included in a seventh additional layer in FIG. 20.
Figure 26:
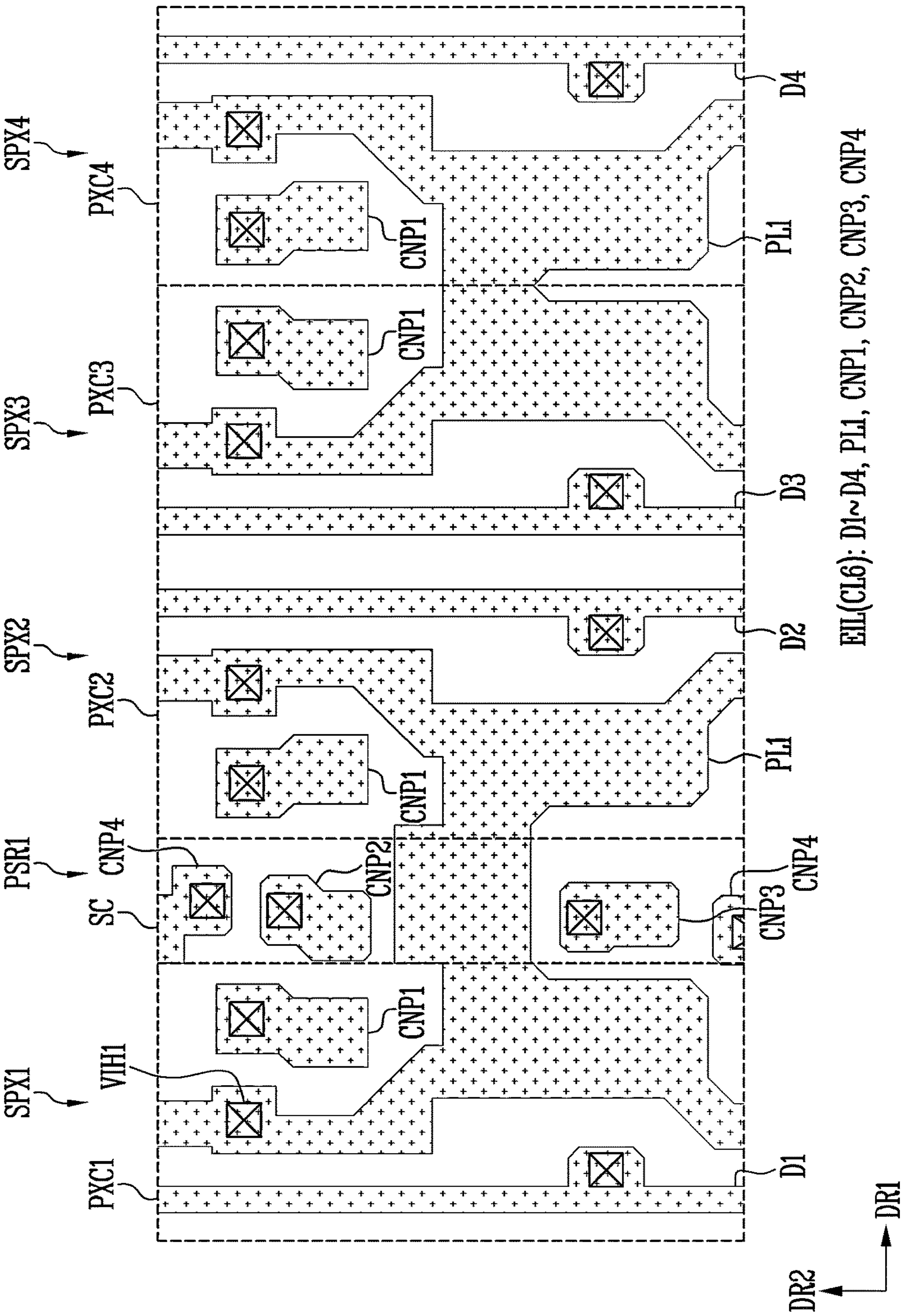
FIG. 26 is a schematic plan view illustrating components included in an eighth additional layer in FIG. 20.
Figure 27:
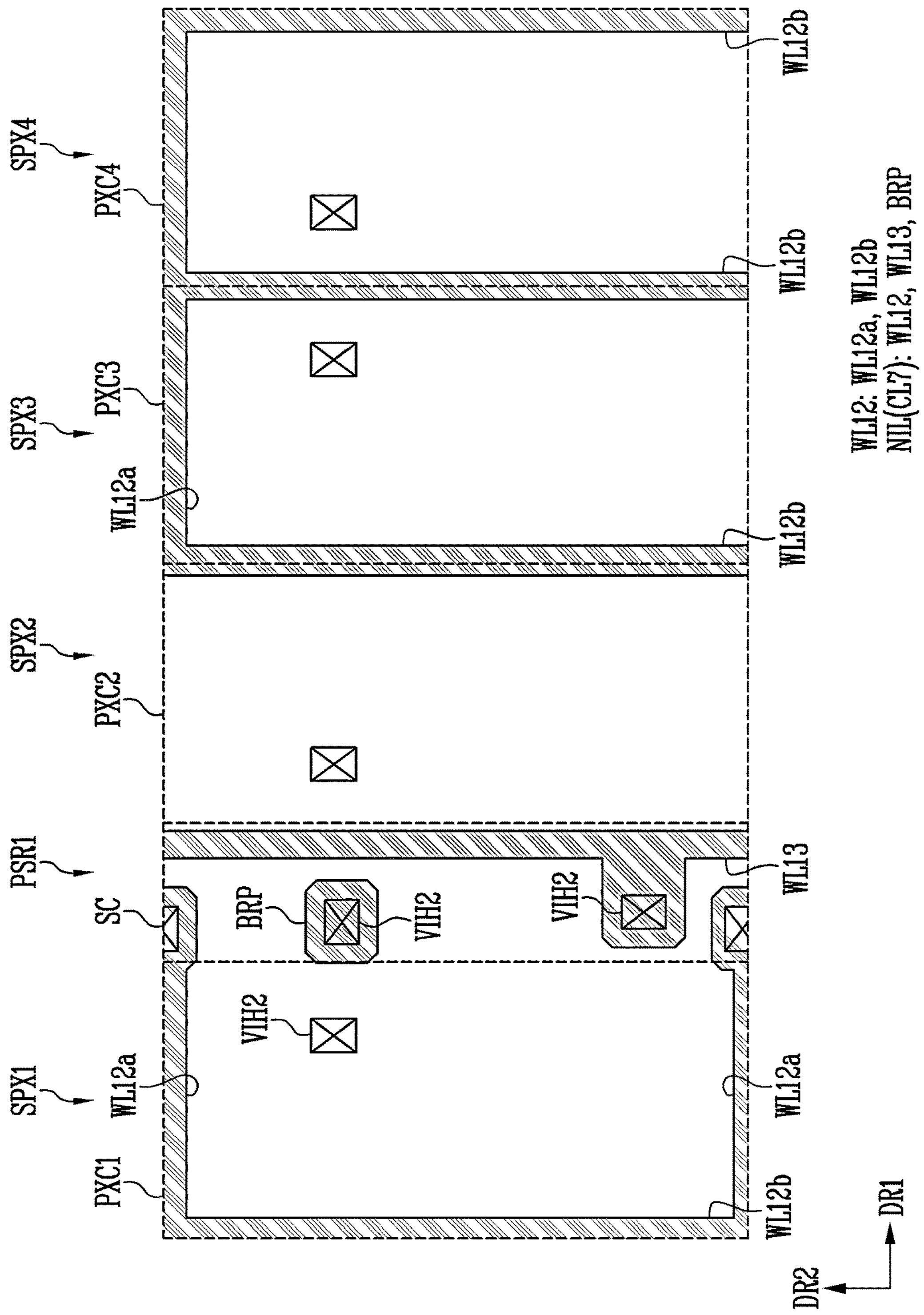
FIG. 27 is a schematic plan view illustrating components included in a ninth additional layer in FIG. 20.
Figure 28:
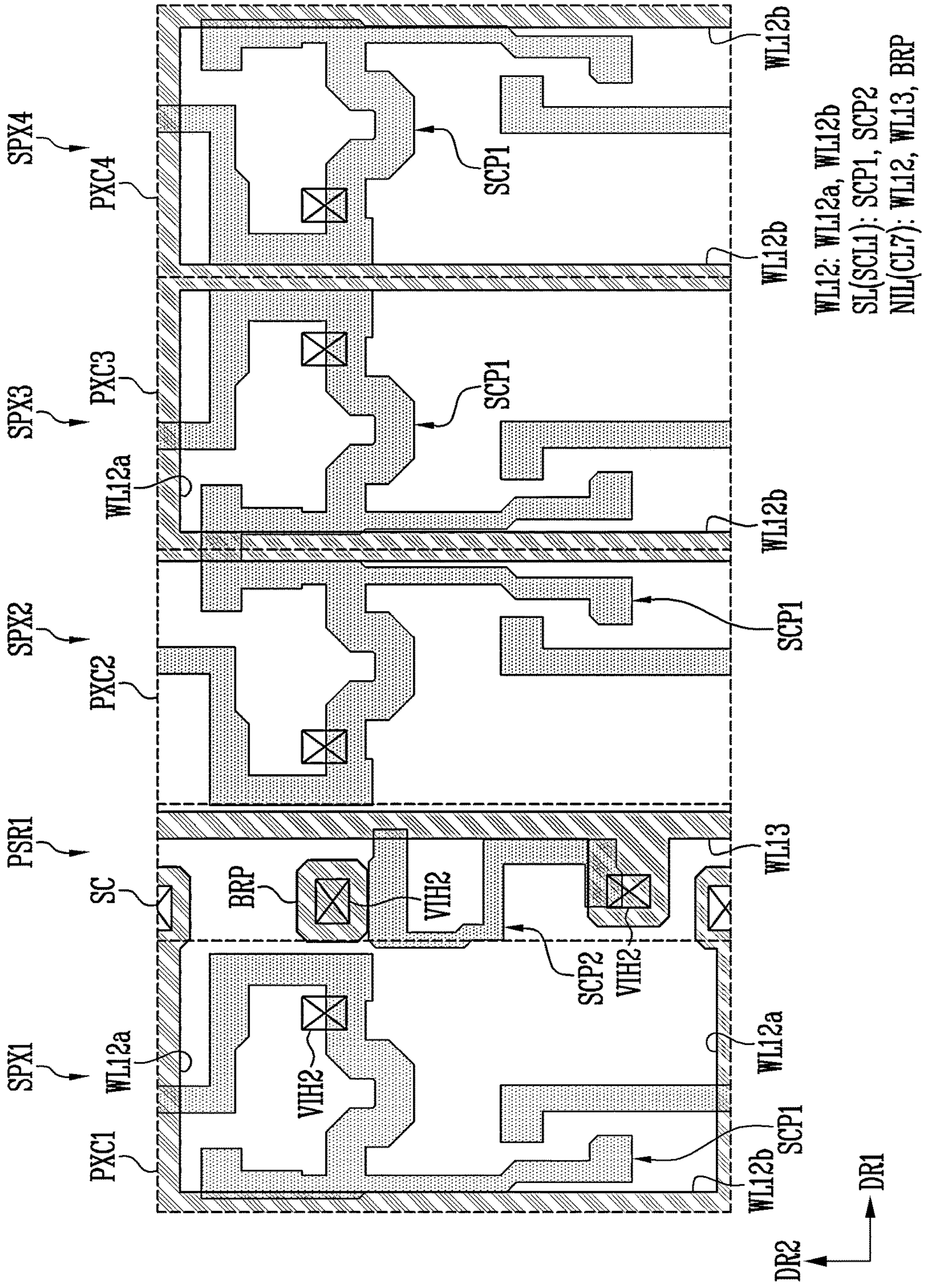
FIG. 28 is a schematic plan view illustrating components included in a second additional layer and a ninth additional layer in FIG. 20.
Figure 29:
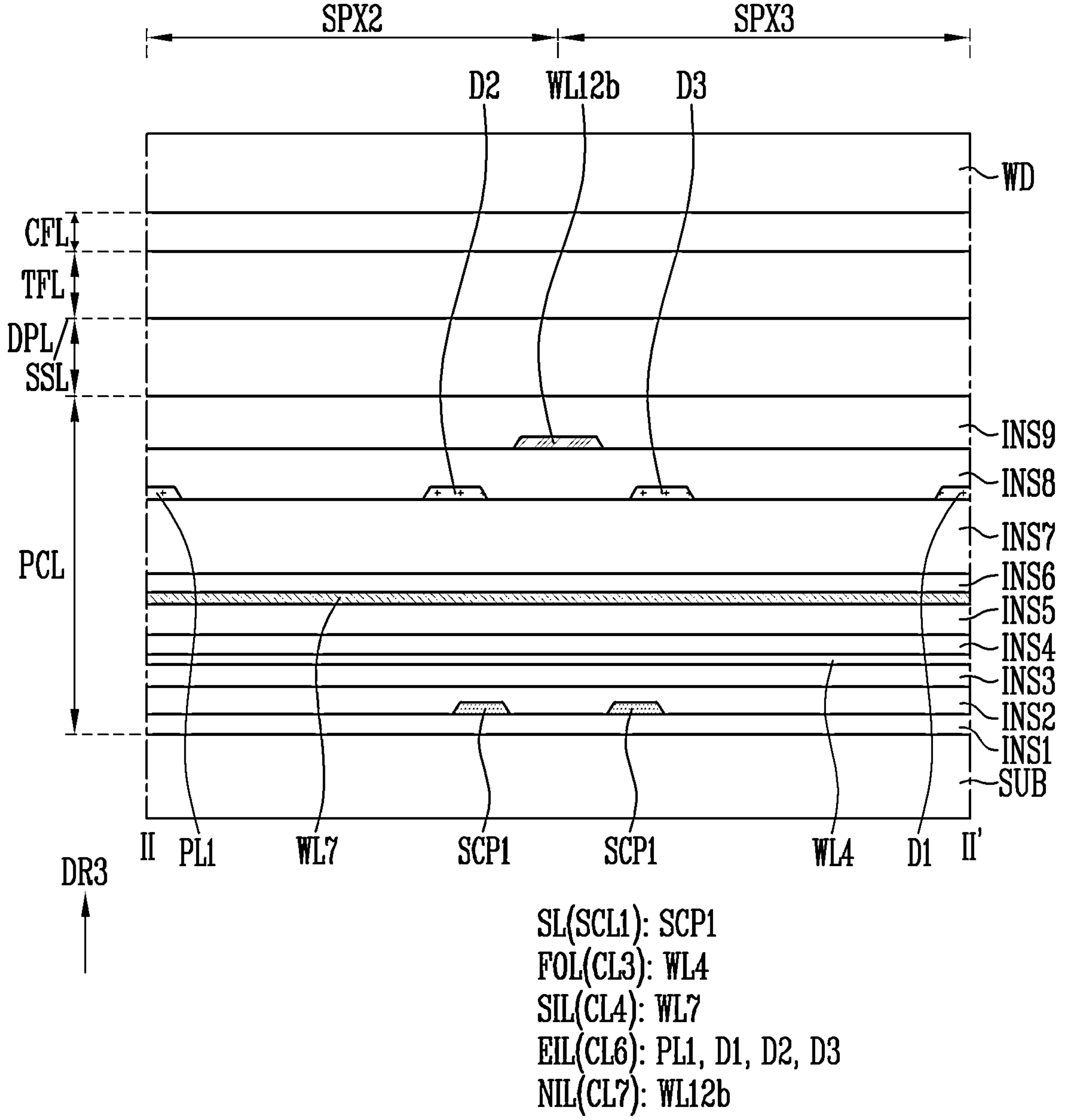
FIG. 29 is a schematic cross-sectional view taken along line II-II' of FIG. 20.

FIG. 20 is a schematic plan view illustrating the sub-pixels SPX1 to SPX4 and the photo-sensing pixel PSR1 in accordance with an embodiment. FIG. 21 is a schematic plan view illustrating components included in the first additional layer FL in FIG. 20. FIG. 22 is a schematic plan view illustrating components included in the second additional layer SL and the third additional layer TL in FIG. 20. FIG. 23 is a schematic plan view illustrating components included in the fourth additional layer FOL in FIG. 20. FIG. 24 is a schematic plan view illustrating components included in the fifth additional layer FIL and the sixth additional layer SIL in FIG. 20. FIG. 25 is a schematic plan view illustrating components included in the seventh additional layer SEL in FIG. 20. FIG. 26 is a schematic plan view illustrating components included in the eighth additional layer FIL in FIG. 20. FIG. 27 is a schematic plan view illustrating components included in the ninth additional layer NIL in FIG. 20. FIG. 28 is a schematic plan view illustrating components included in the second additional layer SL and the ninth additional layer NIL in FIG. 20. FIG. 29 is a schematic cross-sectional view taken along line II-II' of FIG. 20.

The embodiment of FIG. 20 refers to a modification of the embodiment of FIG. 9 with regard to the position of the sensor circuit SC or the like.

The description of the embodiment of FIGS. 20 to 29 will be focused on differences from the above-mentioned embodiments and to the extent that an element is not described in detail with respect to this figure, it may be understood that the element is at least similar to a corresponding element that has been described elsewhere within the present disclosure.

Referring to FIGS. 1, and 20 to 29, the first pixel circuit PXC1 of the first sub-pixel SPX1, the sensor circuit SC of the first photo-sensing pixel PSR1, the second pixel circuit PXC2 of the second sub-pixel SPX2, the third pixel circuit PXC3 of the third sub-pixel SPX3, and the fourth pixel circuit PXC4 of the fourth sub-pixel SPX4 may be arranged sequentially in the first direction DR1. In an embodiment, the sensor circuit SC may be positioned between the first pixel circuit PXC1 and the second pixel circuit PXC2.

Each of the first to fourth pixel circuits PXC1 to PXC4 may include first to seventh transistors T1 to T7 and a storage capacitor Cst. The sensor circuit SC may include eighth to tenth transistors T8 to T10.

Signal lines may be disposed in one area of the display area (refer to "DA" in FIG. 1) where the first to fourth pixel circuits PXC1 to PXC4 and the sensor circuit SC are positioned. The signal lines may include the first to thirteenth additional lines WL1 to WL13, the first to fourth data lines D1 to D4, and the first power line PL1, and the like.

The first to fourth pixel circuits PXC1 to PXC4 and the sensor circuit SC may be disposed in the pixel circuit layer PCL on the substrate SUB.

The pixel circuit layer PCL may include a first additional layer FL (or a first conductive layer CL1), a second additional layer SL (or a first semiconductor layer SCL1), a third additional layer TL (or a second conductive layer CL2), a fourth additional layer FOL (or a third conductive layer CL3), a fifth additional layer FIL (or a second semiconductor layer SCL2), a sixth additional layer SIL (or a fourth conductive layer CL4), a seventh additional layer SEL (or a fifth conductive layer CL5), an eighth additional layer EIL (or a sixth conductive layer CL6), and a ninth additional layer NIL (or a seventh conductive layer CL7) that are positioned sequentially in the third direction DR3 based on one surface of the substrate SUB.

The first additional layer FL may include the bottom metal layer BML. The second additional layer SL may include the first semiconductor pattern SCP1 and the second semiconductor pattern SCP2 that are spaced apart from each other. The third additional layer TL may include the first additional line WL1, the second additional line WL2, the first gate electrode GE1 (or the lower electrode LE), and the eighth gate electrode GE8. The fourth additional layer FOL may include the upper electrode UE, the third additional line WL3, the fourth additional line WL4, and the fifth additional line WL5 that are spaced apart from each other. The fifth additional layer FIL may include the third semiconductor pattern SCP3 and the fourth semiconductor pattern SCP4 that are spaced apart from each other. The sixth additional layer SIL may include the sixth additional line WL6, the seventh additional line WL7, and the eighth additional line WL8 that are spaced from each other. The seventh additional layer SEL may include the ninth additional line WL9, the tenth additional line WL10, the eleventh additional line WL11, and the first to eighth conductive patterns CP1 to CP8. The eighth additional layer EIL may include the first to fourth data lines D1 to D4, the first power line PL1, and the first to fourth connection patterns CNP1 to CNP4 that are spaced apart from each other. The ninth additional layer NIL may include the twelfth additional line WL12, the thirteenth additional line WL13, and the bridge pattern BRP that are spaced from each other.

In an embodiment, the twelfth additional line WL12 may include a twelfth horizontal line WL12*a* and a twelfth vertical line WL12*b*.

The twelfth horizontal line WL12*a* may extend in the first direction DR1. The twelfth vertical line WL12*b* may extend in the second direction DR2. The twelfth horizontal line WL12*a* and the twelfth vertical line WL12*b* may be formed of the ninth additional layer NIL and be integrally formed with each other. Due to the twelfth horizontal line WL12*a* and the twelfth vertical line WL12*b* that are integrally formed with each other, the twelfth additional line WL12 may have a mesh structure.

The twelfth horizontal line WL12*a* may be electrically connected to the fourth connection pattern CNP4 formed of the eighth additional layer EIL through a corresponding second via hole VIH2. The fourth connection pattern CNP4 may be electrically connected to the twelfth horizontal line WL12*a* through the second via hole VIH2. Furthermore, the fourth connection pattern CNP4 may be electrically connected to the ninth additional line WL9 formed of the seventh additional layer SEL through a corresponding first via hole VIH1. Furthermore, the fourth connection pattern CNP4 may be electrically connected to the eighth conductive pattern CP8 through a corresponding first via hole VIH1. The eighth conductive pattern CP8 may be electrically connected to the fourth semiconductor pattern SCP4 of the ninth transistor T9 of the sensor circuit SC through a corresponding second contactor CNT2. In an embodiment, the fourth connection line CNP4 may electrically connect the ninth additional line WL9, the twelfth additional line WL12, the eighth conductive pattern CP8, and the fourth semiconductor pattern SCP4 of the ninth transistor T9.

The ninth additional line WL9 and the twelfth additional line WL12 that are electrically connected to each other may be supplied with a reset voltage (refer to "VRST" in FIG. 6). As described above, in the case where the twelfth additional line WL12 has a mesh structure, the reset voltage may be reliably supplied to the overall area of the display area DA, whereby the reliability of the display device (refer to "1" in FIG. 1) can be further enhanced.

The twelfth vertical line WL12*b* may be disposed between two pixel circuits PXC (or sub-pixels) adjacent to each other. For example, the twelfth vertical line WL12*b* may be disposed each between the second pixel circuit PXC2 (or the second sub-pixel SPX2) and the third pixel circuit PXC3 (or the third sub-pixel SPX3), and between the third pixel circuit PXC3 (or the third sub-pixel SPX3) and the fourth pixel circuit PXC4 (or the fourth sub-pixel SPX4). If the twelfth vertical line WL12*b* is positioned between the second pixel circuit PXC2 and the third pixel circuit PXC3, the twelfth vertical line WL12*b* may be positioned between the second data line D2 and the third data line D3, as illustrated in FIG. 20. The position of the twelfth vertical line WL12*b* is not necessarily limited to the aforementioned embodiment. Depending on embodiments, the position of the twelfth vertical line WL12*b* may be changed in various ways.

The thirteenth additional line WL13 may be spaced apart from the twelfth additional line WL12 formed of the same layer (or formed through the same process and provided in the same layer). In an embodiment, the thirteenth additional line WL13 may extend in the second direction DR2, and may correspond to the k-th readout line RXk described with reference to FIG. 6. The thirteenth additional line WL13 may be positioned in one area of the display area DA where the sensor circuit SC is disposed, and may be electrically connected to the tenth transistor T10 of the sensor circuit SC through the third connection pattern CNP3 and the seventh conductive pattern CP7.

If the sensor circuit SC is positioned between the first pixel circuit PXC1 and the second pixel circuit PXC2, the thirteenth additional line WL13 may also be positioned between the first pixel circuit PXC1 and the second pixel circuit PXC2. In the case where the thirteenth additional line WL13 corresponding to the k-th readout line RXk is positioned between the first pixel circuit PXC1 and the second pixel circuit PXC2, a spacing distance between the thirteenth additional line WL13 and the first data line D1 electrically connected to the first pixel circuit PXC1 and a spacing distance between the thirteenth additional line WL13 and the second data line D2 electrically connected to the second pixel circuit PXC2 may be further increased. If the spacing distance between the thirteenth additional line WL13 and each of the first and second data lines D1 and D2 is further increased, a phenomenon where a sensing signal transmitted to the thirteenth additional line WL13 and a data signal transmitted to each of the first and second data lines D1 and D2 are influenced from each other may be further reduced.

In the case where the thirteenth additional line WL13 is positioned between the first pixel circuit PXC1 and the second pixel circuit PXC2, the thirteenth additional line WL13 may overlap the first power line PL1 shared by the first sub-pixel SPX1 and the second sub-pixel SPX2. In an embodiment, the thirteen line WL13 may be disposed on the first power line PL1 formed of the eighth additional layer EIL with the eighth insulating layer INS8 interposed therebetween, and may overlap the first power line PL1. If the first power line PL1 supplied with the first power voltage (refer to "VDD" in FIG. 5) may be disposed under the thirteenth additional line WL13 and overlap the thirteenth additional line WL13, the first power line PL1 may be used as a shielding component to reduce and prevent coupling capacitance occurring between the first and second data lines D1 and D2 and the thirteenth additional line WL13.

In the case where the first power line PL1 is used as the shielding component to secure the spacing distance between the thirteenth additional line WL13 and each of the first and second data lines D1 and D2 (or adjacent data lines), the coupling capacitance occurring between the thirteenth additional line WL13 and each of the first and second data lines D1 and D2 may be reduced. As a result, the reliability of the display device 1 can be further enhanced.

Figure 30:
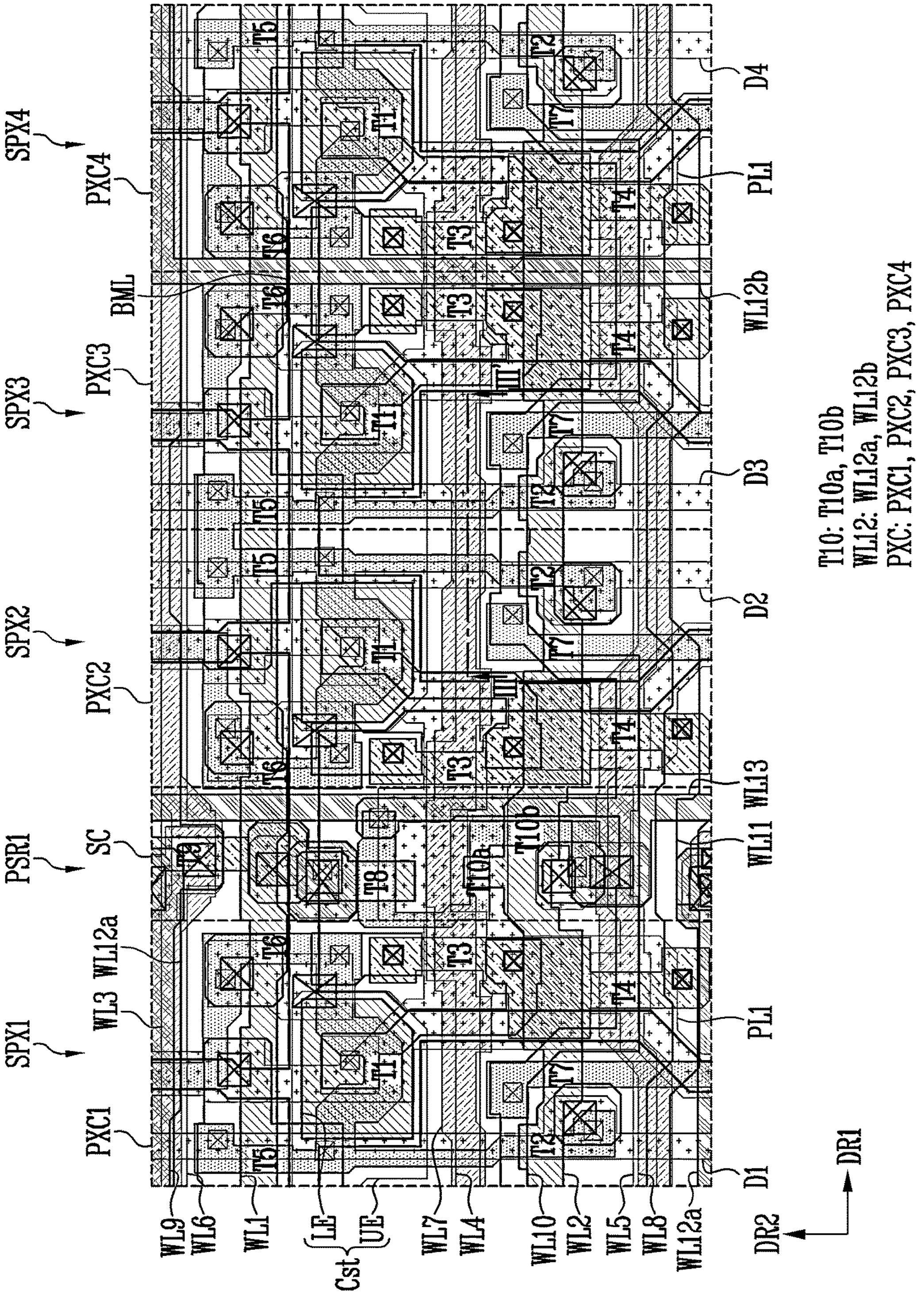
FIG. 30 is a schematic plan view illustrating sub-pixels and a photo-sensing pixel in accordance with an embodiment.
Figure 31:
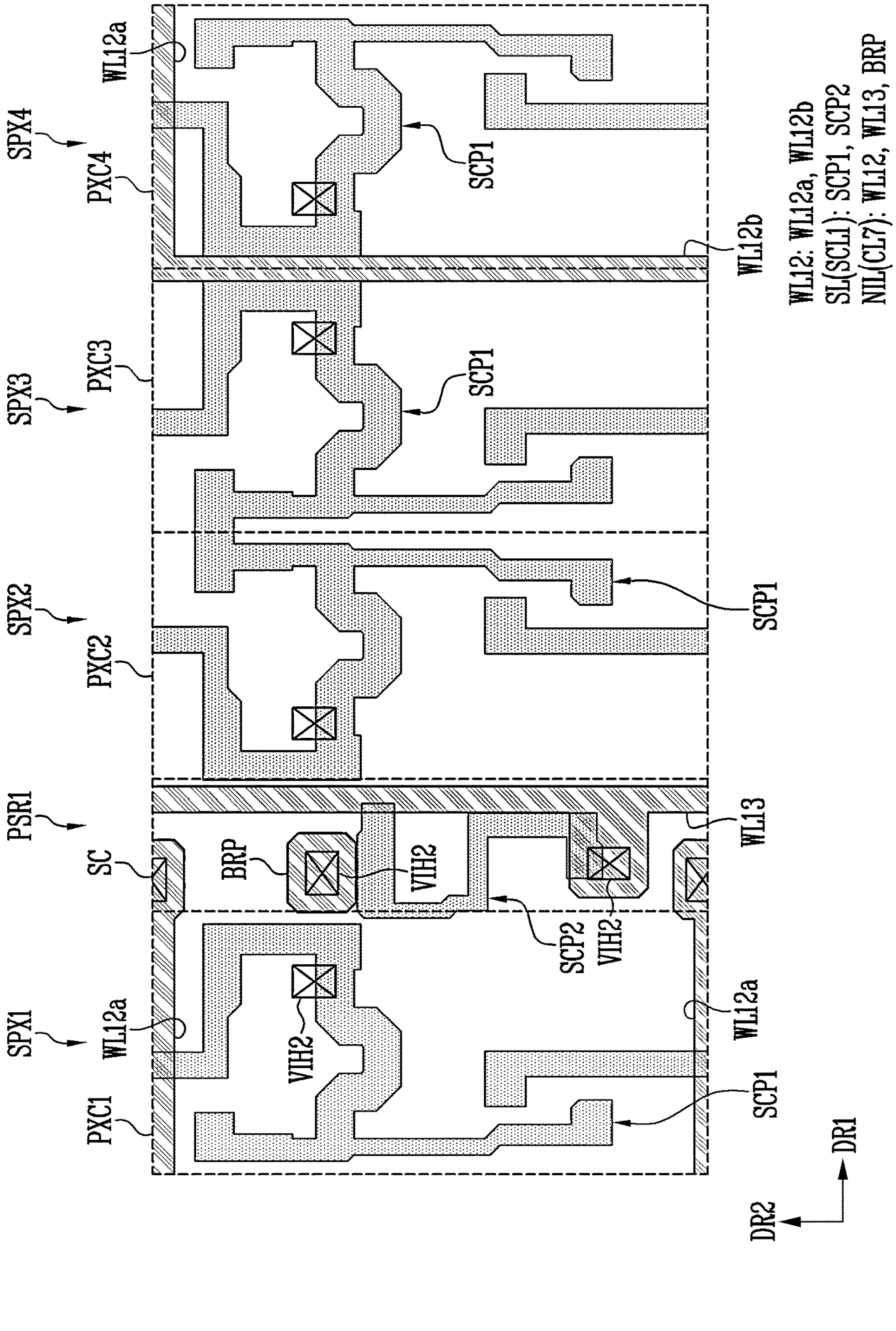
FIG. 31 is a schematic plan view illustrating components included in a second additional layer and a ninth additional layer in FIG. 30.
Figure 32:
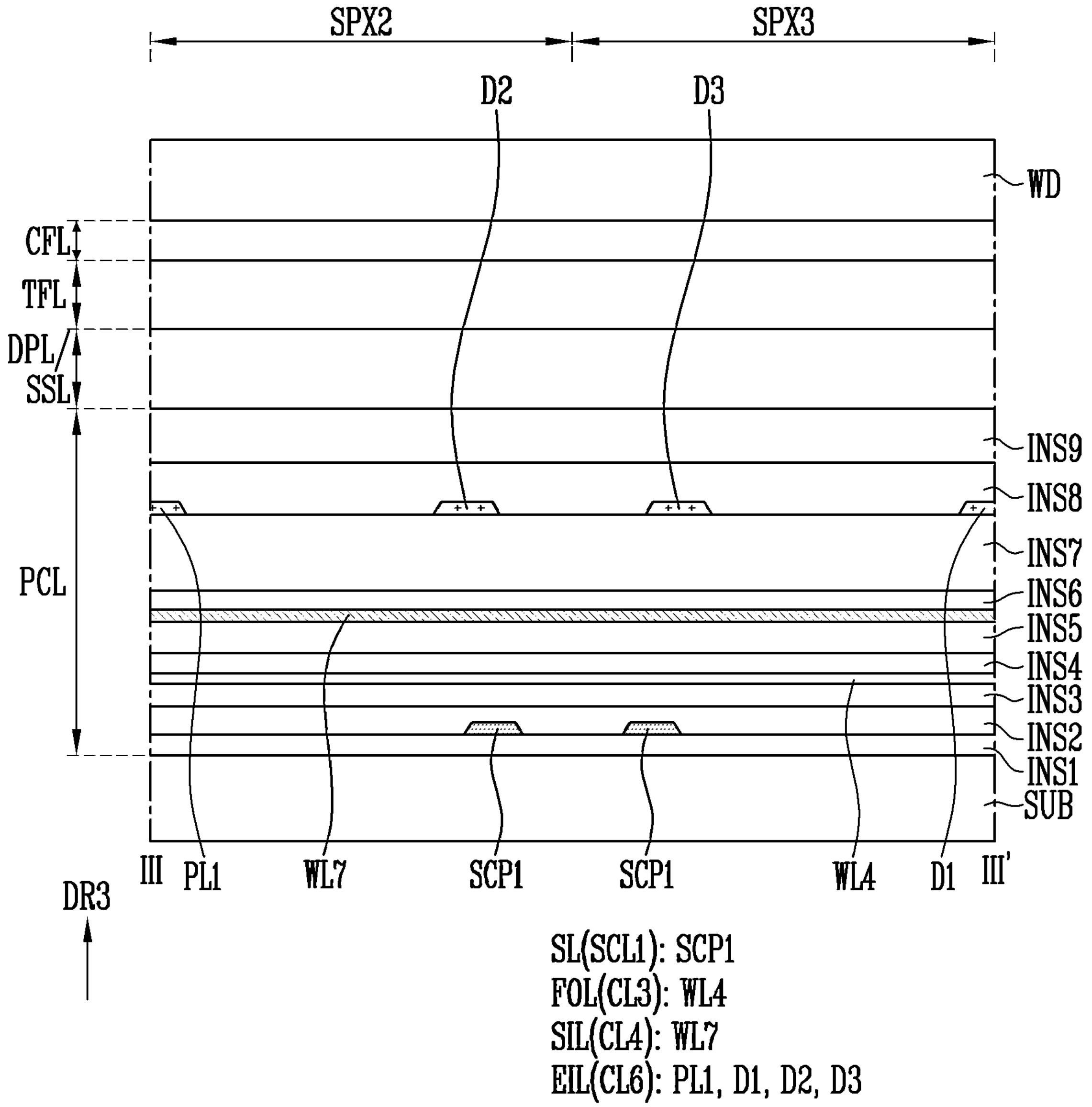
FIG. 32 is a schematic cross-sectional view taken along line III-III' of FIG. 30.

FIG. 30 is a schematic plan view illustrating the sub-pixels and the light sensing pixel in accordance with an embodiment. FIG. 31 is a schematic plan view illustrating components included in the second additional layer and the ninth additional layer in FIG. 30. FIG. 32 is a schematic cross-sectional view taken along line III-III' of FIG. 30.

The embodiment of FIG. 30 refers to a modification of the embodiment of FIG. 20 with regard to the position of the twelfth vertical line WL12*b* or the like.

The description of the embodiment of FIGS. 30 to 32 will be focused on differences from the above-mentioned embodiments and to the extent that an element is not described in detail with respect to this figure, it may be understood that the element is at least similar to a corresponding element that has been described elsewhere within the present disclosure.

Referring to FIGS. 1 and 30 to 32, the twelfth additional line WL12 may be formed of the ninth additional layer NIL (or the seventh conductive layer CL7), and may include a twelfth horizontal line WL12*a* extending in the first direction DR1, and a twelfth vertical line WL12*b* extending in the second direction DR2. The twelfth horizontal line WL12*a* and the twelfth vertical line WL12*b* may be integrally formed and electrically connected to each other. Due to the twelfth horizontal line WL12*a* and the twelfth vertical line WL12*b* that are integrally formed with each other, the twelfth additional line WL12 may have a mesh structure.

The twelfth vertical line WL12*b* may be arranged at a ratio of one per N sub-pixels (where N is a positive integer). For example, the twelfth vertical line WL12*b* may be disposed between the third pixel circuit PXC3 (or the third sub-pixel SPX3) and the fourth pixel circuit PXC4 (or the fourth sub-pixel SPX4). However, the present disclosure is not necessarily limited to the aforementioned example. In an embodiment, the twelfth vertical line WL12*b* may be arranged at a ratio of one per one sub-pixel.

Figure 33:
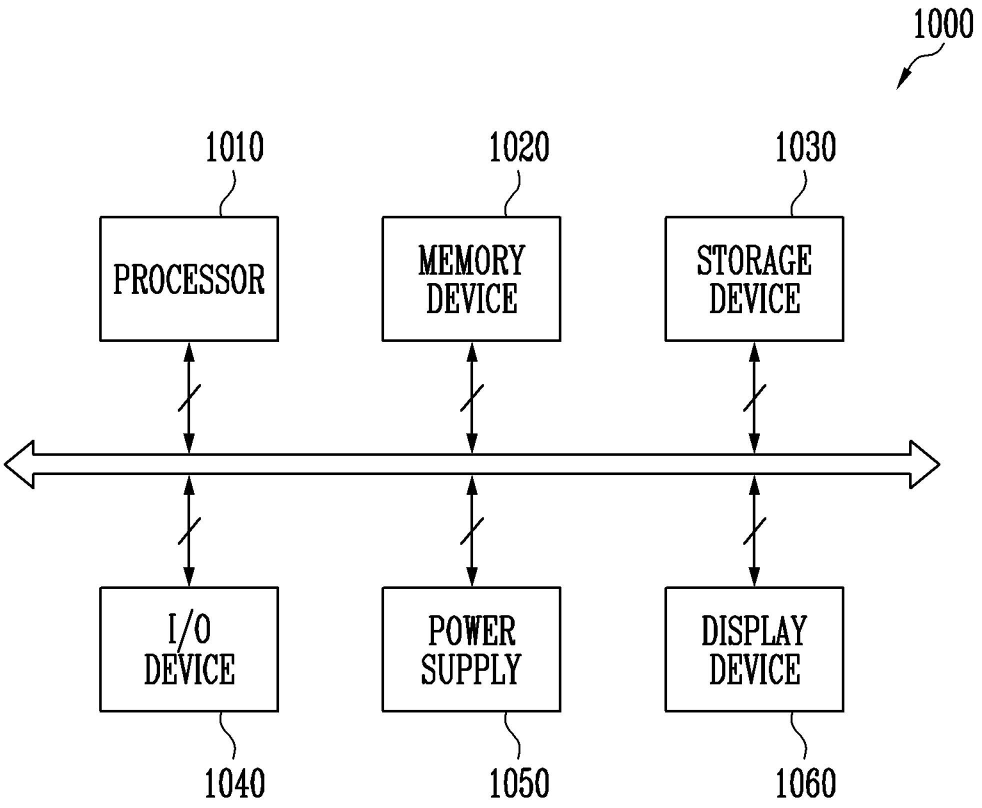
FIG. 33 is a schematic block diagram illustrating an electronic device in accordance with an embodiment.
Figure 34:
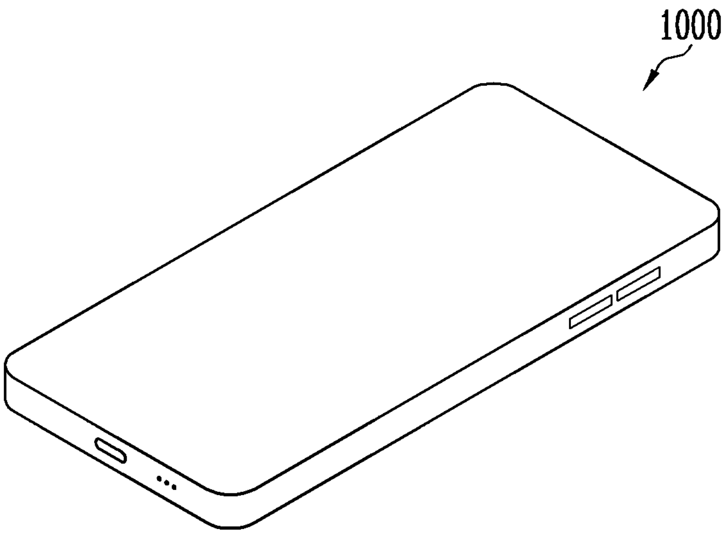
FIG. 34 is a schematic diagram illustrating an example where the electronic device of FIG. 33 is implemented as a smartphone.
Figure 35:
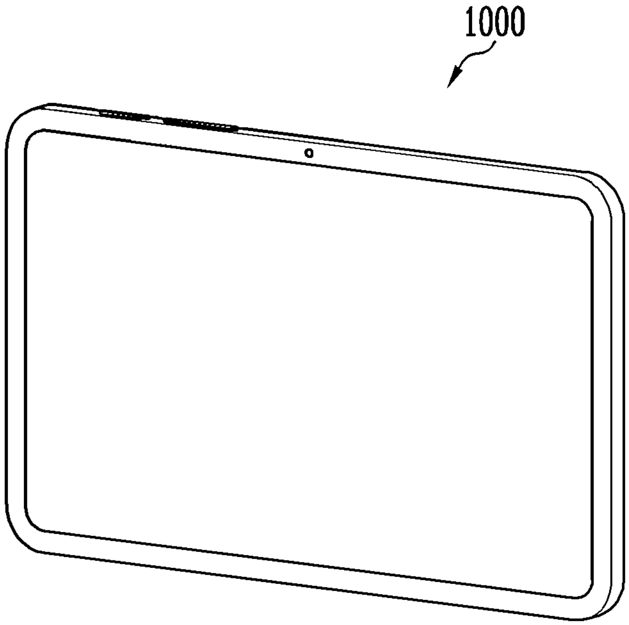
FIG. 35 is a schematic diagram illustrating an example where the electronic device of FIG. 33 is implemented as a tablet computer.

FIG. 33 is a schematic block diagram illustrating an electronic device 1000 in accordance with an embodiment. FIG. 34 is a schematic diagram illustrating an example where the electronic device 1000 of FIG. 33 is implemented as a smartphone. FIG. 35 is a schematic diagram illustrating an example where the electronic device 1000 of FIG. 33 is implemented as a tablet computer.

Referring to FIGS. 33 to 35, the electronic device 1000 may include a processor 1010, a memory device 1020, a storage device 1030, an input/output (I/O) device 1040, a power supply 1050, and a display device 1060. The display device 1060 may be the display device 1 of FIGS. 1 and 2. The electronic device 1000 may further include various ports for communication with a video card, a sound card, a memory card, a USB device, or other systems. In an embodiment, as illustrated in FIG. 34, the electronic device 1000 may be implemented as a smartphone. In an embodiment, as illustrated in FIG. 35, the electronic device 1000 may be implemented as a tablet computer. However, the aforementioned examples are illustrative, and the electronic device 1000 is not necessarily limited to the aforementioned examples. For example, the electronic device 1000 may be implemented as a cellular phone, a video phone, a smartpad, a smartwatch, a navigation device for vehicles, a computer monitor, a laptop computer, a head-mounted display device, or the like.

The processor 1010 may perform specific calculations or tasks. In an embodiment, the processor 1010 may be a micro processor, a central processing unit, an application processor, or the like. The processor 1010 may be connected to other components through an address bus, a control bus, a data bus, and the like. In an embodiment, the processor 1010 may be connected to an expansion bus such as a peripheral component interconnect (PCI) bus.

The memory device 1020 may store data needed to perform the operation of the electronic device 1000. For example, the memory device 1020 may include non-volatile memory devices such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or volatile memory devices such as a dynamic random access memory (DRAM) device, a static random access memory (SRAM) device, a mobile DRAM device, and so on.

The storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be included in the I/O device 1040.

The power supply 1050 may supply power needed to perform the operation of the electronic device 1000. For example, the power supply 1050 may be a power management integrated circuit (PMIC).

The display device 1060 may display an image corresponding to visual information of the electronic device 1000. Here, the display device 1060 may be an organic light emitting diode (OLED) display device or a quantum dot light emitting display device, but is not necessarily limited thereto. The display device 1060 may be connected to other components through the buses or other communication links.

In an embodiment, a data line and a readout line may be disposed in different layers so that a spacing distance between the data line and the readout line can be more reliably secured. A power line configured to receive a voltage having a constant voltage level may be positioned under the readout line and formed in the same layer as the data line. Consequently, parasitic capacitance occurring between the data line and the readout line can be reduced. As a result, there can be provided a display device and an electronic device with enhanced reliability.

The effects of the present disclosure are not necessarily limited by the foregoing, and other various effects are anticipated herein.

While various exemplary embodiments have been described above, those skilled in the art will appreciate that various modifications, additions and substitutions are possible, without departing from the scope of the present disclosure.

Therefore, the embodiments disclosed in this specification are for illustrative purposes and not necessarily limiting the technical spirit of the present disclosure.

What is claimed is:

1. A display device, comprising:

a first sub-pixel, a second sub-pixel, and a third sub-pixel, each arranged in a first direction, and each including a pixel circuit;

a photo-sensing pixel including a sensor circuit;

a first data line extending in a second direction crossing the first direction, and electrically connected to the first sub-pixel;

a second data line extending in the second direction, and electrically connected to the second sub-pixel;

a third data line extending in the second direction, and electrically connected to the third sub-pixel;

a readout line extending in the second direction, and electrically connected to the photo-sensing pixel; and a first additional line extending in the second direction, and electrically connected to the photo-sensing pixel and configured to receive a reset voltage, wherein the first additional line is disposed in a same layer as each of the first, the second, and the third data lines, and wherein the readout line is disposed on a layer that is different from that of the first, the second, and the third data lines, and the first additional line.

2. The display device according to claim 1, wherein the readout line is disposed on the first data line, the second data line, the third data line, and the first additional line.

3. The display device according to claim 1, wherein the readout line overlaps the first additional line, and is disposed on the first additional line.

4. The display device according to claim 1, wherein, the first additional line is disposed between the second data line and the third data line.

5. The display device according to claim 1, wherein the photo-sensing pixel is disposed between the second sub-pixel and the third sub-pixel.

6. The display device according to claim 1, wherein each of the first sub-pixel, the second sub-pixel, and the third sub-pixel comprises a light emitting element configured to emit light, and wherein the photo-sensing pixel comprises a light receiving element configured to output a sensing signal corresponding to the light emitted from the light emitting element.

7. The display device according to claim 6, wherein the photo-sensing pixel further comprises a bridge pattern electrically connected to the light receiving element, and wherein the bridge pattern and the readout line are disposed in an identical layer and spaced apart from each other.

8. The display device according to claim 1, wherein the first additional line has a width that is greater than a width of the readout line.

9. The display device according to claim 1, further comprising a second additional line extending in the first direction, and electrically connected to the first additional line and configured to receive the reset voltage, wherein the first additional line is disposed on the second additional line with an insulating layer interposed therebetween.

10. The display device according to claim 1, further comprising a third additional line electrically connected to each of the first sub-pixel, the second sub-pixel, and the third sub-pixel, and configured to receive a first driving voltage, wherein the third additional line is disposed in the same layer as each of the first data line, the second data line, the third data line, and the first additional line.

11. The display device according to claim 10, wherein the readout line does not overlap the third additional line.

12. The display device according to claim 1, wherein the sensor circuit comprises:

a light receiving element;

a first sensor transistor configured to control current flowing to the readout line in response to a voltage of one electrode of the light receiving element;

a second sensor transistor electrically connected between the first sensor transistor and the readout line; and a third sensor transistor electrically connected between the first additional line and the one electrode of the light receiving element, and including a gate electrode connected to a reset control line, wherein each of the first sensor transistor and the second sensor transistor comprises a first type semiconductor, and wherein the third sensor transistor comprises a second type semiconductor that is different from the first type semiconductor.

13. The display device according to claim 12, wherein each of the first sensor transistor and the second sensor transistor comprises a silicon semiconductor, and wherein the third sensor transistor comprises an oxide semiconductor.

14. The display device according to claim 1, comprising:

a substrate;

a first insulating layer, a second insulating layer, a third insulating layer, a fourth insulating layer, a fifth insulating layer, a sixth insulating layer, a seventh insulating layer, an eighth insulating layer, and a ninth insulating layer disposed sequentially on the substrate;

a first additional layer disposed between the substrate and the first insulating layer;

a second additional layer disposed between the first insulating layer and the second insulating layer;

a third additional layer disposed between the second insulating layer and the third insulating layer;

a fourth additional layer disposed between the third insulating layer and the fourth insulating layer;

a fifth additional layer disposed between the fourth insulating layer and the fifth insulating layer;

a sixth additional layer disposed between the fifth insulating layer and the sixth insulating layer;

a seventh additional layer disposed between the sixth insulating layer and the seventh insulating layer;

an eighth additional layer disposed between the seventh insulating layer and the eighth insulating layer; and a ninth additional layer disposed between the eighth insulating layer and the ninth insulating layer, wherein the eighth additional layer includes the first additional line, the first data line, the second data line, and the third data line, and wherein the ninth additional layer includes the readout line.

15. A display device, comprising:

a first sub-pixel, a second sub-pixel, and a third sub-pixel, each arranged in a first direction, and each including a pixel circuit;

a photo-sensing pixel including a sensor circuit;

a first data line extending in a second direction crossing the first direction, and electrically connected to the first sub-pixel;

a second data line extending in the second direction, and electrically connected to the second sub-pixel;

a third data line extending in the second direction, and electrically connected to the third sub-pixel;

a readout line extending in the second direction, and electrically connected to the photo-sensing pixel;

a first additional line extending in the second direction, and electrically connected to the photo-sensing pixel and configured to receive a reset voltage; and a second additional line electrically connected to each of the first sub-pixel, the second sub-pixel, and the third sub-pixel and configured to receive a first driving voltage, wherein the second additional line is disposed in a same layer as each of the first data line, the second data line, and the third data line, wherein the readout line and the first additional line are disposed in a common layer, and wherein the readout line and the first additional line are disposed in a layer that is different from that of the first data line, the second data line, the third data line, and the second additional line.

16. The display device according to claim 15, wherein the readout line overlaps the second additional line, and wherein the first additional line is disposed between the second data line and the third data line, and disposed on the second data line and the third data line.

17. The display device according to claim 15, wherein the first additional line comprises a horizontal line extending in the first direction, and a vertical line extending in the second direction, and wherein the horizontal line and the vertical line together form a mesh structure.

18. The display device according to claim 17, wherein the readout line is spaced apart from the horizontal line and the vertical line.

19. The display device according to claim 15, wherein the photo-sensing pixel is disposed between the first sub-pixel and the second sub-pixel.

20. An electronic device, comprising:

a processor configured to provide input image data to a display device; and the display device configured to display an image based on the input image data, wherein the display device comprises:

a first sub-pixel, a second sub-pixel, and a third sub-pixel, each arranged in a first direction, and each including a pixel circuit;

a photo-sensing pixel including a sensor circuit;

a first data line extending in a second direction crossing the first direction, and electrically connected to the first sub-pixel;

a second data line extending in the second direction, and electrically connected to the second sub-pixel;

a third data line extending in the second direction, and electrically connected to the third sub-pixel;

a readout line extending in the second direction, and electrically connected to the photo-sensing pixel; and a first additional line extending in the second direction, and electrically connected to the photo-sensing pixel and configured to receive a reset voltage, wherein the first additional line is disposed in a same layer as each of the first data line, the second data line, and the third data line, and wherein the readout line is disposed on a layer that is different from that of the first data line, the second data line, the third data line, and the first additional line.

* * * * *